(12) United States Patent
Kappus et al.

(10) Patent No.: US 12,393,277 B2
(45) Date of Patent: *Aug. 19, 2025

(54) FEATURES OF AIRBORNE ULTRASONIC FIELDS

(71) Applicant: Ultraleap Limited, Bristol (GB)

(72) Inventors: Brian Kappus, Campbell, CA (US); Benjamin John Oliver Long, Bristol (GB)

(73) Assignee: ULTRALEAP LIMITED, Bristol (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/496,002

(22) Filed: Oct. 27, 2023

(65) Prior Publication Data

US 2024/0402809 A1 Dec. 5, 2024

Related U.S. Application Data

(63) Continuation of application No. 17/354,636, filed on Jun. 22, 2021, now Pat. No. 11,816,267.
(Continued)

(51) Int. Cl.
*G06F 3/01* (2006.01)
*G10K 11/34* (2006.01)

(52) U.S. Cl.
CPC ............ *G06F 3/016* (2013.01); *G10K 11/346* (2013.01); *G10K 11/348* (2013.01)

(58) Field of Classification Search
CPC .... G06F 3/016; G10K 11/346; G10K 11/348; G10K 15/02
See application file for complete search history.

(56) References Cited

U.S. PATENT DOCUMENTS

| 4,218,921 A | 8/1980 | Berge |
| 4,760,525 A | 7/1988 | Webb |

(Continued)

FOREIGN PATENT DOCUMENTS

| CA | 2470115 A1 | 6/2003 |
| CA | 2909804 A1 | 11/2014 |

(Continued)

OTHER PUBLICATIONS

Office Action dated Apr. 19, 2023 for U.S. Appl. No. 18/066,267 (pp. 1-11).
(Continued)

*Primary Examiner* — Daniel Pihulic
(74) *Attorney, Agent, or Firm* — Koffsky Schwalb LLC; Mark I. Koffsky

(57) ABSTRACT

A method for specifying desired quantities of the energy flux of the combined waves of acoustic radiation pressure to apply producing a mid-air haptic pushing force, which has the effect of simultaneously reducing the harmonic distortion present is described. Further, a method for communicating only the summaries of acoustic field contributions at the required locations in the form of summed portions of the relatively small matrix whose row and column count depend only on the control point count is described. Further, phased arrays of ultrasonic speakers can produce a relatively large amount of acoustic energy which is usually directed in a specific direction or focused to a particular point depending on the application of the array. Further, to allow the system to be driven more strongly than usual, the complex-valued linear system that governs the drive signal to each control point is solved twice. Further, to achieve mid-air haptics with high precision the radiation pressure generated must be modelled accurately.

4 Claims, 34 Drawing Sheets

Related U.S. Application Data

(60) Provisional application No. 63/210,619, filed on Jun. 15, 2021, provisional application No. 63/210,486, filed on Jun. 14, 2021, provisional application No. 63/067,314, filed on Aug. 18, 2020, provisional application No. 63/065,997, filed on Aug. 14, 2020, provisional application No. 63/043,093, filed on Jun. 23, 2020.

(56) References Cited

U.S. PATENT DOCUMENTS

| | | |
|---|---|---|
| 4,771,205 A | 9/1988 | Mequio |
| 4,881,212 A | 11/1989 | Takeuchi |
| 5,122,993 A | 6/1992 | Hikita |
| 5,226,000 A | 7/1993 | Moses |
| 5,235,986 A | 8/1993 | Maslak |
| 5,243,344 A | 9/1993 | Koulopoulos |
| 5,329,682 A | 7/1994 | Thurn |
| 5,371,834 A | 12/1994 | Tawel |
| 5,422,431 A | 6/1995 | Ichiki |
| 5,426,388 A | 6/1995 | Flora |
| 5,477,736 A | 12/1995 | Lorraine |
| 5,511,296 A | 4/1996 | Dias |
| 5,729,694 A | 3/1998 | Holzrichter |
| 5,859,915 A | 1/1999 | Norris |
| 6,029,518 A | 2/2000 | Oeftering |
| 6,193,936 B1 | 2/2001 | Gardner |
| 6,216,538 B1 | 4/2001 | Yasuda |
| 6,436,051 B1 | 8/2002 | Morris |
| 6,503,204 B1 | 1/2003 | Sumanaweera |
| 6,533,455 B2 | 3/2003 | Graumann |
| 6,647,359 B1 | 11/2003 | Verplank |
| 6,771,294 B1 | 8/2004 | Pulli |
| 6,772,490 B2 | 8/2004 | Toda |
| 6,800,987 B2 | 10/2004 | Toda |
| 7,107,159 B2 | 9/2006 | German |
| 7,109,789 B2 | 9/2006 | Spencer |
| 7,154,928 B2 | 12/2006 | Sandstrom |
| 7,182,726 B2 | 2/2007 | Williams |
| 7,225,404 B1 | 5/2007 | Zilles |
| 7,284,027 B2 | 10/2007 | Jennings, III |
| 7,345,600 B1 | 3/2008 | Fedigan |
| 7,487,662 B2 | 2/2009 | Schabron |
| 7,497,662 B2 | 3/2009 | Mollmann |
| 7,577,260 B1 | 8/2009 | Hooley |
| 7,692,661 B2 | 4/2010 | Cook |
| RE42,192 E | 3/2011 | Schabron |
| 7,966,134 B2 | 6/2011 | German |
| 8,000,481 B2 | 8/2011 | Nishikawa |
| 8,123,502 B2 | 2/2012 | Blakey |
| 8,269,168 B1 | 9/2012 | Axelrod |
| 8,279,193 B1 | 10/2012 | Birnbaum |
| 8,351,646 B2 | 1/2013 | Fujimura |
| 8,369,973 B2 | 2/2013 | Risbo |
| 8,594,350 B2 | 11/2013 | Hooley |
| 8,607,922 B1 | 12/2013 | Werner |
| 8,782,109 B2 | 7/2014 | Tsutsui |
| 8,823,674 B2 | 9/2014 | Birnbaum |
| 8,833,510 B2 | 9/2014 | Koh |
| 8,884,927 B1 | 11/2014 | Cheatham, III |
| 9,208,664 B1 | 12/2015 | Peters |
| 9,267,735 B2 | 2/2016 | Funayama |
| 9,421,291 B2 | 8/2016 | Robert |
| 9,612,658 B2 | 4/2017 | Subramanian |
| 9,662,680 B2 | 5/2017 | Yamamoto |
| 9,667,173 B1 | 5/2017 | Kappus |
| 9,786,092 B2 | 10/2017 | Santhanam |
| 9,795,446 B2 | 10/2017 | Dimaio |
| 9,816,757 B1 | 11/2017 | Zielinski |
| 9,841,819 B2 | 12/2017 | Carter |
| 9,863,699 B2 | 1/2018 | Corbin, III |
| 9,898,089 B2 | 2/2018 | Subramanian |
| 9,936,908 B1 | 4/2018 | Acosta |
| 9,945,818 B2 | 4/2018 | Ganti |
| 9,958,943 B2 | 5/2018 | Long |
| 9,977,120 B2 | 5/2018 | Carter |
| 10,101,811 B2 | 10/2018 | Carter |
| 10,101,814 B2 | 10/2018 | Carter |
| 10,133,353 B2 | 11/2018 | Eid |
| 10,140,776 B2 | 11/2018 | Schwarz |
| 10,146,353 B1 | 12/2018 | Smith |
| 10,168,782 B1 | 1/2019 | Tchon |
| 10,268,275 B2 | 4/2019 | Carter |
| 10,281,567 B2 | 5/2019 | Carter |
| 10,318,008 B2 | 6/2019 | Sinha |
| 10,383,694 B1 | 8/2019 | Venkataraman |
| 10,444,842 B2 | 10/2019 | Long |
| 10,469,973 B2 | 11/2019 | Hayashi |
| 10,496,175 B2 | 12/2019 | Long |
| 10,497,358 B2 | 12/2019 | Tester |
| 10,510,357 B2 | 12/2019 | Kovesi |
| 10,520,252 B2 | 12/2019 | Momen |
| 10,523,159 B2 | 12/2019 | Megretski |
| 10,531,212 B2 | 1/2020 | Long |
| 10,535,174 B1 | 1/2020 | Rigiroli |
| 10,569,300 B2 | 2/2020 | Hoshi |
| 10,593,101 B1 | 3/2020 | Han |
| 10,599,434 B1 | 3/2020 | Barrett |
| 10,657,704 B1 | 5/2020 | Han |
| 10,685,538 B2 * | 6/2020 | Carter ............. G08B 6/00 |
| 10,755,538 B2 | 8/2020 | Carter |
| 10,818,162 B2 | 10/2020 | Carter |
| 10,911,861 B2 | 2/2021 | Buckland |
| 10,915,177 B2 | 2/2021 | Carter |
| 10,921,890 B2 | 2/2021 | Subramanian |
| 10,930,123 B2 | 2/2021 | Carter |
| 10,943,578 B2 | 3/2021 | Long |
| 10,991,074 B2 | 4/2021 | Bousmalis |
| 11,048,329 B1 | 6/2021 | Lee |
| 11,080,874 B1 | 8/2021 | Bardagjy |
| 11,098,951 B2 | 8/2021 | Kappus |
| 11,106,273 B2 | 8/2021 | Hazra |
| 11,113,860 B2 | 9/2021 | Rigiroli |
| 11,125,866 B2 | 9/2021 | Sumi |
| 11,169,610 B2 | 11/2021 | Sarafianou |
| 11,189,140 B2 * | 11/2021 | Long ............. G01S 15/06 |
| 11,204,644 B2 | 12/2021 | Long |
| 11,276,281 B2 * | 3/2022 | Carter ............. G10K 15/04 |
| 11,334,165 B1 | 5/2022 | Clements |
| 11,350,909 B2 | 6/2022 | Maresca |
| 11,475,247 B2 | 10/2022 | Nikolenko |
| 11,531,395 B2 | 12/2022 | Kappus |
| 11,543,507 B2 | 1/2023 | Carter |
| 11,550,395 B2 | 1/2023 | Beattie |
| 11,550,432 B2 | 1/2023 | Carter |
| 11,553,295 B2 | 1/2023 | Kappus |
| 11,669,661 B2 | 6/2023 | Mirzendehdel |
| 11,693,113 B2 | 7/2023 | Bachmann |
| 11,704,983 B2 | 7/2023 | Long |
| 11,714,492 B2 | 8/2023 | Carter |
| 11,715,453 B2 | 8/2023 | Kappus |
| 11,727,790 B2 | 8/2023 | Carter |
| 11,740,018 B2 | 8/2023 | Kappus |
| 11,742,870 B2 | 8/2023 | Long |
| 11,768,540 B2 | 9/2023 | Long |
| 11,816,267 B2 * | 11/2023 | Kappus ............ G06F 3/016 |
| 11,830,351 B2 | 11/2023 | Carter |
| 11,830,352 B1 | 11/2023 | Agrawal |
| 11,842,517 B2 | 12/2023 | Lyons |
| 11,886,639 B2 | 1/2024 | Brown |
| 11,921,928 B2 | 3/2024 | Iodice |
| 11,955,109 B2 | 4/2024 | Long |
| 12,100,288 B2 | 9/2024 | Carter |
| 12,158,522 B2 | 12/2024 | Iodice |
| 2001/0007591 A1 | 7/2001 | Pompei |
| 2001/0033124 A1 | 10/2001 | Norris |
| 2001/0053204 A1 | 12/2001 | Navab |
| 2002/0149570 A1 | 10/2002 | Knowles |
| 2003/0024317 A1 | 2/2003 | Miller |
| 2003/0144032 A1 | 7/2003 | Brunner |
| 2003/0182647 A1 | 9/2003 | Radeskog |
| 2004/0005715 A1 | 1/2004 | Schabron |
| 2004/0014434 A1 | 1/2004 | Haardt |

(56) References Cited

U.S. PATENT DOCUMENTS

| | | |
|---|---|---|
| 2004/0052387 A1 | 3/2004 | Norris |
| 2004/0091119 A1 | 5/2004 | Duraiswami |
| 2004/0210158 A1 | 10/2004 | Organ |
| 2004/0226378 A1 | 11/2004 | Oda |
| 2004/0264707 A1 | 12/2004 | Yang |
| 2005/0052714 A1 | 3/2005 | Klug |
| 2005/0056851 A1 | 3/2005 | Althaus |
| 2005/0148874 A1 | 7/2005 | Brock-Fisher |
| 2005/0212760 A1 | 9/2005 | Marvit |
| 2005/0226437 A1 | 10/2005 | Pellegrini |
| 2005/0267695 A1 | 12/2005 | German |
| 2005/0273483 A1 | 12/2005 | Dent |
| 2006/0085049 A1 | 4/2006 | Cory |
| 2006/0090955 A1 | 5/2006 | Cardas |
| 2006/0091301 A1 | 5/2006 | Trisnadi |
| 2006/0164428 A1 | 7/2006 | Cook |
| 2007/0036492 A1 | 2/2007 | Lee |
| 2007/0056374 A1 | 3/2007 | Andrews |
| 2007/0094317 A1 | 4/2007 | Wang |
| 2007/0177681 A1 | 8/2007 | Choi |
| 2007/0214462 A1 | 9/2007 | Boillot |
| 2007/0216711 A1 | 9/2007 | Smith |
| 2007/0236450 A1 | 10/2007 | Colgate |
| 2007/0263741 A1 | 11/2007 | Erving |
| 2008/0012647 A1 | 1/2008 | Risbo |
| 2008/0027686 A1 | 1/2008 | Mollmann |
| 2008/0084789 A1 | 4/2008 | Altman |
| 2008/0130906 A1 | 6/2008 | Goldstein |
| 2008/0152191 A1 | 6/2008 | Fujimura |
| 2008/0226088 A1 | 9/2008 | Aarts |
| 2008/0273723 A1 | 11/2008 | Hartung |
| 2008/0291198 A1 | 11/2008 | Chun |
| 2008/0300055 A1 | 12/2008 | Lutnick |
| 2009/0093724 A1 | 4/2009 | Pernot |
| 2009/0116660 A1 | 5/2009 | Croft, III |
| 2009/0232684 A1 | 9/2009 | Hirata |
| 2009/0251421 A1 | 10/2009 | Bloebaum |
| 2009/0319065 A1 | 12/2009 | Risbo |
| 2010/0013613 A1 | 1/2010 | Weston |
| 2010/0016727 A1 | 1/2010 | Rosenberg |
| 2010/0030076 A1 | 2/2010 | Vortman |
| 2010/0044120 A1 | 2/2010 | Richter |
| 2010/0066512 A1 | 3/2010 | Rank |
| 2010/0085168 A1 | 4/2010 | Kyung |
| 2010/0103246 A1 | 4/2010 | Schwerdtner |
| 2010/0109481 A1 | 5/2010 | Buccafusca |
| 2010/0199232 A1 | 8/2010 | Mistry |
| 2010/0231508 A1 | 9/2010 | Cruz-Hernandez |
| 2010/0262008 A1 | 10/2010 | Roundhill |
| 2010/0302015 A1 | 12/2010 | Kipman |
| 2010/0321216 A1 | 12/2010 | Jonsson |
| 2011/0006888 A1 | 1/2011 | Bae |
| 2011/0010958 A1 | 1/2011 | Clark |
| 2011/0051554 A1 | 3/2011 | Varray |
| 2011/0066032 A1 | 3/2011 | Shuki |
| 2011/0134225 A1 | 6/2011 | Saint-Pierre |
| 2011/0199342 A1 | 8/2011 | Vartanian |
| 2011/0310028 A1 | 12/2011 | Camp, Jr. |
| 2012/0057733 A1 | 3/2012 | Morii |
| 2012/0063628 A1 | 3/2012 | Rizzello |
| 2012/0066280 A1 | 3/2012 | Tsutsui |
| 2012/0113223 A1 | 5/2012 | Hilliges |
| 2012/0223880 A1 | 9/2012 | Birnbaum |
| 2012/0229400 A1 | 9/2012 | Birnbaum |
| 2012/0229401 A1 | 9/2012 | Birnbaum |
| 2012/0236689 A1 | 9/2012 | Brown |
| 2012/0243374 A1 | 9/2012 | Dahl |
| 2012/0249409 A1 | 10/2012 | Toney |
| 2012/0249474 A1 | 10/2012 | Pratt |
| 2012/0299853 A1 | 11/2012 | Dagar |
| 2012/0307649 A1 | 12/2012 | Park |
| 2012/0315605 A1 | 12/2012 | Cho |
| 2013/0035582 A1 | 2/2013 | Radulescu |
| 2013/0079621 A1 | 3/2013 | Shoham |
| 2013/0094678 A1 | 4/2013 | Scholte |
| 2013/0100008 A1 | 4/2013 | Marti |
| 2013/0101141 A1 | 4/2013 | McElveen |
| 2013/0173658 A1 | 7/2013 | Adelman |
| 2013/0271397 A1 | 10/2013 | MacDougall |
| 2013/0331705 A1 | 12/2013 | Fraser |
| 2014/0027201 A1 | 1/2014 | Islam |
| 2014/0104274 A1 | 4/2014 | Hilliges |
| 2014/0139071 A1 | 5/2014 | Yamamoto |
| 2014/0168091 A1 | 6/2014 | Jones |
| 2014/0201666 A1 | 7/2014 | Bedikian |
| 2014/0204002 A1 | 7/2014 | Bennet |
| 2014/0265572 A1 | 9/2014 | Siedenburg |
| 2014/0267065 A1 | 9/2014 | Levesque |
| 2014/0269207 A1 | 9/2014 | Baym |
| 2014/0269208 A1 | 9/2014 | Baym |
| 2014/0269214 A1 | 9/2014 | Baym |
| 2014/0270305 A1 | 9/2014 | Baym |
| 2014/0306891 A1 | 10/2014 | Latta |
| 2014/0320436 A1 | 10/2014 | Modarres |
| 2014/0361988 A1 | 12/2014 | Katz |
| 2014/0369514 A1 | 12/2014 | Baym |
| 2015/0002477 A1 | 1/2015 | Cheatham, III |
| 2015/0002517 A1 | 1/2015 | Lee |
| 2015/0005039 A1 | 1/2015 | Liu |
| 2015/0006645 A1 | 1/2015 | Oh |
| 2015/0007025 A1 | 1/2015 | Sassi |
| 2015/0013023 A1 | 1/2015 | Wang |
| 2015/0019299 A1 | 1/2015 | Harvey |
| 2015/0022466 A1 | 1/2015 | Levesque |
| 2015/0029155 A1 | 1/2015 | Lee |
| 2015/0066445 A1 | 3/2015 | Lin |
| 2015/0070147 A1 | 3/2015 | Cruz-Hernandez |
| 2015/0070245 A1 | 3/2015 | Han |
| 2015/0078136 A1 | 3/2015 | Sun |
| 2015/0081110 A1 | 3/2015 | Houston |
| 2015/0084929 A1 | 3/2015 | Lee |
| 2015/0110310 A1 | 4/2015 | Minnaar |
| 2015/0130323 A1 | 5/2015 | Harris |
| 2015/0168205 A1 | 6/2015 | Lee |
| 2015/0187134 A1 | 7/2015 | Baecher |
| 2015/0192995 A1 | 7/2015 | Subramanian |
| 2015/0209564 A1 | 7/2015 | Lewin |
| 2015/0220199 A1 | 8/2015 | Wang |
| 2015/0226537 A1 | 8/2015 | Schorre |
| 2015/0226831 A1 | 8/2015 | Nakamura |
| 2015/0241393 A1 | 8/2015 | Ganti |
| 2015/0248787 A1 | 9/2015 | Abovitz |
| 2015/0258431 A1 | 9/2015 | Stafford |
| 2015/0277610 A1 | 10/2015 | Kim |
| 2015/0293592 A1 | 10/2015 | Cheong |
| 2015/0304789 A1 | 10/2015 | Babayoff |
| 2015/0309629 A1 | 10/2015 | Amariutei |
| 2015/0323667 A1 | 11/2015 | Przybyla |
| 2015/0331576 A1 | 11/2015 | Piya |
| 2015/0332075 A1 | 11/2015 | Burch |
| 2016/0019762 A1 | 1/2016 | Levesque |
| 2016/0019879 A1 | 1/2016 | Daley |
| 2016/0026253 A1 | 1/2016 | Bradski |
| 2016/0044417 A1 | 2/2016 | Clemen, Jr. |
| 2016/0124080 A1 | 5/2016 | Carter |
| 2016/0138986 A1 | 5/2016 | Carlin |
| 2016/0175701 A1 | 6/2016 | Froy |
| 2016/0175709 A1 | 6/2016 | Idris |
| 2016/0189702 A1 | 6/2016 | Blanc |
| 2016/0242724 A1 | 8/2016 | Lavallee |
| 2016/0246374 A1 | 8/2016 | Carter |
| 2016/0249150 A1* | 8/2016 | Carter ............... G08B 6/00 |
| 2016/0291716 A1 | 10/2016 | Boser |
| 2016/0306423 A1 | 10/2016 | Uttermann |
| 2016/0320843 A1 | 11/2016 | Long |
| 2016/0339132 A1 | 11/2016 | Cosman |
| 2016/0358477 A1 | 12/2016 | Ansari |
| 2016/0374562 A1 | 12/2016 | Vertikov |
| 2017/0002839 A1 | 1/2017 | Bukland |
| 2017/0004819 A1 | 1/2017 | Ochiai |
| 2017/0018171 A1 | 1/2017 | Carter |
| 2017/0024921 A1 | 1/2017 | Beeler |
| 2017/0052148 A1 | 2/2017 | Estevez |
| 2017/0123487 A1 | 5/2017 | Hazra |

(56) References Cited

U.S. PATENT DOCUMENTS

| | | |
|---|---|---|
| 2017/0123499 A1 | 5/2017 | Eid |
| 2017/0140552 A1 | 5/2017 | Woo |
| 2017/0144190 A1 | 5/2017 | Hoshi |
| 2017/0153707 A1 | 6/2017 | Subramanian |
| 2017/0168586 A1 | 6/2017 | Sinha |
| 2017/0181725 A1 | 6/2017 | Han |
| 2017/0193768 A1* | 7/2017 | Long .................. G06F 3/011 |
| 2017/0193823 A1 | 7/2017 | Jiang |
| 2017/0211022 A1 | 7/2017 | Reinke |
| 2017/0236506 A1 | 8/2017 | Przybyla |
| 2017/0249932 A1 | 8/2017 | Maxwell |
| 2017/0270356 A1 | 9/2017 | Sills |
| 2017/0279951 A1 | 9/2017 | Hwang |
| 2017/0336860 A1 | 11/2017 | Smoot |
| 2017/0366908 A1 | 12/2017 | Long |
| 2018/0018787 A1 | 1/2018 | Giancola |
| 2018/0035891 A1 | 2/2018 | Van Soest |
| 2018/0039333 A1 | 2/2018 | Carter |
| 2018/0047259 A1 | 2/2018 | Carter |
| 2018/0074580 A1 | 3/2018 | Hardee |
| 2018/0081439 A1 | 3/2018 | Daniels |
| 2018/0101234 A1 | 4/2018 | Carter |
| 2018/0139557 A1 | 5/2018 | Ochiai |
| 2018/0146306 A1 | 5/2018 | Benattar |
| 2018/0151035 A1 | 5/2018 | Maalouf |
| 2018/0166063 A1 | 6/2018 | Long |
| 2018/0181203 A1 | 6/2018 | Subramanian |
| 2018/0182372 A1 | 6/2018 | Tester |
| 2018/0190007 A1 | 7/2018 | Panteleev |
| 2018/0246576 A1 | 8/2018 | Long |
| 2018/0253627 A1 | 9/2018 | Baradel |
| 2018/0263708 A1 | 9/2018 | Kim |
| 2018/0267156 A1 | 9/2018 | Carter |
| 2018/0271494 A1 | 9/2018 | Cuscuna |
| 2018/0304310 A1 | 10/2018 | Long |
| 2018/0309515 A1 | 10/2018 | Murakowski |
| 2018/0310111 A1 | 10/2018 | Kappus |
| 2018/0350339 A1 | 12/2018 | Macours |
| 2018/0361174 A1 | 12/2018 | Radulescu |
| 2019/0001129 A1 | 1/2019 | Rosenbluth |
| 2019/0038496 A1 | 2/2019 | Levesque |
| 2019/0091565 A1 | 3/2019 | Nelson |
| 2019/0163275 A1 | 5/2019 | Iodice |
| 2019/0175077 A1 | 6/2019 | Zhang |
| 2019/0187244 A1 | 6/2019 | Riccardi |
| 2019/0196578 A1 | 6/2019 | Iodice |
| 2019/0196591 A1 | 6/2019 | Long |
| 2019/0197840 A1 | 6/2019 | Kappus |
| 2019/0197841 A1* | 6/2019 | Carter .................. H04R 1/40 |
| 2019/0197842 A1 | 6/2019 | Long |
| 2019/0204925 A1 | 7/2019 | Long |
| 2019/0206202 A1 | 7/2019 | Carter |
| 2019/0235628 A1 | 8/2019 | Lacroix |
| 2019/0257932 A1 | 8/2019 | Carter |
| 2019/0310710 A1 | 10/2019 | Deeley |
| 2019/0342654 A1 | 11/2019 | Buckland |
| 2020/0042091 A1 | 2/2020 | Long |
| 2020/0080776 A1 | 3/2020 | Kappus |
| 2020/0082221 A1 | 3/2020 | Tsai |
| 2020/0082804 A1 | 3/2020 | Kappus |
| 2020/0103974 A1 | 4/2020 | Carter |
| 2020/0117229 A1 | 4/2020 | Long |
| 2020/0117993 A1 | 4/2020 | Martinez-Canales |
| 2020/0193269 A1 | 6/2020 | Park |
| 2020/0218354 A1 | 7/2020 | Beattie |
| 2020/0257371 A1 | 8/2020 | Sung |
| 2020/0285888 A1 | 9/2020 | Borar |
| 2020/0294299 A1 | 9/2020 | Rigiroli |
| 2020/0302760 A1 | 9/2020 | Carter |
| 2020/0320347 A1 | 10/2020 | Nikolenko |
| 2020/0320351 A1 | 10/2020 | Nikolenko |
| 2020/0327418 A1 | 10/2020 | Lyons |
| 2020/0380832 A1 | 12/2020 | Carter |
| 2021/0037332 A1 | 2/2021 | Kappus |
| 2021/0043070 A1 | 2/2021 | Carter |
| 2021/0056693 A1 | 2/2021 | Cheng |
| 2021/0109712 A1 | 4/2021 | Long |
| 2021/0111731 A1 | 4/2021 | Long |
| 2021/0112353 A1 | 4/2021 | Kappus |
| 2021/0141458 A1 | 5/2021 | Sarafianou |
| 2021/0162457 A1 | 6/2021 | Ebefors |
| 2021/0165491 A1 | 6/2021 | Sun |
| 2021/0170447 A1 | 6/2021 | Buckland |
| 2021/0183215 A1 | 6/2021 | Carter |
| 2021/0201884 A1 | 7/2021 | Kappus |
| 2021/0225355 A1 | 7/2021 | Long |
| 2021/0275141 A1 | 9/2021 | Eckersley |
| 2021/0294419 A1 | 9/2021 | Lee |
| 2021/0303072 A1 | 9/2021 | Carter |
| 2021/0303758 A1 | 9/2021 | Long |
| 2021/0334706 A1 | 10/2021 | Yamaguchi |
| 2021/0381765 A1 | 12/2021 | Kappus |
| 2021/0397261 A1* | 12/2021 | Kappus ................ G10K 11/346 |
| 2022/0000447 A1 | 1/2022 | Eibl |
| 2022/0035479 A1 | 2/2022 | Lasater |
| 2022/0083142 A1 | 3/2022 | Brown |
| 2022/0095068 A1 | 3/2022 | Kappus |
| 2022/0113806 A1 | 4/2022 | Long |
| 2022/0155949 A1 | 5/2022 | Ring |
| 2022/0198892 A1 | 6/2022 | Carter |
| 2022/0236806 A1 | 7/2022 | Carter |
| 2022/0252550 A1 | 8/2022 | Catsis |
| 2022/0300028 A1 | 9/2022 | Long |
| 2022/0300070 A1 | 9/2022 | Iodice |
| 2022/0329250 A1 | 10/2022 | Long |
| 2022/0393095 A1 | 12/2022 | Chilles |
| 2023/0036123 A1 | 2/2023 | Long |
| 2023/0075917 A1 | 3/2023 | Pittera |
| 2023/0087395 A1 | 3/2023 | Borar |
| 2023/0117919 A1 | 4/2023 | Iodice |
| 2023/0124704 A1 | 4/2023 | Buckland |
| 2023/0141896 A1 | 5/2023 | Liu |
| 2023/0168228 A1 | 6/2023 | Kappus |
| 2023/0215248 A1 | 7/2023 | Lowther |
| 2023/0228857 A1 | 7/2023 | Carter |
| 2023/0251720 A1 | 8/2023 | Wren |
| 2023/0259213 A1 | 8/2023 | Long |
| 2023/0298444 A1 | 9/2023 | Kappus |
| 2023/0360504 A1 | 11/2023 | Kappus |
| 2023/0368771 A1 | 11/2023 | Kappus |
| 2023/0378966 A1 | 11/2023 | Long |
| 2024/0021072 A1 | 1/2024 | Carter |
| 2024/0036652 A1 | 2/2024 | Yamada |
| 2024/0056655 A1 | 2/2024 | Page |
| 2024/0069640 A1 | 2/2024 | Long |
| 2024/0095953 A1 | 3/2024 | Lyons |
| 2024/0096183 A1* | 3/2024 | Carter .................. G10K 15/04 |
| 2024/0129655 A1 | 4/2024 | Chilles |
| 2024/0135789 A1 | 4/2024 | Long |
| 2024/0157399 A1 | 5/2024 | Buckland |
| 2024/0231492 A1 | 7/2024 | Beattie |
| 2024/0265907 A1 | 8/2024 | Long |
| 2024/0288945 A1 | 8/2024 | Long |
| 2024/0296825 A1 | 9/2024 | Long |
| 2024/0402809 A1* | 12/2024 | Kappus ................ G10K 11/348 |
| 2024/0402996 A1 | 12/2024 | Long |
| 2024/0411374 A1 | 12/2024 | Wren |

FOREIGN PATENT DOCUMENTS

| | | | |
|---|---|---|---|
| CN | 101986787 | | 3/2011 |
| CN | 102459900 | | 5/2012 |
| CN | 102591512 | | 7/2012 |
| CN | 103797379 | | 5/2014 |
| CN | 103984414 A | | 8/2014 |
| CN | 107340871 A | | 11/2017 |
| CN | 107407969 A | | 11/2017 |
| CN | 107534810 A | | 1/2018 |
| CN | 108780642 A * | 11/2018 | ............ G01S 15/06 |
| CN | 116034422 A * | 4/2023 | ............ G06F 3/016 |
| EP | 0057594 A2 | | 8/1982 |
| EP | 309003 | | 3/1989 |
| EP | 0696670 A1 | | 2/1996 |
| EP | 1875081 A1 | | 1/2008 |

(56) References Cited

FOREIGN PATENT DOCUMENTS

| | | |
|---|---|---|
| EP | 1911530 | 4/2008 |
| EP | 2271129 A1 | 1/2011 |
| EP | 1461598 B1 | 4/2014 |
| EP | 3207817 A1 | 8/2017 |
| EP | 3216231 B1 | 8/2019 |
| EP | 3916525 | 12/2021 |
| GB | 2464117 | 4/2010 |
| GB | 2513884 A | 11/2014 |
| GB | 2530036 | 3/2016 |
| JP | 2008074075 | 4/2008 |
| JP | 2010109579 | 5/2010 |
| JP | 2011172074 | 9/2011 |
| JP | 2012048378 A | 3/2012 |
| JP | 5477736 B2 | 4/2014 |
| JP | 2015035657 A | 2/2015 |
| JP | 2016035646 | 3/2016 |
| JP | 2017168086 | 9/2017 |
| JP | 6239796 | 11/2017 |
| KR | 20120065779 | 6/2012 |
| KR | 20130055972 | 5/2013 |
| KR | 1020130055972 | 5/2013 |
| KR | 20160008280 | 1/2016 |
| KR | 20200082449 A | 7/2020 |
| TW | 201308837 | 2/2013 |
| WO | 9118486 | 11/1991 |
| WO | 9639754 | 12/1996 |
| WO | 03050511 A | 6/2003 |
| WO | 2005017965 | 2/2005 |
| WO | 2007144801 A2 | 12/2007 |
| WO | 2009071746 A1 | 6/2009 |
| WO | 2009112866 | 9/2009 |
| WO | 2010003836 | 1/2010 |
| WO | 2010139916 | 12/2010 |
| WO | 2011132012 A1 | 10/2011 |
| WO | 2012023864 | 2/2012 |
| WO | 2012104648 A1 | 8/2012 |
| WO | 2013179179 | 12/2013 |
| WO | 2014181084 A1 | 11/2014 |
| WO | 2015006467 | 1/2015 |
| WO | 2015039622 | 3/2015 |
| WO | 2015127335 | 8/2015 |
| WO | 2015194510 | 12/2015 |
| WO | 2016007920 | 1/2016 |
| WO | 2016073936 | 5/2016 |
| WO | 2016095033 A1 | 6/2016 |
| WO | 2016099279 | 6/2016 |
| WO | 2016132141 | 8/2016 |
| WO | 2016132144 | 8/2016 |
| WO | 2016137675 | 9/2016 |
| WO | 2016162058 | 10/2016 |
| WO | 2016171651 | 10/2016 |
| WO | 2017172006 | 10/2017 |
| WO | 2018000731 A1 | 1/2018 |
| WO | 2018109466 A1 | 6/2018 |
| WO | 2018168562 A1 | 9/2018 |
| WO | 2019190894 | 10/2019 |
| WO | 2020049321 A2 | 3/2020 |
| WO | 2021130505 A1 | 7/2021 |
| WO | 2021262343 | 12/2021 |
| WO | WO-2021260373 A1 * 12/2021 ............. G06F 3/016 |

OTHER PUBLICATIONS

Office Action dated Apr. 8, 2020, for U.S. Appl. No. 16/198,959 (pp. 1-17).
Office Action dated Apr. 16, 2020 for U.S. Appl. No. 15/839,184 (pp. 1-8).
Office Action dated Apr. 17, 2020 for U.S. Appl. No. 16/401,148 (pp. 1-15).
Office Action dated Apr. 18, 2019 for U.S. Appl. No. 16/296,127 (pags 1-6).
Office Action dated Apr. 28, 2020 for U.S. Appl. No. 15/396,851 (pp. 1-12).
Office Action dated Apr. 29, 2020 for U.S. Appl. No. 16/374,301 (pp. 1-18).
Office Action dated Apr. 4, 2019 for U.S. Appl. No. 15/897,804 (pp. 1-10).
Office Action dated Aug. 10, 2021 for U.S. Appl. No. 16/564,016 (pp. 1-14).
Office Action dated Aug. 19, 2021 for U.S. Appl. No. 17/170,841 (pp. 1-9).
Office Action dated Aug. 22, 2019 for U.S. Appl. No. 16/160,862 (pp. 1-5).
Office Action dated Aug. 9, 2021 for U.S. Appl. No. 17/068,825 (pp. 1-9).
Office Action dated Dec. 11, 2019 for U.S. Appl. No. 15/959,266 (pp. 1-15).
Office Action dated Dec. 7, 2020 for U.S. Appl. No. 16/563,608 (pp. 1-8).
Office Action dated Feb. 20, 2019 for U.S. Appl. No. 15/623,516 (pp. 1-8).
Office Action dated Feb. 25, 2020 for U.S. Appl. No. 15/960,113 (pp. 1-7).
Office Action dated Feb. 7, 2020 for U.S. Appl. No. 16/159,695 (pp. 1-8).
Office Action dated Jan. 10, 2020 for U.S. Appl. No. 16/228,767 (pp. 1-6).
Office Action dated Jan. 29, 2020 for U.S. Appl. No. 16/198,959 (p. 1-6).
Office Action dated Jul. 10, 2019 for U.S. Appl. No. 15/210,661 (pp. 1-12).
Office Action dated Jul. 26, 2019 for U.S. Appl. No. 16/159,695 (pp. 1-8).
Office Action dated Jul. 9, 2020 for U.S. Appl. No. 16/228,760 (pp. 1-17).
Office Action dated Jun. 19, 2020 for U.S. Appl. No. 16/699,629 (pp. 1-12).
Office Action dated Jun. 25, 2020 for U.S. Appl. No. 16/228,767 (pp. 1-27).
Office Action dated Jun. 25, 2021 for U.S. Appl. No. 16/899,720 (pp. 1-5).
Office Action dated Mar. 11, 2021 for U.S. Appl. No. 16/228,767 (pp. 1-23).
Office Action dated Mar. 20, 2020 for U.S. Appl. No. 15/210,661 (pp. 1-10).
Office Action dated Mar. 31, 2021 for U.S. Appl. No. 16/228,760 (pp. 1-21).
Office Action dated May 13, 2021 for U.S. Appl. No. 16/600,500 (pp. 1-9).
Office Action dated May 14, 2021 for U.S. Appl. No. 16/198,959 (pp. 1-6).
Office Action dated May 16, 2019 for U.S. Appl. No. 15/396,851 (pp. 1-7).
Office Action dated May 18, 2020 for U.S. Appl. No. 15/960,113 (pp. 1-21).
Office Action dated Oct. 17, 2019 for U.S. Appl. No. 15/897,804 (pp. 1-10).
Office Action dated Oct. 29, 2021 for U.S. Appl. No. 16/198,959 (pp. 1-7).
Office Action dated Oct. 31, 2019 for U.S. Appl. No. 15/671,107 (pp. 1-6).
Office Action dated Oct. 7, 2019 for U.S. Appl. No. 15/396,851 (pp. 1-9).
Office Action dated Sep. 16, 2021 for U.S. Appl. No. 16/600,496 (pp. 1-8).
Office Action dated Sep. 18, 2020 for U.S. Appl. No. 15/396,851 (pp. 1-14).
Office Action dated Sep. 21, 2020 for U.S. Appl. No. 16/198,959 (pp. 1-17).
Office Action dated Sep. 24, 2021 for U.S. Appl. No. 17/080,840 (pp. 1-9).
OGRECave/ogre—GitHub: ogre/Samples/Media/materials at 7de80a7483f20b50f2b10d7ac6de9d9c6c87d364, Mar. 26, 2020, 1 page.

(56) References Cited

OTHER PUBLICATIONS

Oikonomidis et al., "Efficient model-based 3D tracking of hand articulations using Kinect." In BmVC, vol. 1, No. 2, p. 3. 2011. (Year: 2011).
Optimal regularisation for acoustic source reconstruction by inverse methods, Y. Kim, P.A. Nelson, Institute of Sound and Vibration Research, University of Southampton, Southampton, SO17 1BJ, UK Received Feb. 25, 2003; 25 pages.
Oscar Martínez-Graullera et al., "2D array design based on Fermat spiral for ultrasound imaging", ULTRASONICS, (Feb. 1, 2010), vol. 50, No. 2, Issn 0041-624X, pp. 280-289, XP055210119.
Oyama et al., "Inverse kinematics learning for robotic arms with fewer degrees of freedom by modular neural network systems," 2005 IEEE/RSJ International Conference on Intelligent Robots and Systems, Edmonton, Alta., 2005, pp. 1791-1798, doi: 10.1109/IROS.2005.1545084. (Year: 2005).
Papoulis, A. (1977). Signal Analysis. The University of Michigan: McGraw-Hill, pp. 92-93.
Partial International Search Report for Application No. PCT/GB2018/053735, date of mailing Apr. 12, 2019, 14 pages.
Partial ISR for Application No. PCT/GB2020/050013 dated May 19, 2020 (16 pages).
Partial ISR for PCT/GB2023/050001 (Mar. 31, 2023) 13 pages.
Patricio Rodrigues, E., Francisco de Oliveira, T., Yassunori Matuda, M., & Buiochi, F. (Sep. 2019). Design and Construction of a 2-D Phased Array Ultrasonic Transducer for Coupling in Water. In INTER-NOISE and NOISE-CON Congress and Conference Proceedings (vol. 259, No. 4, pp. 5720-5731). Institute of Noise Control Engineering.
"Flexible piezoelectric transducer for ultrasonic inspection of non-planar components." Ultrasonics 48.5 (2008): 367-375.
"Welcome to Project Soli" video, https://atap.google.com/#project-soli Accessed Nov. 30, 2018, 2 pages.
A. B. Vallbo, Receptive field characteristics of tactile units with myelinated afferents in hairy skin of human subjects, Journal of Physiology (1995), 483.3, pp. 783-795.
A. Sand, Head-Mounted Display with Mid-Air Tactile Feedback, Proceedings of the 21st ACM Symposium on Virtual Reality Software and Technology, Nov. 13-15, 2015 (8 pages).
Aksel Sveier et al.,Pose Estimation with Dual Quaternions and Iterative Closest Point, 2018 Annual American Control Conference (ACC) (8 pages).
Al-Mashhadany, "Inverse Kinematics Problem (IKP) of 6-DOF Manipulator By Locally Recurrent Neural Networks (LRNNs)," Management and Service Science (MASS), International Conference on Management and Service Science., IEEE, Aug. 24, 2010, 5 pages. (Year: 2010).
Alexander, J. et al. (2011), Adding Haptic Feedback to Mobile TV (6 pages).
Almusawi et al., "A new artificial neural network approach in solving inverse kinematics of robotic arm (denso vp6242). " Computational intelligence and neuroscience 2016 (2016). (Year: 2016) 11 pages.
Amanda Zimmerman, The gentle touch receptors of mammalian skin, Science, Nov. 21, 2014, vol. 346 Issue 6212, p. 950.
Andre J. Duerinckx, Matched gaussian apodization of pulsed acoustic phased arrays, Ultrasonic Imaging, vol. 2, Issue 4, Oct. 1980, pp. 338-369.
Anonymous: "How does Ultrahaptics technology work?—Ultrahaptics Developer Information", Jul. 31, 2018 (Jul. 31, 2018), XP055839320, Retrieved from the Internet: URL:https://developer.ultrahaptics.com/knowledgebase/haptics-overview/ [retrieved on Sep. 8, 2021].
Aoki et al., Sound location of stero reproduction with parametric loudspeakers, Applied Acoustics 73 (2012) 1289-1295 (7 pages).
Ashish Shrivastava et al., Learning from Simulated and Unsupervised Images through Adversarial Training, Jul. 19, 2017, pp. 1-16.
Azad et al., Deep domain adaptation under deep label scarcity. arXiv preprint arXiv: 1809.08097 (2018) (Year: 2018) 10 pages.

Bajard et al., BKM: A New Hardware Algorithm for Complex Elementary Functions, 8092 IEEE Transactions on Computers 43 (1994) (9 pages).
Bajard et al., Evaluation of Complex Elementary Functions / A New Version of BKM, SPIE Conference on Advanced Signal Processing, Jul. 1999 (8 pages).
Benjamin Long et al., "Rendering volumetric haptic shapes in mid-air using ultrasound", ACM Transactions on Graphics (TOG), ACM, US, (Nov. 19, 2014), vol. 33, No. 6, ISSN 0730-0301, pp. 1-10.
Beranek, L., & Mellow, T. (2019). Acoustics: Sound Fields, Transducers and Vibration. Academic Press, 3 pages.
Bortoff et al., Pseudolinearization of the Acrobot using Spline Functions, IEEE Proceedings of the 31st Conference on Decision and Control, Sep. 10, 1992 (6 pages).
Boureau et al., "A theoretical analysis of feature pooling in visual recognition." In Proceedings of the 27th international conference on machine learning (ICML-10), pp. 111-118. 2010. (Year: 2010).
Bożena Smagowska & Małgorzata Pawlaczyk-Łuszczyńska (2013) Effects of Ultrasonic Noise on the Human Body—A Bibliographic Review, International Journal of Occupational Safety and Ergonomics, 19:2, 195-202.
Brian Kappus and Ben Long, Spatiotemporal Modulation for Mid-Air Haptic Feedback from an Ultrasonic Phased Array, ICSV25, Hiroshima, Jul. 8-12, 2018, 6 pages.
Bybi, A., Grondel, S., Mzerd, A., Granger, C., Garoum, M., & Assaad, J. (2019). Investigation of cross-coupling in piezoelectric transducer arrays and correction. International Journal of Engineering and Technology Innovation, 9(4), 287.
Canada Application 2,909,804 Office Action dated Oct. 18, 2019, 4 pages.
Cappellari et al., "Identifying Electromyography Sensor Placement using Dense Neural Networks." In DATA, pp. 130-141. 2018. ( Year: 2018).
Casper et al., Realtime Control of Multiple-focus Phased Array Heating Patterns Based on Noninvasive Ultrasound Thermography, IEEE Trans Biomed Eng. Jan. 2012; 59(1): 95-105.
Certon, D., Felix, N., Hue, P. T. H., Patat, F., & Lethiecq, M. (Oct. 1999). Evaluation of laser probe performances for measuring cross-coupling in 1-3 piezocomposite arrays. In 1999 IEEE Ultrasonics Symposium. Proceedings. International Symposium (Cat. No. 99CH37027) (vol. 2, pp. 1091-1094).
Certon, D., Felix, N., Lacaze, E., Teston, F., & Patat, F. (2001). Investigation of cross-coupling in 1-3 piezocomposite arrays. IEEE transactions on ultrasonics, ferroelectrics, and frequency control, 48(1), 85-92.
Chang Suk Lee et al., An electrically switchable visible to infra-red dual frequency cholesteric liquid crystal light shutter, J. Mater. Chem. C, 2018, 6, 4243 (7 pages).
Christoper M. Bishop, Pattern Recognition and Machine Learning, 2006, pp. 1-758.
Colgan, A., "How Does the Leap Motion Controller Work?" Leap Motion, Aug. 9, 2014, 10 pages.
Communication Pursuant to Article 94(3) EPC for EP 19723179.8 (Feb. 15, 2022), 10 pages.
Corrected Notice of Allowability dated Aug. 9, 2021 for U.S. Appl. No. 15/396,851 (pp. 1-6).
Corrected Notice of Allowability dated Jan. 14, 2021 for U.S. Appl. No. 15/897,804 (pp. 1-2).
Corrected Notice of Allowability dated Jun. 21, 2019 for U.S. Appl. No. 15/966,213 (2 pages).
Corrected Notice of Allowability dated Nov. 24, 2021 for U.S. Appl. No. 16/600,500 (pp. 1-5).
Corrected Notice of Allowability dated Oct. 31, 2019 for U.S. Appl. No. 15/623,516 (pp. 1-2).
Damn Geeky, "Virtual projection keyboard technology with haptic feedback on palm of your hand," May 30, 2013, 4 pages.
David Joseph Tan et al., Fits like a Glove: Rapid and Reliable Hand Shape Personalization, 2016 IEEE Conference on Computer Vision and Pattern Recognition, pp. 5610-5619.
Definition of "Interferometry"according to Wikipedia, 25 pages., Retrieved Nov. 2018.

(56) References Cited

OTHER PUBLICATIONS

Definition of "Multilateration" according to Wikipedia, 7 pages., Retrieved Nov. 2018.
Definition of "Trilateration"according to Wikipedia, 2 pages., Retrieved Nov. 2018.
Der et al., Inverse kinematics for reduced deformable models. ACM Transactions on graphics (TOG) 25, No. 3 (2006): 1174-1179. (Year: 2006).
DeSilets, C. S. (1978). Transducer arrays suitable for acoustic imaging (No. GL-2833). Stanford Univ CA Edward L Ginzton Lab of Physics. 5 pages.
Diederik P. Kingma et al., Adam: A Method for Stochastic Optimization, Jan. 30, 2017, pp. 1-15.
Duka, "Neural network based inverse kinematics solution for trajectory tracking of a robotic arm." Procedia Technology 12 (2014) 20-27. (Year: 2014).
E. Bok, Metasurface for Water-to-Air Sound Transmission, Physical Review Letters 120, 044302 (2018) (6 pages).
E.S. Ebbini et al. (1991), A spherical-section ultrasound phased array applicator for deep localized hyperthermia, Biomedical Engineering, IEEE Transactions on (vol. 38 Issue: 7), pp. 634-643.
EPO 21186570.4 Extended Search Report dated Oct. 29, 2021, 10 pages.
EPO Application 18 725 358.8 Examination Report Dated Sep. 22, 2021, 15 pages.
Mueller, GANerated Hands for Real-Time 3D Hand Tracking from Monocular RGB, Eye in-Painting with Exemplar Generative Adversarial Networks, pp. 49-59 (Jun. 1, 2018).
Nina Gaissert, Christian Wallraven, and Heinrich H. Bulthoff, "Visual and Haptic Perceptual Spaces Show High Similarity in Humans ", published to Journal of Vision in 2010, available at http://www.journalofvision.org/content/10/11/2 and retrieved on Apr. 22, 2020 ( Year: 2010), 20 pages.
Notice of Allowance dated Feb. 23, 2023 for U.S. Appl. No. 18/060,556 (pp. 1-10).
Notice of Allowance dated Apr. 20, 2021 for U.S. Appl. No. 16/563,608 (pp. 1-5).
Notice of Allowance dated Apr. 22, 2020 for U.S. Appl. No. 15/671,107 (pp. 1-5).
Notice of Allowance dated Dec. 19, 2018 for U.S. Appl. No. 15/665,629 (pp. 1-9).
Notice of Allowance dated Dec. 21, 2018 for U.S. Appl. No. 15/983,864 (pp. 1-7).
Notice of Allowance dated Feb. 10, 2020, for U.S. Appl. No. 16/160,862 (pp. 1-9).
Notice of Allowance dated Feb. 7, 2019 for U.S. Appl. No. 15/851,214 (pp. 1-7).
Notice of Allowance dated Jul. 22, 2021 for U.S. Appl. No. 16/600,500 (pp. 1-9).
Notice of Allowance dated Jul. 31, 2019 for U.S. Appl. No. 15/851,214 (pp. 1-9).
Notice of Allowance dated Jul. 31, 2019 for U.S. Appl. No. 16/296,127 (pp. 1-9).
Notice of Allowance dated Jun. 10, 2021 for U.S. Appl. No. 17/092,333 (pp. 1-9).
Notice of Allowance dated Jun. 17, 2020 for U.S. Appl. No. 15/210,661 (pp. 1-9).
Notice of Allowance dated Jun. 25, 2021 for U.S. Appl. No. 15/396,851 (pp. 1-10).
Notice of Allowance dated May 30, 2019 for U.S. Appl. No. 15/966,213 (pp. 1-9).
Notice of Allowance dated Nov. 5, 2021 for U.S. Appl. No. 16/899,720 (pp. 1-9).
Notice of Allowance dated Oct. 1, 2020 for U.S. Appl. No. 15/897,804 (pp. 1-9).
Notice of Allowance dated Oct. 16, 2020 for U.S. Appl. No. 16/159,695 (pp. 1-7).
Notice of Allowance dated Oct. 30, 2020 for U.S. Appl. No. 15/839,184 (pp. 1-9).
Notice of Allowance dated Oct. 6, 2020 for U.S. Appl. No. 16/699,629 (pp. 1-8).
Notice of Allowance dated Sep. 30, 2020 for U.S. Appl. No. 16/401,148 (pp. 1-10).
Notice of Allowance in U.S. Appl. No. 15/210,661 dated Jun. 17, 2020 (22 pages).
Nuttall, A. (Feb. 1981). Some windows with very good sidelobe behavior. IEEE Transactions on Acoustics, Speech, and Signal Processing. 8 pages.
Obrist et al., Emotions Mediated Through Mid-Air Haptics, CHI 2015, Apr. 18-23, 2015, Seoul, Republic of Korea. (10 pages).
Obrist et al., Talking about Tactile Experiences, CHI 2013, Apr. 27-May 2, 2013 (10 pages).
Office Action (Ex Parte Quayle Action) dated Jan. 6, 2023 for U.S. Appl. No. 17/195,795 (pp. 1-6).
Office Action (Ex Parte Quayle Action) dated Jul. 20, 2023 for U.S. Appl. No. 16/843,281 (pp. 1-15).
Office Action (Ex Parte Quayle Action) dated Sep. 18, 2023 for U.S. Appl. No. 18/066,267 (pp. 1-6).
Office Action (Final Rejection) dated Jan. 9, 2023 for U.S. Appl. No. 16/144,474 (pp. 1-16).
Office Action (Final Rejection) dated Mar. 14, 2022 for U.S. Appl. No. 16/564,016 (pp. 1-12).
Office Action (Final Rejection) dated Mar. 21, 2023 for U.S. Appl. No. 16/995,819 (pp. 1-7).
Office Action (Final Rejection) dated Jul. 25, 2023 for U.S. Appl. No. 17/454,823 (pp. 1-17).
Office Action (Final Rejection) dated Aug. 30, 2023 for U.S. Appl. No. 16/564,016 (pp. 1-15).
Office Action (Final Rejection) dated Sep. 16, 2022 for U.S. Appl. No. 16/404,660 (pp. 1-6).
Office Action (Final Rejection) dated Nov. 18, 2022 for U.S. Appl. No. 16/228,767 (pp. 1-27).
Office Action (Final Rejection) dated Nov. 18, 2022 for U.S. Appl. No. 17/068,831 (pp. 1-9).
Office Action (Final Rejection) dated Dec. 8, 2022 for U.S. Appl. No. 16/229,091 (pp. 1-9).
Office Action (Final Rejection) dated Dec. 15, 2022 for U.S. Appl. No. 16/843,281 (pp. 1-25).
Office Action (Non-Final Rejection) dated Jan. 21, 2022 for U.S. Appl. No. 17/068,834 (pp. 1-12).
Office Action (Non-Final Rejection) dated Jan. 24, 2022 for U.S. Appl. No. 16/228,767 (pp. 1-22).
Office Action (Non-Final Rejection) dated Mar. 1, 2023 for U.S. Appl. No. 16/564,016 (pp. 1-10).
Office Action (Non-Final Rejection) dated Mar. 4, 2022 for U.S. Appl. No. 16/404,660 (pp. 1-5).
Office Action (Non-Final Rejection) dated Mar. 15, 2022 for U.S. Appl. No. 16/144,474 (pp. 1-13).
Office Action (Non-Final Rejection) dated Mar. 22, 2023 for U.S. Appl. No. 17/354,636 (pp. 1-5).
Office Action (Non-Final Rejection) dated Apr. 1, 2022 for U.S. Appl. No. 16/229,091 (pp. 1-10).
Office Action (Non-Final Rejection) dated Apr. 19, 2023 for U.S. Appl. No. 18/066,267 (pp. 1-11).
Office Action (Non-Final Rejection) dated Apr. 27, 2023 for U.S. Appl. No. 16/229,091 (pp. 1-5).
Office Action (Non-Final Rejection) dated May 2, 2022 for U.S. Appl. No. 17/068,831 (pp. 1-10).
Office Action (Non-Final Rejection) dated May 8, 2023 for U.S. Appl. No. 18/065,603 (pp. 1-17).
Uta Sailer, How Sensory and Affective Attributes Describe Touch Targeting C-Tactile Fibers, Experimental Psychology (2020), 67(4), 224-236.
Vincent Lepetit et al., Model Based Augmentation and Testing of an Annotated Hand Pose Dataset, ResearchGate, https://www.researchgate.net/publication/307910344, Sep. 2016, 13 pages.
Walter, S., Nieweglowski, K., Rebenklau, L., Wolter, K. J., Lamek, B., Schubert, F., . . . & Meyendorf, N. (May 2008). Manufacturing and electrical interconnection of piezoelectric 1-3 composite materials for phased array ultrasonic transducers. In 2008 31st International Spring Seminar on Electronics Technology (pp. 255-260).

(56) References Cited

OTHER PUBLICATIONS

Wang et al., Few-shot adaptive faster r-cnn. In Proceedings of the IEEE/CVF Conference on Computer Vision and Pattern Recognition, pp. 7173-7182. 2019. (Year: 2019).
Wang et al., Device-Free Gesture Tracking Using Acoustic Signals, ACM MobiCom '16, pp. 82-94 (13 pages).
Wilson et al., Perception of Ultrasonic Haptic Feedback on the Hand: Localisation and Apparent Motion, CHI 2014, Apr. 26-May 1, 2014, Toronto, Ontario, Canada. (10 pages).
Wooh et al., "Optimum beam steering of linear phased arays," Wave Motion 29 (1999) pp. 245-265, 21 pages.
Xin Cheng et al, "Computation of the acoustic radiation force on a sphere based on the 3-D FDTD method", Piezoelectricity, Acoustic Waves and Device Applications (SPAWDA), 2010 Symposium on, IEEE, (Dec. 10, 2010), ISBN 978-1-4244-9822-2, pp. 236-239.
Xu Hongyi et al., "6-DoF Haptic Rendering Using Continuous Collision Detection between Points and Signed Distance Fields", IEEE Transactions on Haptics, IEEE, USA, vol. 10, No. 2, ISSN 1939-1412, (Sep. 27, 2016), pp. 151-161, (Jun. 16, 2017).
Yang Ling et al., "Phase-coded approach for controllable generation of acoustical vortices", Journal of Applied Physics, American Institute of Physics, US, vol. 113, No. 15, ISSN 0021-8979, (Apr. 21, 2013), pp. 154904-154904.
Yarin Gal et al., Dropout as a Bayesian Approximation: Representing Model Uncertainty in Deep Learning, Oct. 4, 2016, pp. 1-12, Proceedings of the 33rd International Conference on Machine Learning, New York, NY, USA, 2016, JMLR: W&CP vol. 48.
Yaroslav Ganin et al., Domain-Adversarial Training of Neural Networks, Journal of Machine Learning Research 17 (2016) 1-35, submitted May 2015; published Apr. 2016.
Yaroslav Ganin et al., Unsupervised Domain Adaptataion by Backpropagation, Skolkovo Institute of Science and Technology (Skoltech), Moscow Region, Russia, Proceedings of the 32nd International Conference on Machine Learning, Lille, France, 2015, JMLR: W&CP vol. 37, copyright 2015 by the author(s), 11 pages.
Yoshino, K. and Shinoda, H. (2013), "Visio Acoustic Screen for Contactless Touch Interface with Tactile Sensation", University of Tokyo (5 pages).
Zeng, Wejun, "Microsoft Kinect Sensor and Its Effect," IEEE Multimedia, Apr.-Jun. 2012, 7 pages.
EPO Communication for Application 18 811 906.9 (Nov. 29, 2021) (15 pages).
EPO Examination Report 17 748 4656.4 (Jan. 12, 2021) (16 pages).
EPO Examination Report for EP19769198.3 (Jul. 11, 2023).
EPO Examination Search Report 17 702 910.5 (Jun. 23, 2021) 10 pages.
EPO ISR and WO for PCT/GB2022/050204 (Apr. 7, 2022) (15 pages).
EPO Office Action for EP16708440.9 dated Sep. 12, 2018 (7 pages).
EPSRC Grant summary EP/J004448/1 (2011) (1 page).
Eric Tzeng et al., Adversarial Discriminative Domain Adaptation, Feb. 17, 2017, pp. 1-10.
European Office Action for Application No. EP16750992.6, dated Oct. 2, 2019, 3 pages.
Ex Parte Quayle Action dated Dec. 28, 2018 for U.S. Appl. No. 15/966,213 (pp. 1-7).
Extended European Search Report for Application No. EP19169929.7, dated Aug. 6, 2019, 7 pages.
Freeman et al., Tactile Feedback for Above-Device Gesture Interfaces: Adding Touch to Touchless Interactions ICMI'14, Nov. 12-16, 2014, Istanbul, Turkey (8 pages).
Gareth Young et al.. Designing Mid-Air Haptic Gesture Controlled User Interfaces for Cars, PACM on Human-Computer Interactions, Jun. 2020 (24 pages).
Gavrilov L R et al.(2000) "A theoretical assessment of the relative performance of spherical phased arrays for ultrasound surgery" Ultrasonics, Ferroelectrics, and Frequency Control, IEEE Transactions on (vol. 47, Issue: 1), pp. 125-139.
Gavrilov, L.R. (2008) "The Possibility of Generating Focal Regions of Complex Configurations in Application to the Problems of Stimulation of Human Receptor Structures by Focused Ultrasound" Acoustical Physics, vol. 54, No. 2, pp. 269-278.
Georgiou et al., Haptic In-Vehicle Gesture Controls, Adjunct Proceedings of the 9th International ACM Conference on Automotive User Interfaces and Interactive Vehicular Applications (AutomotiveUI '17), Sep. 24-27, 2017 (6 pages).
GitHub—danfis/libccd: Library for collision detection between two convex shapes, Mar. 26, 2020, pp. 1-6.
GitHub—IntelRealSense/hand_tracking_samples: researc codebase for depth-based hand pose estimation using dynamics based tracking and CNNs, Mar. 26, 2020, 3 pages.
Gokturk, et al., "A Time-of-Flight Depth Sensor-System Description, Issues and Solutions," Published in: 2004 Conference on Computer Vision and Pattern Recognition Workshop, Date of Conference: Jun. 27-Jul. 2, 2004, 9 pages.
Guez, "Solution to the inverse kinematic problem in robotics by neural networks." In Proceedings of the 2nd International Conference on Neural Networks, 1988. San Diego, California. (Year: 1988) 8 pages.
Hasegawa, K. and Shinoda, H. (2013) "Aerial Display of Vibrotactile Sensation with High Spatial-Temporal Resolution using Large Aperture Airbourne Ultrasound Phased Array", University of Tokyo (6 pages).
Henneberg, J., Gerlach, A., Storck, H., Cebulla, H., & Marburg, S. (2018). Reducing mechanical cross-coupling in phased array transducers using stop band material as backing. Journal of Sound and Vibration, 424, 352-364.
Henrik Bruus, Acoustofluidics 2: Perturbation theory and ultrasound resonance modes, Lab Chip, 2012, 12, 20-28.
Hilleges et al. Interactions in the air: adding further depth to interactive tabletops, UIST '09: Proceedings of the 22nd annual ACM symposium on User interface software and technologyOctober 2009 pp. 139-148.
Hoshi et al., Tactile Presentation by Airborne Ultrasonic Oscillator Array, Proceedings of Robotics and Mechatronics Lecture 2009, Japan Society of Mechanical Engineers; May 24, 2009 (5 pages).
Hoshi T et al., "Noncontact Tactile Display Based on Radiation Pressure of Airborne Ultrasound", IEEE Transactions on Haptics, IEEE, USA, (Jul. 1, 2010), vol. 3, No. 3, ISSN 1939-1412, pp. 155-165.
Hoshi, T., Development of Aerial-Input and Aerial-Tactile-Feedback System, IEEE World Haptics Conference 2011, p. 569-573.
Hoshi, T., Handwriting Transmission System Using Noncontact Tactile Display, IEEE Haptics Symposium 2012 pp. 399-401.
Hoshi, T., Non-contact Tactile Sensation Synthesized by Ultrasound Transducers, Third Joint Euro haptics Conference and Symposium on Haptic Interfaces for Virtual Environment and Teleoperator Systems 2009 (5 pages).
Hoshi, T., Touchable Holography, SIGGRAPH 2009, New Orleans, Louisiana, Aug. 3-7, 2009. (1 page).
https://radiopaedia.org/articles/physical-principles-of-ultrasound-1?lang=GB (Accessed May 29, 2022).
Hua J, Qin H., Haptics-based dynamic implicit solid modeling, IEEE Trans Vis Comput Graph. Sep.-Oct. 2004;10 (5):574-86.
Hyunjae Gil, Whiskers: Exploring the Use of Ultrasonic Haptic Cues on the Face, CHI 2018, Apr. 21-26, 2018, Montréal, QC, Canada, 13 pages.
Iddan, et al., "3D Imaging in the Studio (And Elsewhwere . . . " Apr. 2001, 3DV systems Ltd., Yokneam, Isreal, www.3dvsystems.com.il, 9 pages.
Imaginary Phone: Learning Imaginary Interfaces by Transferring Spatial Memory From a Familiar Device Sean Gustafson, Christian Holz and Patrick Baudisch. UIST 2011. (10 pages).
IN 202047026493 Office Action dated Mar. 8, 2022, 6 pages.
India Morrison, The skin as a social organ, Exp Brain Res (2010) 204:305-314.
International Preliminary Report on Patentability and Written Opinion issued in corresponding PCT/US2017/035009, dated Dec. 4, 2018, 8 pages.
International Preliminary Report on Patentability for Application No. PCT/EP2017/069569 dated Feb. 5, 2019, 11 pages.

(56) References Cited

OTHER PUBLICATIONS

International Search Report and Written Opinion for App. No. PCT/GB2021/051590, dated Nov. 11, 2021, 20 pages.
International Search Report and Written Opinion for Application No. PCT/GB2018/053738, date of mailing Apr. 11, 2019, 14 pages.
International Search Report and Written Opinion for Application No. PCT/GB2018/053739, date of mailing Jun. 4, 2019, 16 pages.
International Search Report and Written Opinion for Application No. PCT/GB2019/050969, date of mailing Jun. 13, 2019, 15 pages.
International Search Report and Written Opinion for Application No. PCT/GB2019/051223, date of mailing Aug. 8, 2019, 15 pages.
International Search Report and Written Opinion for Application No. PCT/GB2019/052510, date of mailing Jan. 14, 2020, 25 pages.
Invitation to Pay Additional Fees for PCT/GB2022/051821 (Oct. 20, 2022), 15 pages.
ISR & WO for PCT/GB2020/052545 (Jan. 27, 2021) 14 pages.
ISR & WO For PCT/GB2021/052946, 15 pages.
ISR & WO for PCT/GB2022/051388 (Aug. 30, 2022) (15 pages).
ISR and WO for PCT/GB2020/050013 (Jul. 13, 2020) (20 pages).
Examination Report for EP 17 826 539.3 (Aug. 2, 2023) (5 pages).
First Examination report for ndian Patent Application No. 202247024128 (Aug. 11, 2023) (6 pages).
IL OA for IL 278402 (Nov. 29, 2023) 4 pages.
Inoue, A Pinchable Aerial Virtual Sphere by Acoustic Ultrasound Stationary Wave, IEEE (Year: 2014) 4 pages.
ISR and WO for PCT/GB2023/052122 (Oct. 18, 2023) 13 pages.
ISR and WO for PCT/GB2023/052612 (Mar. 7, 2024) 18 pages.
Ochiai, Cross-Field Aerial Haptics: Rendering Haptic Feedback in Air with Light and Acoustic Fields, CHI (Year: 2016) 10 pages.
Office Action (Non-Final Rejection) dated Jan. 19, 2024 for U.S. Appl. No. 18/305,354 (pp. 1-4).
Office Action (Non-Final Rejection) dated Feb. 1, 2024 for U.S. Appl. No. 17/835,411 (pp. 1-7).
Office Action (Non-Final Rejection) dated Mar. 14, 2024 for U.S. Appl. No. 18/188,584 (pp. 1-5).
Office Action (Non-Final Rejection) dated Mar. 28, 2024 for U.S. Appl. No. 18/359,951 (pp. 1-5).
Office Action (Notice of Allowance and Fees Due (PTOL-85)) dated Jan. 31, 2024 for U.S. Appl. No. 18/352,981 (pp. 1-6).
Schiefler, Generation and Analysis of Ultrasound Images Using Plane Wave and Sparse Arrays Techniques, Sensors (Year: 2018) 23 pages.
ISR and WO for PCT/GB2020/050926 (Jun. 2, 2020) (16 pages).
ISR and WO for PCT/GB2020/052544 (Dec. 18, 2020) (14 pages).
ISR and WO for PCT/GB2020/052829 (Feb. 10, 2021) (15 pages).
ISR and WO for PCT/GB2021/052415 (Dec. 22, 2021) (16 pages).
ISR and WO for PCT/GB2023/050001 (May 24, 2023) (20 pages).
ISR for PCT/GB2020/052546 (Feb. 23, 2021) (14 pages).
ISR for PCT/GB2020/053373 (Mar. 26, 2021) (16 pages).
Iwamoto et al. (2008), Non-contact Method for Producing Tactile Sensation Using Airborne Ultrasound, EuroHaptics, pp. 504-513.
Iwamoto et al., Airborne Ultrasound Tactile Display: Supplement, The University of Tokyo 2008 (2 pages).
Iwamoto T et al., "Two-dimensional Scanning Tactile Display using Ultrasound Radiation Pressure", Haptic Interfaces for Virtual Environment and Teleoperator Systems, 2006 14th Symposium on Alexandria, VA, USA Mar. 25-26, 2006, Piscataway, NJ, USA, IEEE, (Mar. 25, 2006), ISBN 978-1-4244-0226-7, pp. 57-61.
Jager et al., "Air-Coupled 40-KHZ Ultrasonic 2D-Phased Array Based on a 3D-Printed Waveguide Structure", 2017 IEEE, 4 pages.
Japanese Office Action (with English language translation) for Application No. 2017-514569, dated Mar. 31, 2019, 10 pages.
Jonaschatel-Goldman, Touch increases autonomic coupling between romantic partners, Frontiers in Behavioral Neuroscience Mar. 2014, vol. 8, Article 95.
Jonathan Taylor et al., Articulated Distance Fields for Ultra-Fast Tracking of Hands Interacting, ACM Transactions on Graphics, vol. 36, No. 4, Article 244, Publication Date: Nov. 2017, pp. 1-12.
Jonathan Taylor et al., Efficient and Precise Interactive Hand Tracking Through Joint, Continuous Optimization of Pose and Correspondences, SIGGRAPH '16 Technical Paper, Jul. 24-28, 2016, Anaheim, CA, ISBN: 978-1-4503-4279-87/16/07, pp. 1-12.
Jonathan Tompson et al., Real-Time Continuous Pose Recovery of Human Hands Using Convolutional Networks, ACM Trans. Graph. 33, 5, Article 169, Aug. 2014, pp. 1-10.
JP Office Action for JP 2020-534355 (Dec. 6, 2022) (8 pages).
K. Jia, Dynamic properties of micro-particles in ultrasonic transportation using phase-controlled standing waves, J. Applied Physics 116, n. 16 (2014) (12 pages).
Kai Tsumoto, Presentation of Tactile Pleasantness Using Airborne Ultrasound, 2021 IEEE World Haptics Conference (WHC) Jul. 6-9, 2021. Montreal, Canada. 5 pages.
Kaiming He et al., Deep Residual Learning for Image Recognition, http://image-net.org/challenges/LSVRC/2015/ and http://mscoco.org/dataset/#detections-challenge2015, Dec. 10, 2015, pp. 1-12.
Kamakura, T. and Aoki, K. (2006) "A Highly Directional Audio System using a Parametric Array in Air" WESPAC IX 2006 (8 pages).
Keisuke Hasegawa, Electronically steerable ultrasound-driven long narrow air stream, Applied Physics Letters 111, 064104 (2017) 5 pages.
Keisuke Hasegawa, Midair Ultrasound Fragrance Rendering, IEEE Transactions on Visualization and Computer Graphics, vol. 24, No. 4, Apr. 2018 1477. 9 pages.
Keisuke Hasegawa,,Curved acceleration path of ultrasound-driven air flow, J. Appl. Phys. 125, 054902 (2019); 6 pages.
Ken Wada, Ring Buffer Basics (2013) 6 pages.
Kolb, et al., "Time-of-Flight Cameras in Computer Graphics," Computer Graphics forum, vol. 29 (2010), No. 1, pp. 141-159.
Konstantinos Bousmalis et al., Domain Separation Networks, 29th Conference on Neural Information Processing Systems (NIPS 2016), Barcelona, Spain. Aug. 22, 2016, pp. 1-15.
Krim, et al., "Two Decades of Array Signal Processing Research—The Parametric Approach", IEEE Signal Processing Magazine, Jul. 1996, pp. 67-94.
Lang, Robert, "3D Time-of-Flight Distance Measurement with Custom Solid-State Image Sensors in CMOS/CCD—Technology", A dissertation submitted to Department of EE and CS at Univ. of Siegen, dated Jun. 28, 2000, 223 pages.
Large et al.,Feel the noise: Mid-air ultrasound haptics as a novel human-vehicle interaction paradigm, Applied Ergonomics (2019) (10 pages).
Li, Larry, "Time-of-Flight Camera—An Introduction," Texas Instruments, Technical White Paper, SLOA190B—Jan. 2014 Revised May 2014, 10 pages.
Light, E.D., Progress in Two Dimensional Arrays for Real Time Volumetric Imaging, 1998 (17 pages).
Line S Loken, Coding of pleasant touch by unmyelinated afferents in humans, Nature Neuroscience vol. 12 [ No. 5 [ May 2009 547. 2 pages.
M. Barmatz et al., "Acoustic radiation potential on a sphere in plane, cylindrical, and spherical standing wave fields", The Journal of the Acoustical Society of America, New York, NY, US, (Mar. 1, 1985), vol. 77, No. 3, pp. 928-945, XP055389249.
M. Toda, New Type of Matching Layer for Air-Coupled Ultrasonic Transducers, IEEE Transactions on Ultrasonics, Ferroelecthcs, and Frequency Control, vol. 49, No. 7, Jul. 2002 (8 pages).
Mahboob, "Artificial neural networks for learning inverse kinematics of humanoid robot arms." MS Thesis, 2015. (Year: 2015) 95 pages.
Mahdi Rad et al., Feature Mapping for Learning Fast and Accurate 3D Pose Inference from Synthetic Images, Mar. 26, 2018, pp. 1-14.
Marco A B Andrade et al, "Matrix method for acoustic levitation simulation", IEEE Transactions on Ultrasonics, Ferroelectrics and Frequency Control, IEEE, US, (Aug. 1, 2011), vol. 58, No. 8, ISSN 0885-3010, pp. 1674-1683.
Mariana von Mohr, The soothing function of touch: affective touch reduces feelings of social exclusion, Scientific Reports, 7: 13516, Oct. 18, 2017.
Marin, About LibHand, LibHand—A Hand Articulation Library, www.libhand.org/index.html, Mar. 26, 2020, pp. 1-2; www.libhand.org/download.html, 1 page; www.libhand.org/examples.html, pp. 1-2.

(56) References Cited

OTHER PUBLICATIONS

Markus Oberweger et al., DeepPrior++: Improving Fast and Accurate 3D Hand Pose Estimation, Aug. 28, 2017, pp. 1-10.
Markus Oberweger et al., Hands Deep in Deep Learning for Hand Pose Estimation, Dec. 2, 2016, pp. 1-10.
Marshall, M., Carter, T., Alexander, J., & Subramanian, S. (2012). Ultratangibles: creating movable tangible objects on interactive tables. In Proceedings of the 2012 ACM annual conference on Human Factors in Computing Systems, (pp. 2185-2188).
Marzo et al., Holographic acoustic elements for manipulation of levitated objects, Nature Communications DOI: I0.1038/ncomms9661 (2015) (7 pages).
Meijster, A., et al., "A General Algorithm for Computing Distance Transforms in Linear Time," Mathematical Morphology and its Applications to Image and Signal Processing, 2002, pp. 331-340.
Mingzhu Lu et al. (2006) Design and experiment of 256-element ultrasound phased array for noninvasive focused ultrasound surgery, Ultrasonics, vol. 44, Supplement, Dec. 22, 2006, pp. e325-e330.
Mitsuru Nakajima, Remotely Displaying Cooling Sensation via Ultrasound-Driven Air Flow, Haptics Symposium 2018, San Francisco, USA p. 340.
Mohamed Yacine Tsalamlal, Affective Communication through Air Jet Stimulation: Evidence from Event-Related Potentials, International Journal of Human-Computer Interaction 2018. 13 pages.
Mohamed Yacine Tsalamlal, Non-Intrusive Haptic Interfaces: State-of-the Art Survey, HAID 2013, LNCS 7989, pp. 1-9, 2013.
Montenegro et al., "Neural Network as an Alternative to the Jacobian for Iterative Solution to Inverse Kinematics," 2018 Latin American Robotic Symposium, 2018 Brazilian Symposium on Robotics (SBR) and 2018 Workshop on Robotics in Education (WRE) João Pessoa, Brazil, 2018, pp. 333-338 (Year: 2018).
PCT Partial International Search Report for Application No. PCT/GB2018/053404 date of mailing Feb. 25, 2019, 13 pages.
Péter Tamás Kovács et al., "Tangible Holographic 3D Objects with Virtual Touch", Interactive Tabletops & Surfaces, ACM, 2 Penn Plaza, Suite 701 New York NY 10121-0701 USA, (Nov. 15, 2015), ISBN 978-1-4503-3899-8, pp. 319-324.
Phys.org, Touchable Hologram Becomes Reality, Aug. 6, 2009, by Lisa Zyga (2 pages).
Pompei, F.J. (2002), "Sound from Ultrasound: The Parametric Array as an Audible Sound Source", Massachusetts Institute of Technology (132 pages).
Prabhu, K. M. (2013). Window Functions and Their Applications in Signal Processing. CRC Press., pp. 87-127.
Rakkolainen et al., A Survey of Mid-Air Ultrasound Haptics and Its Applications (IEEE Transactions on Haptics), vol. 14, No. 1, 2021, 18 pages.
Rocchesso et al., Accessing and Selecting Menu Items by In-Air Touch, ACM CHItaly'19, Sep. 23-25, 2019, Padova, Italy (9 pages).
Rochelle Ackerley, Human C-Tactile Afferents Are Tuned to the Temperature of a Skin-Stroking Caress, J. Neurosci., Feb. 19, 2014, 34(8):2879-2883.
Ryoko Takahashi, Tactile Stimulation by Repetitive Lateral Movement of Midair Ultrasound Focus, Journal of Latex Class Files, vol. 14, No. 8, Aug. 2015.
Schmidt, Ralph, "Multiple Emitter Location and Signal Parameter Estimation" IEEE Transactions of Antenna and Propagation, vol. AP-34, No. 3, Mar. 1986, pp. 276-280.
Sean Gustafson et al., "Imaginary Phone", Proceedings of the 24th Annual ACM Symposium on User Interface Software and Techology: Oct. 16-19, 2011, Santa Barbara, CA, USA, ACM, New York, NY, Oct. 16, 2011, pp. 283-292, XP058006125, DOI: 10.1145/2047196.2047233, ISBN: 978-1-4503-0716-1.
Search report and Written Opinion of ISA for PCT/GB2015/050417 dated Jul. 8, 2016 (20 pages).
Search report and Written Opinion of ISA for PCT/GB2015/050421 dated Jul. 8, 2016 (15 pages).
Search report and Written Opinion of ISA for PCT/GB2017/050012 dated Jun. 8, 2017. (18 pages).
Search Report by EPO for EP 17748466 dated Jan. 13, 2021 (16 pages).
Search Report for GB1308274.8 dated Nov. 11, 2013. (2 pages).
Search Report for GB1415923.0 dated Mar. 11, 2015. (1 page).
Search Report for PCT/GB/2017/053729 dated Mar. 15, 2018 (16 pages).
Search Report for PCT/GB/2017/053880 dated Mar. 21, 2018. (13 pages).
Search report for PCT/GB2014/051319 dated Dec. 8, 2014 (4 pages).
Search report for PCT/GB2015/052507 dated Mar. 11, 2020 (19 pages).
Search report for PCT/GB2015/052578 dated Oct. 26, 2015 (12 pages).
Search report for PCT/GB2015/052916 dated Feb. 26, 2020 (18 pages).
Search Report for PCT/GB2017/052332 dated Oct. 10, 2017 (12 pages).
Search report for PCT/GB2018/051061 dated Sep. 26, 2018 (17 pages).
Search report for PCT/US2018/028966 dated Jul. 13, 2018 (43 pages).
Seo et al., "Improved numerical inverse kinematics for human pose estimation," Opt. Eng. 50(3 037001 (Mar. 1, 2011) https://doi.org/10.1117/1.3549255 (Year: 2011).
Sergey Ioffe et al., Batch Normalization: Accelerating Deep Network Training by Reducing Internal Covariat Shift, Mar. 2, 2015, pp. 1-11.
Seungryul, Pushing the Envelope for RGB-based Dense 3D Hand Pose Estimation for RGB-based Desne 3D Hand Pose Estimation via Neural Rendering, arXiv:1904.04196v2 [cs.CV] Apr. 9, 2019 (5 pages).
Shakeri, G., Williamson, J. H. and Brewster, S. (2018) May the Force Be with You: Ultrasound Haptic Feedback for Mid-Air Gesture Interaction in Cars. In: 10th International ACM Conference on Automotive User Interfaces and Interactive Vehicular Applications (AutomotiveUI 2018) (11 pages).
Shanxin Yuan et al., BigHand2.2M Bechmark: Hand Pose Dataset and State of the Art Analysis, Dec. 9, 2017, pp. 1-9.
Shome Subhra Das, Detectioin of Self Intersection in Synthetic Hand Pose Generators, 2017 Fifteenth IAPR International Conference on Machine Vision Applications (MVA), Nagoya University, Nagoya, Japan, May 8-12, 2017, pp. 354-357.
Sixth Sense webpage, http://www.pranavmistry.com/projects/sixthsense/ Accessed Nov. 30, 2018, 7 pages.
Smart Interface: Piezo Components with Flexible Printed Circuit Boards, www.physikinstrumente.co.uk/en/products/piezo-ceramic-components-transducers-for-oems/smart-interface/ (accessed Sep. 11, 2023) 5 pages.
Stan Melax et al., Dynamics Based 3D Skeletal Hand Tracking, May 22, 2017, pp. 1-8.
Stanley J. Bolanowski, Hairy Skin: Psychophysical Channels and Their Physiological Substrates, Somatosensory and Motor Research, vol. 11. No. 3, 1994, pp. 279-290.
Stefan G. Lechner, Hairy Sensation, PHYSIOLOGY 28: 142-150, 2013.
Steve Guest et al., "Audiotactile interactions in roughness perception", Exp. Brain Res (2002) 146:161-171, DOI 10.1007/s00221-002-1164-z, Accepted: May 16, 2002/Published online: Jul. 26, 2002, Springer-Verlag 2002, (11 pages).
Supplemental Notice of Allowability dated Jul. 28, 2021 for U.S. Appl. No. 16/563,608 (pp. 1-2).
Supplemental Notice of Allowability dated Jul. 28, 2021 for U.S. Appl. No. 17/092,333 (pp. 1-2).
Sylvia Gebhardt, Ultrasonic Transducer Arrays for Particle Manipulation (date unknown) (2 pages).
Takaaki Kamigaki, Noncontact Thermal and Vibrotactile Display Using Focused Airborne Ultrasound, EuroHaptics 2020, LNCS 12272, pp. 271-278, 2020.
Takahashi Dean: "Ultrahaptics shows off sense of touch in virtual reality", Dec. 10, 2016 (Dec. 10, 2016), XP055556416, Retrieved

(56) References Cited

OTHER PUBLICATIONS from the Internet: URL: https://venturebeat.com/2016/12/10/ultrahaptics-shows-off-sense-of-touch-in-virtual-reality/ [retrieved on Feb. 13, 2019] 4 pages.
Takahashi, M. et al., Large Aperture Airborne Ultrasound Tactile Display Using Distributed Array Units, SICE Annual Conference 2010 p. 359-62.
Takayuki et al., "Noncontact Tactile Display Based on Radiation Pressure of Airborne Ultrasound" IEEE Transactions on Haptics vol. 3, No. 3, p. 165 (2010).
Teixeira, et al., "A brief introduction to Microsoft's Kinect Sensor," Kinect, 26 pages, retrieved Nov. 2018.
Toby Sharp et al., Accurate, Robust, and Flexible Real-time Hand Tracking, CHI '15, Apr. 18-23, 2015, Seoul, Republic of Korea, ACM 978-1-4503-3145-06/15/04, pp. 1-10.
Tom Carter et al., "UltraHaptics: Multi-Point Mid-Air Haptic Feedback for Touch Surfaces", Proceedings of the 26th Annual ACM Symposium on User Interface Software and Technology, UIST '13, New York, New York, USA, (Jan. 1, 2013), ISBN 978-1-45-032268-3, pp. 505-514.
Tom Nelligan and Dan Kass, Intro to Ultrasonic Phased Array (date unknown) (8 pages).
Tomoo Kamakura, Acoustic streaming induced in focused Gaussian beams, J. Acoust. Soc. Am. 97 (5), Pt. 1, May 1995 p. 2740.
Office Action (Non-Final Rejection) dated May 10, 2023 for U.S. Appl. No. 17/477,536 (pp. 1-13).
Office Action (Non-Final Rejection) dated May 25, 2022 for U.S. Appl. No. 16/843,281 (pp. 1-28).
Office Action (Non-Final Rejection) dated Jun. 9, 2022 for U.S. Appl. No. 17/080,840 (pp. 1-9).
Office Action (Non-Final Rejection) dated Jun. 27, 2022 for U.S. Appl. No. 16/198,959 (pp. 1-17).
Office Action (Non-Final Rejection) dated Jun. 27, 2022 for U.S. Appl. No. 16/734,479 (pp. 1-13).
Office Action (Non-Final Rejection) dated Aug. 29, 2022 for U.S. Appl. No. 16/995,819 (pp. 1-6).
Office Action (Non-Final Rejection) dated Sep. 7, 2023 for U.S. Appl. No. 16/144,474 (pp. 1-16).
Office Action (Non-Final Rejection) dated Sep. 21, 2022 for U.S. Appl. No. 17/721,315 (pp. 1-10).
Office Action (Non-Final Rejection) dated Sep. 28, 2023 for U.S. Appl. No. 16/995,819 (pp. 1-8).
Office Action (Non-Final Rejection) dated Oct. 3, 2023 for U.S. Appl. No. 18/303,386 (pp. 1-18).
Office Action (Non-Final Rejection) dated Oct. 17, 2022 for U.S. Appl. No. 17/807,730 (pp. 1-8).
Office Action (Non-Final Rejection) dated Nov. 9, 2022 for U.S. Appl. No. 17/454,823 (pp. 1-16).
Office Action (Non-Final Rejection) dated Nov. 16, 2022 for U.S. Appl. No. 17/134,505 (pp. 1-7).
Office Action (Non-Final Rejection) dated Nov. 16, 2022 for U.S. Appl. No. 17/692,852 (pp. 1-4).
Office Action (Non-Final Rejection) dated Dec. 6, 2022 for U.S. Appl. No. 17/409,783 (pp. 1-7).
Office Action (Non-Final Rejection) dated Dec. 20, 2021 for U.S. Appl. No. 17/195,795 (pp. 1-7).
Office Action (Non-Final Rejection) dated Dec. 22, 2022 for U.S. Appl. No. 17/457,663 (pp. 1-20).
Office Action (Notice of Allowance and Fees Due (PTOL-85)) dated Jan. 18, 2022 for U.S. Appl. No. 16/899,720 (pp. 1-2).
Office Action (Notice of Allowance and Fees Due (PTOL-85)) dated Feb. 11, 2022 for U.S. Appl. No. 16/228,760 (pp. 1-8).
Office Action (Notice of Allowance and Fees Due (PTOL-85)) dated Feb. 28, 2022 for U.S. Appl. No. 17/068,825 (pp. 1-7).
Office Action (Notice of Allowance and Fees Due (PTOL-85)) dated Mar. 7, 2022 for U.S. Appl. No. 16/600,496 (pp. 1-5).
Office Action (Notice of Allowance and Fees Due (PTOL-85)) dated Mar. 8, 2023 for U.S. Appl. No. 17/721,315 (pp. 1-8).
Office Action (Notice of Allowance and Fees Due (PTOL-85)) dated Mar. 15, 2023 for U.S. Appl. No. 17/134,505 (pp. 1-5).
Office Action (Notice of Allowance and Fees Due (PTOL-85)) dated Mar. 24, 2023 for U.S. Appl. No. 17/080,840 (pp. 1-8).
Office Action (Notice of Allowance and Fees Due (PTOL-85)) dated Apr. 4, 2023 for U.S. Appl. No. 17/409,783 (pp. 1-5).
Office Action (Notice of Allowance and Fees Due (PTOL-85)) dated Apr. 6, 2023 for U.S. Appl. No. 17/807,730 (pp. 1-7).
Office Action (Notice of Allowance and Fees Due (PTOL-85)) dated Apr. 28, 2023 for U.S. Appl. No. 17/195,795 (pp. 1-7).
Office Action (Notice of Allowance and Fees Due (PTOL-85)) dated May 12, 2023 for U.S. Appl. No. 16/229,091 (pp. 1-8).
Office Action (Notice of Allowance and Fees Due (PTOL-85)) dated May 24, 2023 for U.S. Appl. No. 16/229,091 (pp. 1-2).
Office Action (Notice of Allowance and Fees Due (PTOL-85)) dated Jun. 16, 2023 for U.S. Appl. No. 17/354,636 (pp. 1-7).
Office Action (Notice of Allowance and Fees Due (PTOL-85)) dated Jul. 20, 2023 for U.S. Appl. No. 17/692,852 (pp. 1-8).
Office Action (Notice of Allowance and Fees Due (PTOL-85)) dated Aug. 2, 2023 for U.S. Appl. No. 16/843,281 (pp. 1-5).
Office Action (Notice of Allowance and Fees Due (PTOL-85)) dated Aug. 8, 2023 for U.S. Appl. No. 17/645,305 (pp. 1-8).
Office Action (Notice of Allowance and Fees Due (PTOL-85)) dated Aug. 24, 2022 for U.S. Appl. No. 16/198,959 (pp. 1-6).
Office Action (Notice of Allowance and Fees Due (PTOL-85)) dated Aug. 31, 2022 for U.S. Appl. No. 16/198,959 (pp. 1-2).
Office Action (Notice of Allowance and Fees Due (PTOL-85)) dated Sep. 7, 2022 for U.S. Appl. No. 17/068,834 (pp. 1-8).
Office Action (Notice of Allowance and Fees Due (PTOL-85)) dated Sep. 8, 2022 for U.S. Appl. No. 17/176,899 (pp. 1-8).
Office Action (Notice of Allowance and Fees Due (PTOL-85)) dated Sep. 11, 2023 for U.S. Appl. No. 18/065,603 (pp. 1-11).
Office Action (Notice of Allowance and Fees Due (PTOL-85)) dated Sep. 12, 2022 for U.S. Appl. No. 16/734,479 (pp. 1-7).
Office Action (Notice of Allowance and Fees Due (PTOL-85)) dated Oct. 12, 2023 for U.S. Appl. No. 18/066,267 (pp. 1-5).
Office Action (Notice of Allowance and Fees Due (PTOL-85)) dated Oct. 18, 2023 for U.S. Appl. No. 17/477,536 (pp. 1-8).
Office Action (Notice of Allowance and Fees Due (PTOL-85)) dated Oct. 31, 2022 for U.S. Appl. No. 17/068,834 (pp. 1-2).
Office Action (Notice of Allowance and Fees Due (PTOL-85)) dated Oct. 31, 2022 for U.S. Appl. No. 17/176,899 (pp. 1-2).
Office Action (Notice of Allowance and Fees Due (PTOL-85)) dated Nov. 1, 2022 for U.S. Appl. No. 16/404,660 (pp. 1-5).
Office Action (Notice of Allowance and Fees Due (PTOL-85)) dated Nov. 2, 2022 for U.S. Appl. No. 16/734,479 (pp. 1-2).
Office Action (Notice of Allowance and Fees Due (PTOL-85)) dated Nov. 10, 2022 for U.S. Appl. No. 16/198,959 (pp. 1-2).
Office Action (Notice of Allowance and Fees Due (PTOL-85)) dated Nov. 16, 2022 for U.S. Appl. No. 16/404,660 (pp. 1-2).
Office Action (Notice of Allowance and Fees Due (PTOL-85)) dated Dec. 14, 2021 for U.S. Appl. No. 17/170,841 (pp. 1-8).
Office Action dated Feb. 9, 2023 for U.S. Appl. No. 18/060,556 (pp. 1-5).
Office Action dated Mar. 3, 2023 for U.S. Appl. No. 18/060,525 (pp. 1-12).
"Ryoko Takahashi, Keisuke Hasegawa, Hiroyuki Shinoda, Tactile Stimulation by Repetitive Lateral Movement of Midair Ultrasound Focus, Apr.-Jun. 2020, IEEE Transactions on Haptics, vol. 13, No. 2" (Year: 2020) 9 pages.
Bjørn Kolbrek, Modal Propagat Ion in Acous T Ic Horns (Jun. 2012) (127 pages).
Chen, Xi. "Real-time Action Recognition for RGB-D and Motion Capture Data." (2014). (Year: 2014) 107 pages.
Kavan et al. (Dual Quaternions for Rigid Transformation Blending, 2006, ResearchGate, pp. 2-11) (Year: 2006).
Kussaba et al. (Hybrid kinematic control for rigid body pose stabilization using dual quaternions, Journal of the Franklin Institute 354 (2017) 2769-2787) (Year: 2017).
Notice of Allowance dated Sep. 16, 2024 for U.S. Appl. No. 18/305,354 (pp. 1-9).
Office Action (Final Rejection) dated Jun. 27, 2024 for U.S. Appl. No. 18/188,584 (pp. 1-5).
Office Action (Final Rejection) dated Aug. 1, 2024 for U.S. Appl. No. 18/305,354 (pp. 1-10).

(56) References Cited

OTHER PUBLICATIONS

Office Action (Non-Final Rejection) dated Jun. 4, 2024 for U.S. Appl. No. 18/348,663 (pp. 1-18).
Office Action (Non-Final Rejection) dated Jun. 5, 2024 for U.S. Appl. No. 18/513,902 (pp. 1-16).
Office Action (Non-Final Rejection) dated Jun. 10, 2024 for U.S. Appl. No. 17/212,774 (pp. 1-15).
Office Action (Non-Final Rejection) dated Jun. 26, 2024 for U.S. Appl. No. 16/564,016 (pp. 1-15).
Office Action (Non-Final Rejection) dated Jul. 25, 2024 for U.S. Appl. No. 17/822,224 (pp. 1-16).
Office Action (Non-Final Rejection) dated Jul. 30, 2024 for U.S. Appl. No. 18/365,313 (pp. 1-7).
Office Action (Non-Final Rejection) dated Aug. 26, 2024 for U.S. Appl. No. 18/417,653 (pp. 1-13).
Office Action (Non-Final Rejection) dated Aug. 27, 2024 for U.S. Appl. No. 18/153,337 (pp. 1-6).
Office Action (Non-Final Rejection) dated Dec. 19, 2024 for U.S. Appl. No. 18/623,940 (pp. 1-7).
Office Action (Notice of Allowance and Fees Due (PTOL-85)) dated May 30, 2024 for U.S. Appl. No. 18/359,951 (pp. 1-7).
Office Action (Notice of Allowance and Fees Due (PTOL-85)) dated Jul. 22, 2024 for U.S. Appl. No. 17/835,411 (pp. 1-7).
Office Action (Notice of Allowance and Fees Due (PTOL-85)) dated Aug. 5, 2024 for U.S. Appl. No. 17/835,411 (pp. 1-2).
Office Action (Notice of Allowance and Fees Due (PTOL-85)) dated Aug. 28, 2024 for U.S. Appl. No. 18/365,313 (pp. 1-5).
Office Action (Notice of Allowance and Fees Due (PTOL-85)) dated Dec. 11, 2024 for U.S. Appl. No. 18/648,428 (pp. 1-8).
Polychronopoulos et al., Acoustic levitation with optimized reflective metamaterials, Scientific Reports (2020) 10:4254 (10 pages).
Supancic et al., "Depth-based hand pose estimation: data, methods, and challenges." In Proceedings of the IEEE international conference on computer vision, pp. 1868-1876. 2015. (Year: 2015).
Wang et al. (Translation and attitude synchronization for multiple rigid bodies using dual quaternions, Journal of the Franklin Institute 354 (2017) 3594-3616) (Year: 2017).
Wu et al. (Strapdown Inertial Navigation System Algorithms Based on Dual Quaternions,2009, IEEE, 2005, pp. 110-132) (Year: 2005).
Zhao et al., "Combining marker-based MOCAP and RGB-d camera for acquiring high-fidelity hand motion data." In Proceedings of the ACMSIGGRAPH/EurographicsSymposiumonComputer Animation. Eurographics Association, 33-42, 2012. (Year: 2012).

\* cited by examiner

FEATURES OF AIRBORNE ULTRASONIC FIELDS

PRIOR APPLICATIONS

This application claims the benefit of the following five applications, all of which are incorporated by references in their entirety
(1) U.S. Provisional Patent Application No. 63/043,093 filed on Jun. 23, 2020;
(2) U.S. Provisional Patent Application No. 63/065,997, filed on Aug. 14, 2020;
(3) U.S. Provisional Patent Application No. 63/067,314, filed on Aug. 18, 2020;
(4) U.S. Provisional Patent Application No. 63/210,486, filed on Jun. 14, 2021; and
(5) U.S. Provisional Patent Application No. 63/210,619, filed on Jun. 15, 2021.

FIELD OF THE DISCLOSURE

The present disclosure relates generally to improved techniques in establishing useful and unique features in ultrasonic fields.

BACKGROUND

Phased arrays including ultrasonic phased array systems function on the principle of superposition. Superpositions occur when linear quantities that describe waves add together to create areas of constructive and destructive interference. State-of-the-art ultrasonic systems use these quantities directly for control over the linear function values of points in the acoustic field. The resulting samples can be used in a linear system of complex-valued equations to solve for the actuations of transducer that then generate the desired linear field values at the desired points (known as control points).

By solving many times in rapid succession and generating and supplying the drive signal that corresponds to the solution values to the transducers, waveforms may be modulated onto the ultrasonic carrier generated by the transducer elements in the phased array. This is because as the solved for value changes, the amount of acoustic pressure of the carrier also changes.

This modulation has two key non-linear effects that are exploitable by commercial devices. The first, known as acoustic radiation force, is proportional to the energy in the wave and refers to the force generated when the wave is impeded. This force is at a maximum when a sharp change in acoustic impedance is present, such as the surface of a hand when the ultrasonic waves are travelling through the air. The force generated may be used for haptic feedback in mid-air. The second, known as 'sound from ultrasound' is the primary operating mechanism for parametric speaker arrays which also has an effect proportional to the energy in the wave. This effect is responsible for causing audible sound to be seemingly emitted by an ultrasonic array when no audible sound was present as the source of the ultrasonic wave.

High precision control of both of these effects are necessary to create reproducible mid-air haptics with controlled, little or no audible noise produced as a side-effect. However, the momentum and energy of the device cannot be controlled directly as it is a non-linear quantity, as well as being dependent on a number of geometric parameters. It is therefore commercially relevant to develop a method of taking from the 'user' of the system a desired level of wave energy, converting to the equivalent level of a linear acoustic quantity and then solving for this linear level using linear methods given that it has already been established that this is equivalent to an amount of wave energy that cannot be sought directly.

Further, when considering the solution to the problem of an ultrasonic field which has been discretized into a number of discrete points, the recreation of such a field via a phased transducer array technology may be achieved by solving for the output field required of each transducer. This solution can be described as, given a reference frequency, a series of complex numbers which can be interpreted as the phase and amplitude required of each transducer. From this data an input signal to the transducer may be inferred as a signal wherein a substantial proportion has the properties of a sinusoidal signal with the given amplitude and phase at the transducer. Given a method to compute these complex-valued coefficients, it is reasonable to assume that these must be transferred to the device in order to activate it and the information on the transducer locations and directions must be transferred to the compute location in order to do work on it. This makes the compute required at the transducer very small, as it only has to import complex coefficients and export sufficient data to describe its produced field. However, the communication with these devices will scale with the number of transducers, which if relatively large will prove too much. On top of this, the synthesis of the field produced by each transducer must be achieved in some centralized location, which is again undesirable.

By determining the samples of the field produced by each transducer locally and using these as a common definition of a basis function each of which is made up of output from all transducing elements, communicating only a complex-valued coefficient per basis function may be achieved. This is because both the compute close to the transducer in the hardware and the software residing in the user interface portion understand the definition of the basis function. These need only communicate enough information to define the individual basis functions and their complex-valued linear superposition, which in turn defines the complex-valued linear superposition of basis-function-defined complex-valued coefficients that drive each transducing element. However, in order for this system to function, both the hardware system close to the transducer and the software residing in the user interface portion of the system must understand how to expand the basis functions out into individual transducer information. This leads to computation that is duplicated in both hardware close to the transducers and the software portion in order to make savings on communication bandwidth. This uses extra compute power and resources to achieve low-bandwidth, but is clearly not yet optimal, as reducing system cost must necessarily involve reducing both communication and computation to a minimum.

While a method that eliminates the dependency of bandwidth requirements on the transducer count of the system is needed, duplicating functionality is clearly undesirable. Overcoming this limitation to enable distributed simulation of the acoustic field, while only requiring summaries of acoustic field contributions that do not depend on the transducer element count to be communicated to solve for the output field, is commercially valuable.

Further, airborne ultrasonic phased arrays can be used to create arbitrary acoustic fields. These can be used for haptic feedback, parametric audio, acoustic levitation, etc. To achieve compelling effects, it is often the case that relatively high levels of ultrasound energy are needed. Objects, microphones, animals, and/or people in the area of the ultrasound field could be sensitive to these levels. In many cases, even if the ultrasound is directed elsewhere, fringing (unintentional) fields can still cause problems. Presented below are several methods/strategies to create points or regions in the field specifically lacking ultrasound, or 'nulls' without substantially altering the effect generated by the rest of the field. If the location of the sensitive object is known to some degree, it is possible to direct a null point or region towards it in order to protect it from the ultrasound.

A particularly attractive application of this method is to parametric audio. This is the demodulation of ultrasound into audible sound through the nonlinear properties of the air. This creates a beam-like projection of audio. The audible sound created is directed along the same direction as the ultrasound. High levels of ultrasound can interact negatively with microphones and can even be perceived by the mammalian ear through a nonlinearity at the tympanic membrane. This can mask or distort the parametric audio and lower the quality of the experience.

All sound waves are subject to diffraction. This is an effect whereby waves spread out on a length scale related to their wavelength. Short-wavelength sound such as ultrasound at about 40 "kHz" is able to propagate and maintain features approximately equal to its wavelength, 8.6 "mm". Regular sound, on the other hand, consists of waves with a much longer wavelength (middle c, 261 "Hz", has a wavelength, $\lambda$, of 1.3 "m"), which spread out readily. Parametric audio forms a beam of sound by exploiting the short-wavelength of ultrasound to create tightly contained regions of sound emission. The sound, once created, spreads out as usual. This opens up the possibility of delivering parametric audio without delivering the associated ultrasound. By creating relatively small regions devoid of ultrasound with nearby high levels of ultrasound, we can create a situation where the parametric audio fills in the 'gaps' while the ultrasound does not.

Further, a continuous distribution of sound energy, which will refer to as an "acoustic field", can be used for a range of applications including haptic feedback in mid-air, sound-from-ultrasound systems and producing encoded waves for tracking systems.

By defining one of more control points in space, the acoustic field can be controlled. Each point can be assigned a value equating to a desired amplitude at the control point. A physical set of transducers can then be controlled to create an acoustic field exhibiting the desired amplitude at the control points.

The transducer elements, being physical devices, have physical limitations. In the case of producing an acoustic field there is a maximum output for each element that cannot be exceeded. The mathematical structure of the system makes it cumbersome to force solutions to respect the power limitations of the physical device, where clean solution methods often produce unphysical drive conditions.

If the transducers are arranged such that grating lobes are a problem, then it is possible to reduce the impact of the grating lobes on the control points by apodizing the transducer amplitudes (creating a tapered set of amplitudes towards the edge of the array). This necessarily reduces the efficiency of the array, limiting the maximum output power available. For multiple points also, while producing the relative amplitudes is always possible when the number of transducer elements is greater than the number of control points, efficiency drops as the number of points increases, and the maximum power drops.

A method to arrest these drops in efficiency which would act to incrementally raise the output level when more output power is required of the device than can be supplied using existing methods would therefore be commercially valuable.

It is also possible to, in the case of a single point, drive all transducers at the same power and influence only their phase. Then the collective drive amplitude of the transducers may be modulated to generate a similar modulation on the signal at the control point. However, this solution does not help when the benefits of apodization and/or multiple points are required.

If higher efficiency or output power is desired then, either the solution is made less accurate by pushing the transducer drive to higher levels than is described by the solution or the benefits of apodization and/or multiple points cannot be used.

Further, phased arrays including ultrasonic phased array systems function on the principle of superposition. Superpositions occur when linear quantities that describe waves add together to create areas of constructive and destructive interference. State-of-the-art ultrasonic systems use these quantities directly for control over the linear function values of points in the acoustic field. The resulting samples can be used in a linear system of complex-valued equations to solve for the actuations of transducer that then generate the desired linear field values at the desired points (known as control points).

As tractable solutions for the linear values to control these points are only computable under the assumption of free-field conditions, these same conditions have in many cases erroneously been used as justification for the assumptions of a bulk acoustic medium. For mid-air haptics with ultrasonic phased arrays and other situations in which an ultrasonic phased array is used to apply a force to a boundary separating two materials with different acoustic properties (such as the boundary between air and a human body part), the boundary condition changes the scenario of the problem to the extent that solutions developed with the bulk scenario in mind will necessarily omit details critical to the accurate reproduction of acoustic force on the aforementioned boundary surface.

In this document, a system that generates reproductions of one or more force vectors on one or more high acoustic impedance boundaries is detailed.

SUMMARY

A method for specifying desired quantities of the energy flux of the combined waves of acoustic radiation pressure to apply producing a mid-air haptic pushing force, which has the effect of simultaneously reducing the harmonic distortion present is described.

Further, a method for communicating only the summaries of acoustic field contributions at the required locations in the form of summed portions of the relatively small matrix whose row and column count depend only on the control point count is described.

Further, phased arrays of ultrasonic speakers can produce a relatively large amount of acoustic energy which is usually directed in a specific direction or focused to a particular point depending on the application of the array. Certain objects (e.g. microphones) can become interfered with by the acoustic field which may reduce their function (see FIGS. 10A, 10B, and 10C). One method to reduce the effect of high intensity ultrasound is to create 'quiet' areas where the intensity is significantly lower than the surrounding acoustic field. By creating a lower-pressure region around an object (e.g. a number of lower-pressure focal points, or a lower-pressure volume) the acoustic intensity experienced by the object can be significantly reduced. Our solution allows us to create these quiet areas without significantly affecting the performance of the array.

Further, to allow the system to be driven more strongly than usual, the complex-valued linear system that governs the drive signal to each control point is solved twice. Once to determine how much drive from each transducer might be necessary and a further time in which each transducer has been scaled back by the overshoot in drive that occurred during the first solution, resulting in a more even distribution of power across the transducers in the solution from the second solve.

The system scales back the coefficients used on the parts of the basis functions that are driven hardest. This is counterintuitive—reducing the effectiveness of high efficiency transducers, boosts general power output overall. This works because then the solution method, uses the now less effective parts less, so the output requirements are more evenly distributed.

Further, most solution methods are intended to generate a predefined nonlinear effect in a bulk medium. In some instances, such as generation of parametric audio, this is justifiable as this describes the body forces exerted through the acoustic medium for which using a free-field bulk medium is an acceptable modelling approach. However, if a body force model is being used to describe the interaction with a boundary, then it will not necessarily reflect reality.

To achieve mid-air haptics with high precision the radiation pressure generated must be modelled accurately. The modelling of radiation pressure in the academic literature is generally approached using one of the two following methodologies.

The first approach is by analogy to electromagnetic waves. In this case, radiation pressure is considered to be a force acting along the acoustic Poynting vector. As this is in terms of the acoustic Poynting vector then it is natural that the energy flux density and thus in acoustic terms the acoustic intensity I describes the magnitude of the force.

The second approach is taken by academic papers that write about acoustophoresis—levitating objects in the acoustic medium using standing waves or specially constructed interference patterns. In the field of acoustophoresis, radiation pressure is considered to be a scalar potential defined by the time averaged second-order pressure $p_2$. Then as a scalar potential, the negative gradient of the potential field describes the direction and magnitude of the force vector.

Academic papers that describe radiation force using the first approach ignore the second as they assume far-field conditions where it can be shown that $p_2=0$. Those that describe radiation force using the second approach ignore the first as the acoustic Poynting vector either cancels to zero in a standing wave, or generates few useful degrees of freedom that could aid optimization of an acoustophoretic interference pattern and so tends to be neglected.

Neither of these approaches sufficiently describe the phenomenon of radiation pressure for mid-air haptic systems, as both of the simplifying assumptions are false for using acoustic phased array hardware to generate apparent haptic forces on humans.

Assume that the Poynting vector can be directly converted into a linearly related force vector with the same direction. This may then be assumed (incorrectly) to be split into force components, so given an arbitrary unit vector direction $\hat{n}$, $I \cdot \hat{n} \propto F_r \cdot \hat{n}$, so in the bulk medium the radiation pressure in a given direction may be directly related to the energy flux density in that same direction $\hat{n}$. If this $\hat{n}$ is given as the normal vector to a non-physical surface that cuts the energy flux vector (acoustic intensity) I, then $F_r \cdot \hat{n}$ being the force acting at a point across this non-physical surface is given as justification for this being the force generated on a physical surface at this same location. This is not the whole picture because as previous described, this is not a body force so does not act in bulk and this scenario assumes far field behavior—for a focusing mid-air haptic device (where the act of focusing implies near-field behavior) this is an approximation at best.

In this disclosure, determining the scalar linear acoustic quantity to solve for that best represents the apparent haptic pressure to be generated is described.

BRIEF DESCRIPTION OF THE DRAWINGS

The accompanying figures, where like reference numerals refer to identical or functionally similar elements throughout the separate views, together with the detailed description below, are incorporated in and form part of the specification, serve to further illustrate embodiments of concepts that include the claimed invention and explain various principles and advantages of those embodiments.

Figure 1:
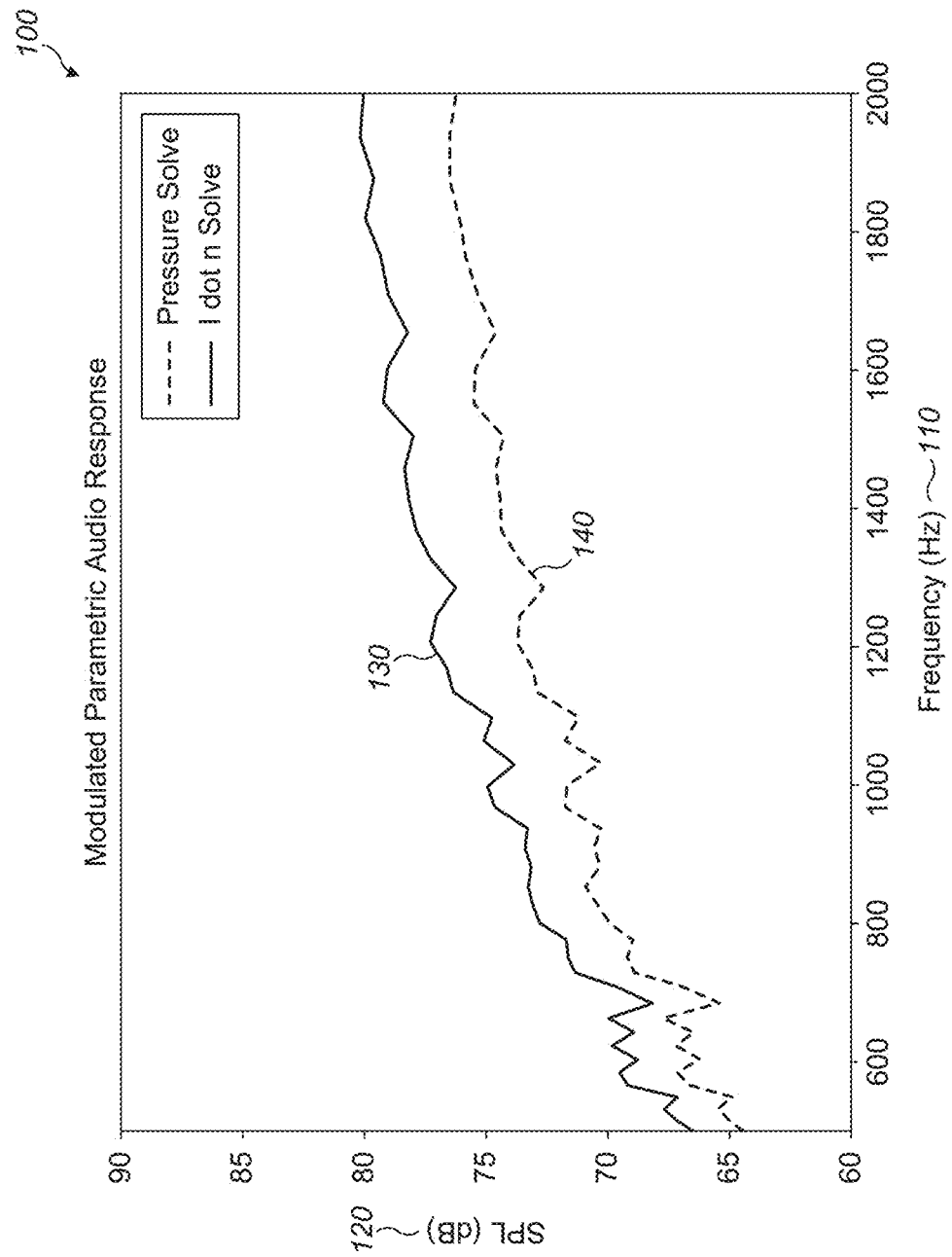
FIG. 1 shows plots of modulated parametric audio responses.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

I. Energy-Proportional Interfaces for Describing Acoustic Force

Deflection of the skin and ultimately a feeling of touch from an ultrasonic mid-air haptic device is determined by nonlinear acoustic radiation force found at the interface between air and skin. For a plane wave incident on an infinite planar surface, this is given by (Fluid Mechanics 3$^{rd}$ edition, Landau and Lifshitz, pp. 255-256), $$p = \overline{E_1}\sin\theta_1\cos\theta_1[(1 + R)\cot\theta_1 - (1 - R)\cot\theta_2],$$

where $\theta_1$ and $\theta_2$ are the wave's angle of reflection and refraction, respectively, R is the reflection coefficient, and $\overline{E_1}$ is the time-averaged energy density in the incident acoustic wave. For normal incidence, the pressure reduces to, $$p = 2\overline{E_1}\left[\frac{\rho_1^2 c_1^2 + \rho_2^2 c_2^2 - 2\rho_1\rho_2 c_1^2}{(\rho_1 c_1 + \rho_2 c_2)^2}\right],$$

where $\rho$ and c refer to the density and speed of sound in each of fluid 1 and 2. While a human hand is certainly not an "infinite planar surface", it is much larger than ultrasonic wavelengths (the wavelength of 25 kHz ultrasound is ~1.4 cm at normal temperature and pressure and decreases at increasing frequency). When a focused onto the palm, the region which is applying the nonlinear pressure is typically about 1 wavelength in diameter but can be as much as 3 wavelengths depending on the size of the array relative to the distance it is focusing. Therefore, the above approximation should be correct to first order in most mid-air haptic scenarios.

This illustrates that the acoustic force experienced by the skin to create a haptic effect is determined by the energy density within the sound wave and not the linear pressure. Traditional ultrasonic mid-air haptic devices control linear sound pressure from a phased array of ultrasonic transducers to generate a haptic effect. While this is effective in creating a haptic effect, it does not reflect the basic physics occurring in the real system. Methods are presented herein to instead control the energy of the ultrasonic sound field in order to precisely control the physical force experienced by the user.

Energy density within an acoustic wave in a volume element involves both the particle velocity and pressure (Fundamentals of Acoustics 4$^{th}$ ed. Kinsler et al, eq (5.8.7)), $$E(t) = \frac{1}{2}\rho_0\left[|u(t)|^2 + \left(\frac{p(t)}{\rho_0 c}\right)^2\right],$$

where $\rho_0$ and c are the density and speed of sound of the fluid, u is the average particle velocity within the element, and p is the pressure. For a monochromatic plane wave, the time-averaged energy density can be reduced to, $$\overline{E} = \frac{P^2}{2\rho_0 c^2}, \quad (1)$$

were in this case P represents the linear amplitude of the acoustic pressure wave. This quantity is also referred to as the acoustic intensity or I. This equation is valid if the radius of curvature of the acoustic wave is much larger than the wavelength. It is clear then if we wish to specify the acoustic radiation pressure in a mid-air haptic device, we should be solving for a field proportional to $P^2$, not linear pressure.

Constructing the correct phase and amplitude for each transducer in an array (also called the activation coefficients) for a particular field solution can be done in many different ways. One such method is covered in Long et al. Rendering Volumetric Haptic Shapes in Mid-Air using Ultrasound. ACM Transactions on Graphics (Proceedings of SIGGRAPH Asia) Vol 33, Num 6, Art 181, 2014. Most involve first estimating the contribution of each transducer to a point or area of interest. The most common solutions for an ultrasonic phased array involve acoustic pressure due to the simplicity of both measurement on a real device with a pressure microphone and constructing a mathematical model to match that measurement. Using equation 1, a standard pressure model can be converted to acoustic intensity and utilize the same field solution techniques.

In addition to intensity, another quantity which is important in mid-air haptics is the direction of propagation of the energy. For an acoustic point source, this direction is directly away from the source. Real sources deviate from this in the near field (closer than a few wavelengths) and approach point-source behavior in the far field. Both cases can be covered by careful measurement and appropriate modelling.

To then solve for the nonlinear pressure in a specific direction, the contribution of each transducer is corrected by constructing the 3-dimensional vector dot product between the propagation direction and the desired direction of energy. This will appropriately adjust the contribution from transducers to reflect the amount on energy they can contribute in the desired direction. This allows, for instance, the ability to direct nonlinear acoustic pressure at the normal of a user's palm, thereby maximizing the perceived haptic.

Another nonlinear quantity which is proportional to $P^2$ is parametric audio. This is the production of audible sound through nonlinear mixing of inaudible ultrasound in the air. Berktay (1974) derived the first-order contribution of two aligned plane waves to be (in the far field), $$p = \frac{\omega^2 P^2 \beta S}{4\pi\rho_0 c_0^4 R} \frac{\exp[-(\alpha + jk)R]}{\alpha_T + jk(1 - \cos(\theta))},$$

where P is the input ultrasonic level of each plane wave (in this case equal, but could be separated), S is the cross-sectional area, R is the distance from the array, and $\beta$ is the nonlinearity coefficient. It can be shown that even for converging acoustic fields that there still exists a significant contributing term similar to the one above, and also proportional to $P^2$.

To illustrate that the P² solution has been correctly implemented, its effect in the resulting parametric audio can be measured. FIG. 1 shows the measured audio output at 50 cm from a square, 256 element phased array projecting a focus point centered and directly normal to the array at 1.9 meters distance for a given modulation frequency. At this distance, the focus point does not have enough nonlinear pressure to create a mid-air haptic, but the nonlinear contribution to parametric audio builds constructively over distance and becomes easily measurable with an adequate microphone. By constructing a modulation envelope proportional to the intensity (and including only the contribution from each transducer in the normal direction) this scheme is able to inject more energy into the nonlinear term—in this case the parametric audio. This extra ~3 dB in audio reflects a similar gain in nonlinear force when projecting a focus point onto a hand at shorter range. More haptic strength and the resulting headroom allows for more efficient use of transducers relative to the standard pressure solve. This can be utilized to create a wider variety of haptic effects or reduce the number of transducers (and therefore the cost) for a haptic generated by the traditional pressure solve.

Turning to FIG. 1, shown is a graph 100 entitled Modulated Parametric Audio Response. The x-axis 110 is frequency in hertz and the y-axis is sound pressure level in db. The dotted line 140 is a plot of pressure solve and the solid line 130 is the I dot n solve. FIG. 1 shows that measured SPL of baseband audio at 50 cm from an ultrasound phased array when modulated at that frequency. The array solution sets a focus at 1.9 m in the direction normal to the array and centered in the perpendicular plane. The dashed curve 140 is modulated by a pure sine wave offset so that the amplitude of modulation remains positive. The solid curve 130 instead sets the intensity dotted with a vector normal to the array to the same offset modulated tone, per transducer. This results in higher output as the intensity in the normal direction is a better approximation of nonlinear contributions to the field and the resulting parametric audio.

Figure 2:
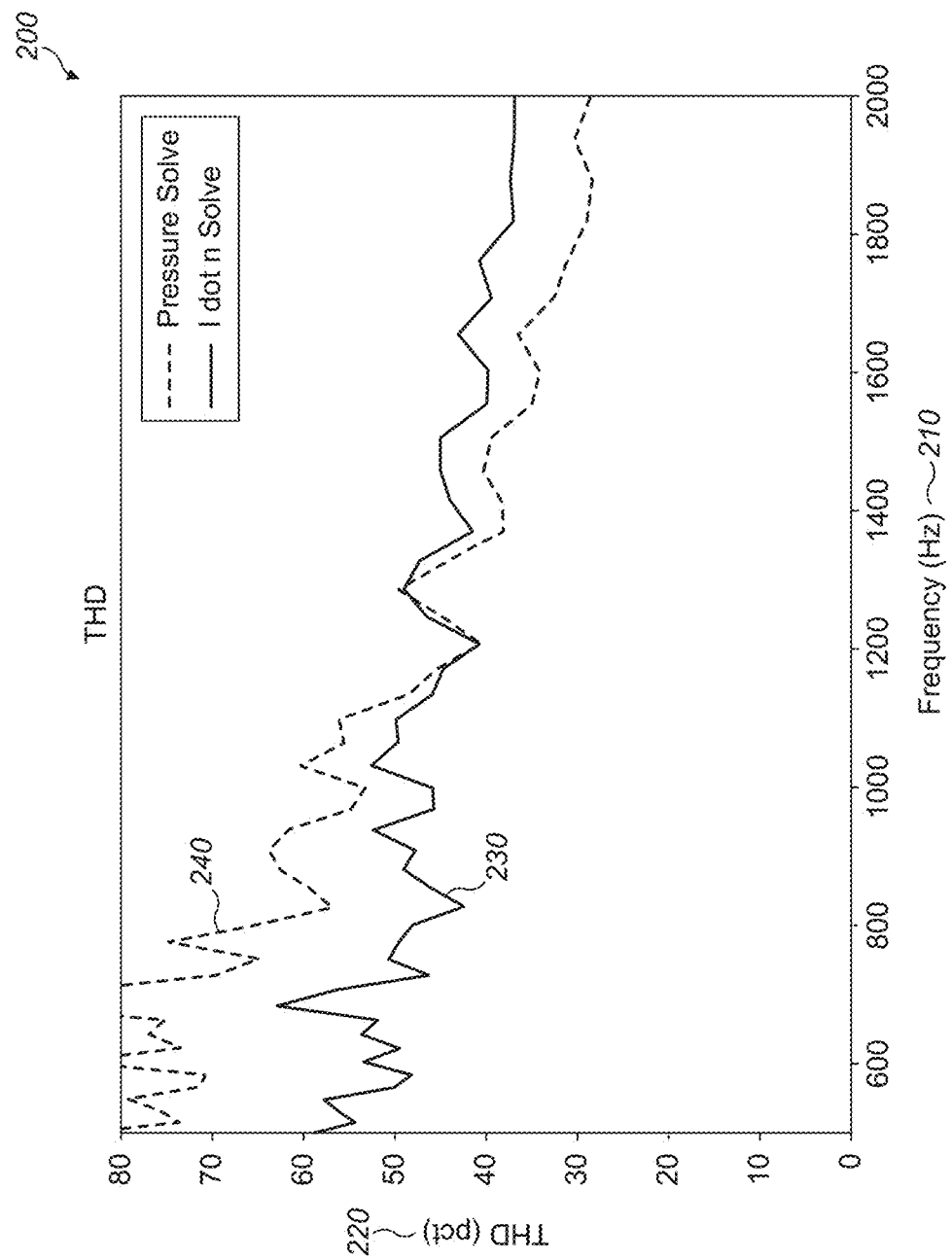
FIG. 2 shows plots of total harmonic distortion.

Turning to FIG. 2, shown is a graph 200 entitled THD (total harmonic distortion). The x-axis 210 is frequency in hertz and the y-axis 220 is THD in percent. The dashed curve 240 shows the pressure solve and the solid curve 230 is the I dot n Solve. FIG. 2 shows that distortion percentage (measured input frequency magnitude divided by the sum of the first 10 harmonics) versus input frequency of the same setup as in FIG. 1. The pressure solve reveals higher distortion at lower frequencies which is inherent to that modulation technique. Solving for intensity dotted by a normal vector normal to the array represents a better approximation of the nonlinear contribution to the field. At higher frequencies, phase shifts inherent to the mechanical nature of the transducers begin to mitigate the benefit.

The P² solution also has an effect on distortion products for any modulation frequency. The traditional linear pressure solving results in a modulation scheme which looks like, $$P = [.5 + .5\cos(\omega_d t)]\cos(\omega_c t),$$

where $\omega_c$ is the ultrasonic carrier frequency and $\omega_d$ is the baseband modulation frequency. The estimated frequencies present in parametric audio production can be estimated by squaring the ultrasonic pressure and then omitting any term still ultrasonic. For the linear modulation case this is, $$P^2 \propto \cos(\omega_d t) + .25\cos(2\omega_d t).$$

The second term, double that of the input modulation frequency, is not present in the input signal and represents measurable distortion. Higher-order factors also exist in a real system but will be greatly diminished relative to this term. A measurement of this is given in FIG. 3.

Figure 3:
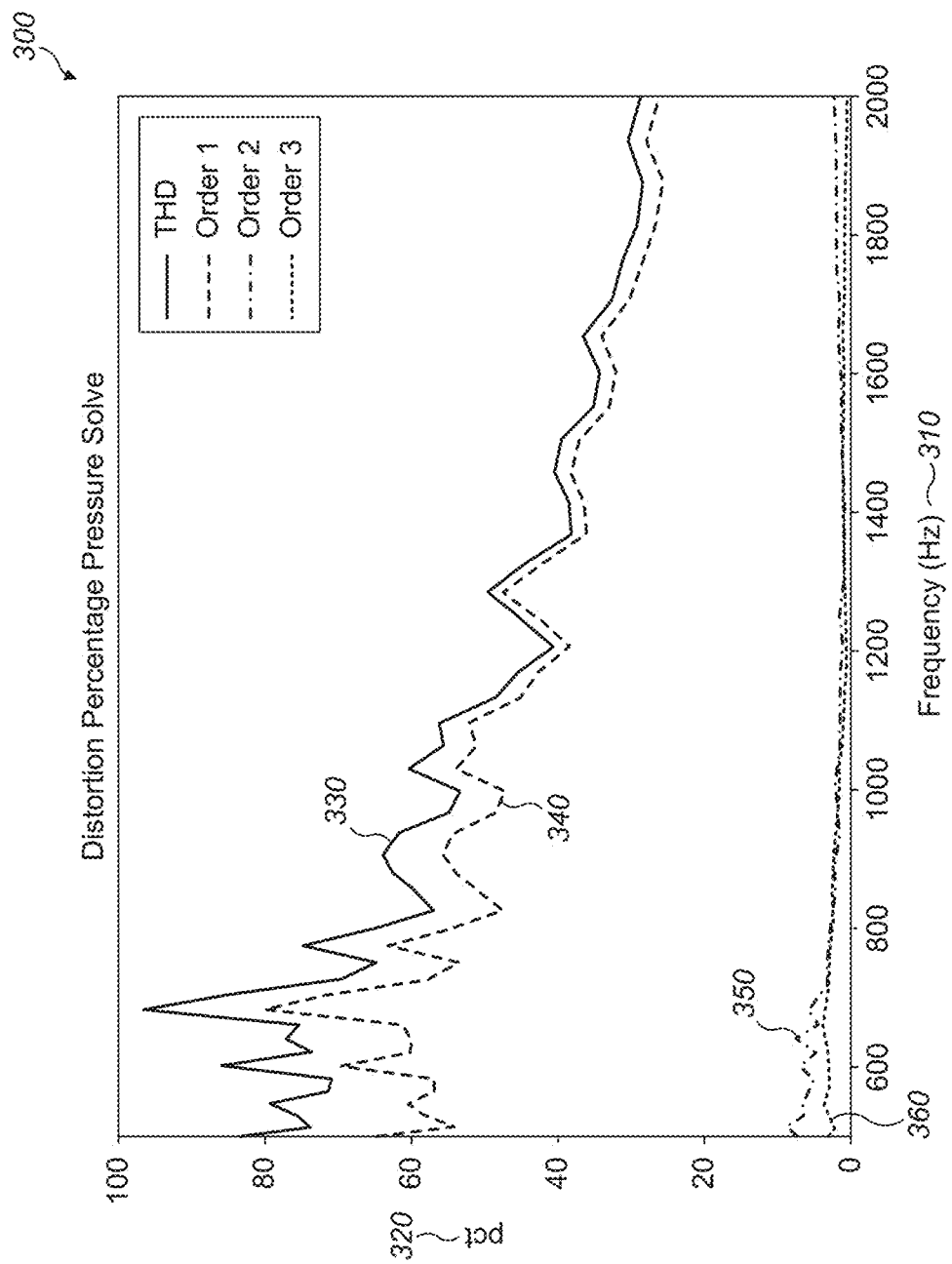
FIG. 3 shows a plot of total harmonic distortion and its harmonics.

Turing to FIG. 3, shown is a graph 300 entitled Distortion Percentage Pressure Solve. The x-axis 310 is frequency in hertz. The y-axis 320 is in percent. The solid line 330 is THD, the sum of the first 10 harmonics. The other curves show the first 3 harmonics. The dashed line 340 is order 1, The dot-dashed line 350 is order 2. The dotted line 360 is order 3. As expected, the overall harmonic distortion is dominated by the first order.

A P² modulation solution instead looks like (with slight variations per transducer if using only the contribution in the normal direction), $$P = \sqrt{.5 + .5\cos(\omega_d t)}\cos(\omega_c t),$$

and the resulting parametric audio is estimated by, $$P^2 \propto \cos(\omega_d t)\cos^2(\omega_c t) \propto \cos(\omega_d t) + \dots,$$

where all the terms in the " . . . " are ultrasonic. The only term in the audible spectrum left is the input modulation. This is illustrated by the lack of first-order dominance in the distortion shown in FIG. 4.

Figure 4:
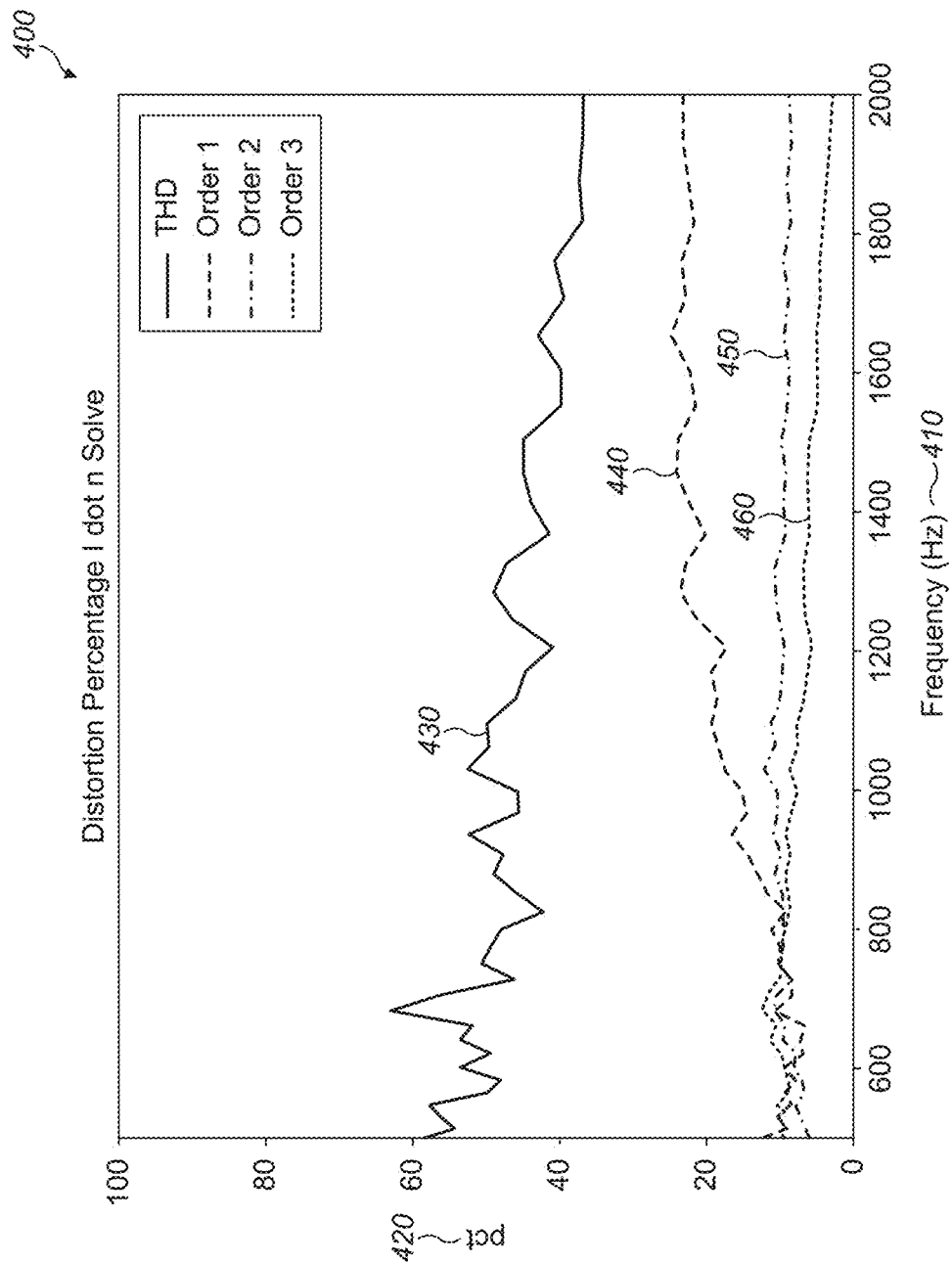
FIG. 4 shows a plot of total harmonic distortion and its harmonics.

Turning to FIG. 4, shown is a graph 400 entitled Distortion Percentage I dot n Solve, or distortion percentage of intensity dotted with a normal vector normal to the array versus modulation frequency. The x-axis 410 is frequency in hertz. The y-axis 420 is percent. The solid line 430 is THD, the sum of the first 10 harmonics. The other curves show the first 3 harmonics. The dashed line 440 is order 1, The dot-dashed line 450 is order 2. The dotted line 460 is order 3. Compared to pressure solve, the distortion is reduced and is composed of many orders, not dominated by the first.

The benefit of lower distortion for mid-air haptics is twofold. First, producing a nonlinear force more representative of the input allows gives a haptic designer more control of the haptics. A given force versus time profile that has been proven in another system, say a real button or contact-based haptic actuator for instance, can be more faithfully applied and reproduced by a mid-air haptic device employing this invention. Second, an ultrasound-based mid-air haptic device will always make parametric audio, even when only haptics are desired, and by reducing distortion, the array is able to contain the modulated frequency spectrum to a much narrower range. As illustrated in FIG. 1, parametric audio conversion from ultrasound to sound is more efficient at higher frequencies, while mid-air haptics are effective at lower frequencies (typically less than 200 Hz). The more the nonlinear modulation terms can be kept low, the less parametric audio will be produced.

Additional disclosure includes:
1. A mid-air haptic device consisting of:
   A. A set of transducers with known relative locations.
   B. Generating a plurality of ultrasonic waves from the transducers having at least one common focal point.
   C. A desired haptic force versus time.
   D. Modulating the generation of the ultrasonic waves so that the nonlinear acoustic force generated at the common focal point is the desired haptic force versus time.

2. A method as in paragraph 1 which includes a direction of the desired force.

3. A method as in paragraph 2 where the modulation of the ultrasonic waves substantially generates the desired nonlinear acoustic force in the desired direction.

II. Matrix Summation for Mid-Air Haptics as a Service

While matrix summation for mid-air haptics requires more bandwidth to achieve, the scalability and re-configurability of such a system is highly desirable in many real-world commercial applications which makes this an important architectural step.

To achieve this, the basis function computation remains entirely on the hardware side and the information is obtained from the hardware devices and the computation completed in an abstract form. Due to the nature of the computation and the latencies required for the system to be acceptable in the field of mid-air haptics, it is expected that this system would be implemented using a high speed interconnect to begin with, but that next generation wireless systems may well provide sufficient bandwidth at low enough latencies to be able to achieve this with remote compute facilities.

For this to function, a low-latency query-response system must be created between a controller device and the individual hardware devices which may physically include transducing elements. This may be implemented over a general computer network. The high-bandwidth network systems required for the connectivity of these hardware devices may be described by, but not limited to embedded low-voltage differential signaling (LVDS) communication channels, high speed wired networking systems or next generation wireless networks.

The first query response required is the matrices which are the number of control points square for given queried acoustic properties. These properties will be one or more of: acoustic pressure, acoustic particle velocity of the medium (which would generate potentially separate matrices in x, y and z velocity directions) and particle velocity in a given direction vector. These matrices are complex-valued. Metadata may be included with the request to configure the transducer field evaluation to allow for both diverging and converging focused scenarios or Bessel beam generation for example.

These matrices, once received by the controller may summed to allow multiple hardware devices to be controlled at once, wherein the hardware devices that are to be used are present in the summation. At this point, either the controller may take the data describing the control point properties such as intended phase (if applicable), intended amplitude and waveform dynamic range and process it into a solution vector for the matrix. This may be achieved on the controller device, or it may be exported to another system for processing.

Once the solution vector has been obtained it can be pushed to each hardware device for creation via the hardware available. However, a second mode is also necessary that runs a second speculative solution vector and returns the power level required of the worst case transducer to drive the speculative solution vector. This may be used to inform a limiting system to ensure that waveforms are always smoothly reproduced on each device.

On each device the basis function definition may include, but is not limited to, position of control point in x, y and z, normal to the control point with x, y and z components (defining the Poynting vector direction necessary to know the action direction of the acoustic radiation force vector), a time windowing function, which may be defined by a center time and a time radius, a complex-valued apodization coefficient.

A simulation query may be posed to the device in the form of the quantification of the acoustic quantities of a point, one or more of: acoustic pressure, acoustic particle velocity of the medium (which would generate potentially separate values in x, y and z velocity directions) and particle velocity in a given direction vector. These quantities are complex-valued.

Other queries may be posed to the individual hardware system to gather data on local conditions, such as for example temperature, humidity and air pressure. This data may then be amalgamated by the controlling device before making decision on what frequencies, wavelengths and period to use (and which are expected at the location of each hardware, and making decisions on which hardware devices to use).

A. Mathematical Background to the Acoustic Phased Array Problem

Writing this in mathematics, $\alpha_q(\chi_j)$ may be used to describe a complex-valued scalar linear acoustic quantity $\alpha$ measured at a position offset from the transducer element q by the translation vector $\chi_j$, which may evaluate to be acoustic pressure or an acoustic particle velocity in a direction chosen for each j, the matrix A may be written:

$$A = \begin{bmatrix} \alpha_1(\chi_1) & \cdots & \alpha_N(\chi_1) \\ \vdots & \ddots & \vdots \\ \alpha_1(\chi_m) & \cdots & \alpha_N(\chi_m) \end{bmatrix},$$

As this is matrix A is not square, and the degrees of freedom number more than the constraints, this is termed a 'minimum norm' system. It is 'minimum norm' because as there are infinitely many solutions, the most expeditious solution is the one which achieve the correct answer using the least 'amount' of x—the solution x with minimum norm. To achieve this, some linear algebra is used to create a square system from the minimum norm system Ax=b:

$$A^H A x = A^H b,$$
$$(A^H A)^{-1} A^H A x = x = (A^H A)^{-1} A^H b,$$

This $A^H A$ is now N columns by N rows and given that the number of transducer is often very large this is an equivalently large matrix, and since any solution method must invert it, with it, this is not an efficient method. A more accessible approach is to create a substitution $A^H z = x$, before applying a similar methodology:

$$Cz = AA^H z = Ax = b,$$
$$z = C^{-1} b = (AA^H)^{-1} b,$$

This time around, as $C = AA^H$ is a mere m columns by m rows, this result is a much smaller set of linear equations to work through. The vector z can be converted into x at any time so long as $A^H$ can be produced.

However, this does not end here. This approach is not just a fortuitous set of symbolic manipulations, the change of variables from the complex-valued vector that describes the drive of individual transducer elements x to the much lower dimensional z has further meaning. Each complex-valued component of z can be viewed as a complex-valued drive coefficient that pre-multiplies a focusing function which generates a focus from all of the individual transducer fields, wherein the focal point is co-located with each individual control point. For m control points therefore, there are m such focusing functions, and they can be viewed as defining a complex vector space $\mathbb{C}^m$ where points in this space correspond to possible configurations of these m 'focus points'.

B. Splitting the C Matrix

To account for the possibility that the optimal minimum norm solution is not used to form the C matrix, then this may be expressed via an extra weighting for each transducer and control point as $\sigma_{r,q}$, with r representing the control point index and q representing the transducer index—this can be viewed as reweighting the final x vector used as the excitation vector for the transducer elements by substituting $B^H z = x$, where:

$$B = \sigma \times A = \begin{bmatrix} \sigma_{1,1}\alpha_1(\chi_1) & \cdots & \sigma_{1,N}\alpha_N(\chi_1) \\ \vdots & \ddots & \vdots \\ \sigma_{m,1}\alpha_1(\chi_m) & \cdots & \sigma_{m,N}\alpha_N(\chi_m) \end{bmatrix},$$

and × here denotes component-wise multiplication. Defining the set of $$\alpha_c = [\alpha_1(\chi_c), \ldots, \alpha_q(\chi_c), \ldots, \alpha_N(\chi_c)],$$

and $$\beta_c = [\sigma_{c,1}\alpha_1(\chi_c), \ldots, \sigma_{c,q}\alpha_q(\chi_c), \ldots, \sigma_{c,N}\alpha_N(\chi_c)],$$

this adjusted C matrix may be expressed as:

$$C = \begin{bmatrix} \alpha_1 \cdot \overline{\beta_1} & \cdots & \alpha_1 \cdot \overline{\beta_r} & \cdots & \alpha_1 \cdot \overline{\beta_m} \\ \vdots & \ddots & \vdots & \ddots & \vdots \\ \alpha_r \cdot \overline{\beta_1} & \cdots & \alpha_r \cdot \overline{\beta_r} & \cdots & \alpha_r \cdot \overline{\beta_m} \\ \vdots & \ddots & \vdots & \ddots & \vdots \\ \alpha_m \cdot \overline{\beta_1} & \cdots & \alpha_m \cdot \overline{\beta_r} & \cdots & \alpha_m \cdot \overline{\beta_m} \end{bmatrix},$$

but the dot products for each element may be written as the summation where for instance $$\alpha_a \cdot \overline{\beta_b} = \sum_{q=1}^{N} \alpha_q(\chi_a) \overline{\sigma_{b,q}\alpha_q(\chi_b)}.$$

If there are multiple devices that have access to disjoint sets of transducer elements, so if there exist M devices such that the global transducer set may be numbered $q \in \{1, \ldots, N_1, N_1+1, \ldots, N_2, \ldots, N_M=N\}$, where device 1 drives transducers $1, \ldots, N_1$, device 2 drives transducers $N_1+1, \ldots, N_2$ and device M−1 drives transducers $N_{M-1}+1, \ldots, N$, then each dot product in the matrix C may be written:

$$\beta_a \cdot \overline{\alpha_b} = \left(\sum_{q=1}^{N_1} \alpha_q(\chi_a)\sigma_{a,q}\overline{\alpha_q(\chi_b)}\right) + \ldots + \left(\sum_{q=N_{M-1}+1}^{N} \alpha_q(\chi_a)\sigma_{a,q}\overline{\alpha_q(\chi_b)}\right).$$

This implies that the C matrix itself may be written in a per-transducer element form as:

$$C_{tx,q} = \begin{bmatrix} \alpha_q(\chi_1)\sigma_{1,q}\overline{\alpha_q(\chi_1)} & \cdots & \alpha_q(\chi_1)\sigma_{1,q}\overline{\alpha_q(\chi_r)} & \cdots & \alpha_q(\chi_1)\sigma_{1,q}\overline{\alpha_q(\chi_m)} \\ \vdots & \ddots & \vdots & \ddots & \vdots \\ \alpha_q(\chi_r)\sigma_{r,q}\overline{\alpha_q(\chi_1)} & \cdots & \alpha_q(\chi_r)\sigma_{r,q}\overline{\alpha_q(\chi_r)} & \cdots & \alpha_q(\chi_r)\sigma_{r,q}\overline{\alpha_q(\chi_m)} \\ \vdots & \ddots & \vdots & \ddots & \vdots \\ \alpha_q(\chi_m)\sigma_{m,q}\overline{\alpha_q(\chi_1)} & \cdots & \alpha_q(\chi_m)\sigma_{m,q}\overline{\alpha_q(\chi_r)} & \cdots & \alpha_q(\chi_m)\sigma_{m,q}\overline{\alpha_q(\chi_m)} \end{bmatrix},$$

yielding:

$$C = \sum_{q=1}^{N} C_{tx,q} = \left(\sum_{q=1}^{N_1} C_{tx,q}\right) + \ldots + \left(\sum_{q=N_{M-1}+1}^{N} C_{tx,q}\right).$$

This implies that the C matrices for individual transducers may be collected together by a recursive or hierarchical process that exploits sum-reduction operators to construct successively more complete representations of a distributed system of transducers, to be solved in a single central location (or the computation repeated in distributed locations for better fault tolerance). However, as the matrix B is required to take the z vector produced and reconstruct the transducer excitations, it is also necessary to express B as a disjoint set of matrices, where the B matrix for a given transducer q may be written:

$$B_{tx,q} = \begin{bmatrix} \sigma_{1,q}\alpha_q(\chi_1) \\ \vdots \\ \sigma_{m,q}\alpha_q(\chi_m) \end{bmatrix},$$

so the element of the excitation vector corresponding to transducer element q is written:

$$B_{tx,q}^H z = x_q.$$

Therefore, since each portion of the x vector may be stored locally as it is only necessarily required to drive the transducer elements, no information regarding individual transducer elements or their weightings needs to be communicated globally to obtain the transducer excitations—only the C matrix for each subset of the system is required to be communicated. As the C matrix is small, so long as latencies are carefully managed, the platform on which the C matrix is solved to generate the z vector may be chosen flexibly, which may include but is not limited to edge computing, mobile devices, remote servers etc.

Incarnations of the A matrix may also be constructed to generate linear acoustic quantities, such as the acoustic pressure or the particle velocity of the acoustic medium in a known direction. As these are linear quantities, they may be calculated by applying disjoint portions of the A matrix and transmitting only the computed quantities. Then via a similar sum-reduction process to that required to compute the C matrix for the system, any given acoustic quantity may be calculated from synchronised application of portions of x vectors, as any linear quantity $\alpha$ may be found as:

$$A_{tx,q} = \begin{bmatrix} \alpha_q(\chi_1) \\ \vdots \\ \alpha_q(\chi_m) \end{bmatrix},$$

$$\acute{\alpha}_{\Omega,q} = A_{tx,q} x_q,$$

where $\acute{\alpha}_{\Omega,q}$ is the contribution of the transducer q to the final simulated linear acoustic quantity field. This is useful to give an added layer of control and certainty to the system to allow the controlling device to accurately gauge the capabilities and constraints of the platform or platforms with which it may be communicating.

III. Null Regions in Airborne Ultrasonic Fields

Various excitation solvers exist to generate an arbitrary acoustic field considering specific points/lines/planes/volumes. Many of these allow the possibility of specifying the desired pressure distributions. By placing a null point (a point with desired pressure of zero or a relatively small value), a null line, a null plane or a null volume at sensitive locations, we can mitigate the amplitude of ultrasound found there.

A. Null-Points, Surfaces, and Volumes

In one embodiment, we can use a mathematical model of each transducer to build a matrix A. In this matrix, each column corresponds to a unique location in space and each row is the transducers complex acoustic output at that location. The mathematical model can be in real units or units which correlate to each transducer's output. Using this design, we can define the problem of solving for each transducer's drive phase and amplitude to the following formula, $$Ax = b,$$

where x is a column vector containing the complex activation of each transducer, and b is the desired complex output at each physical location defined in the columns of A. This is an under-determined linear system, with many possible values of x which yields b.

One solution to this system of equations is given by the Moore-Penrose inverse of A, denoted by $A^+$, with the solution explicitly given by, $$x = A^+ b.$$

This is a least-squares solution to the linear system and has many beneficial properties useful to ultrasonic arrays which can include minimizing the total magnitude of activation. This approach has been applied to create dynamic high-pressure points for mid-air haptics to good effect (Long et al. Siggraph 2014). But this methodology is more flexible that simply creating high-pressure regions—each entry in b can be an arbitrary value, both high or low pressure and the Moore-Penrose inverse will yield a solution which approximates that field. By setting some values of b to substantially small values and we can create 'null' points in the field.

In one embodiment of this invention, we use the Moore-Penrose activation solution with null points placed near sensitive items/animals/people to mitigate any possible effects caused by ultrasound.

Placing multiple null points around a sensitive object can further decrease the pressure at that object. In one illustrative arrangement, placing multiple null points in a circle or plus shape (i.e. +) around the central null can enlarge this region.

Figure 5A:
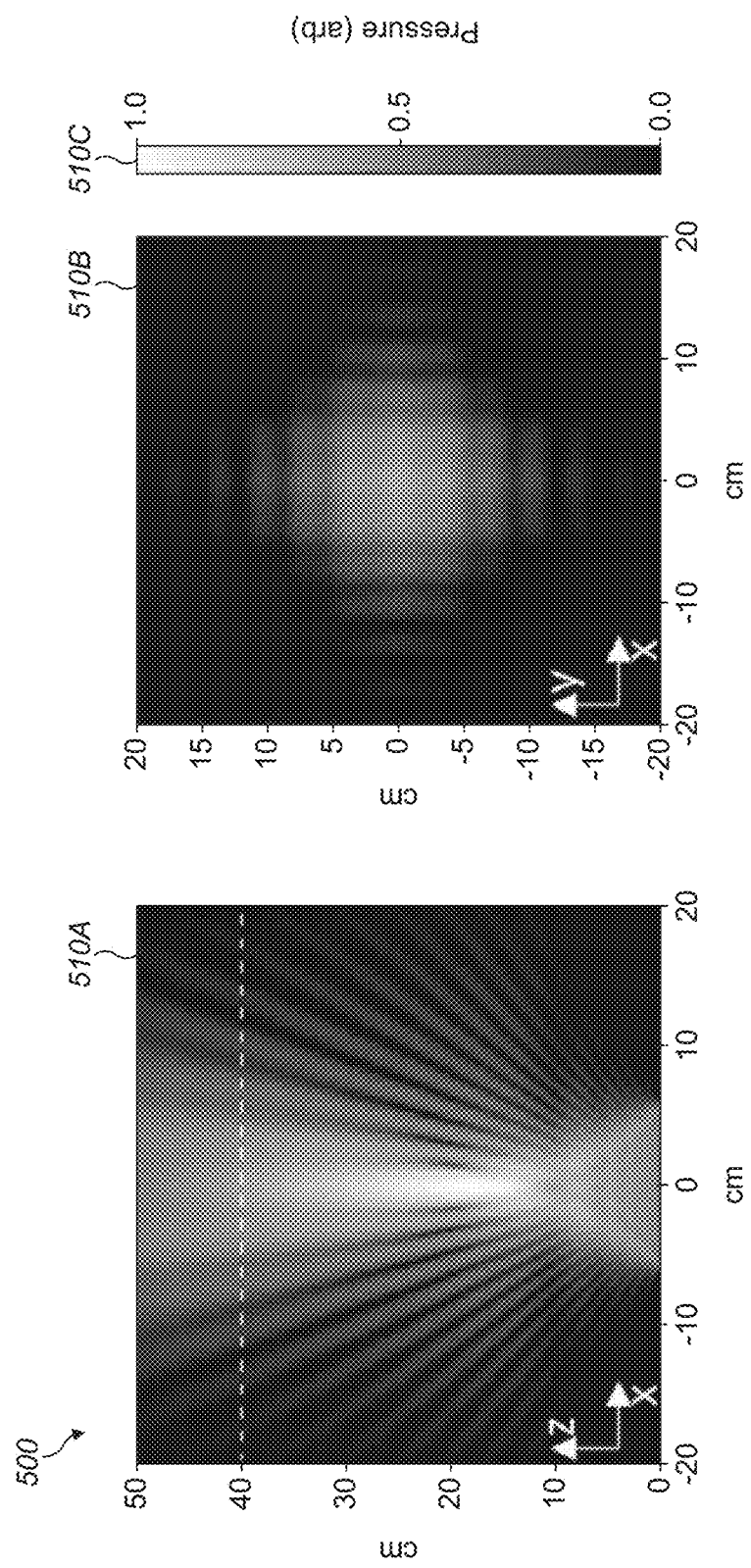
FIGS. 5A, 5B, and 5C show low-pressure area simulations in an acoustic field.
Figure 5B:
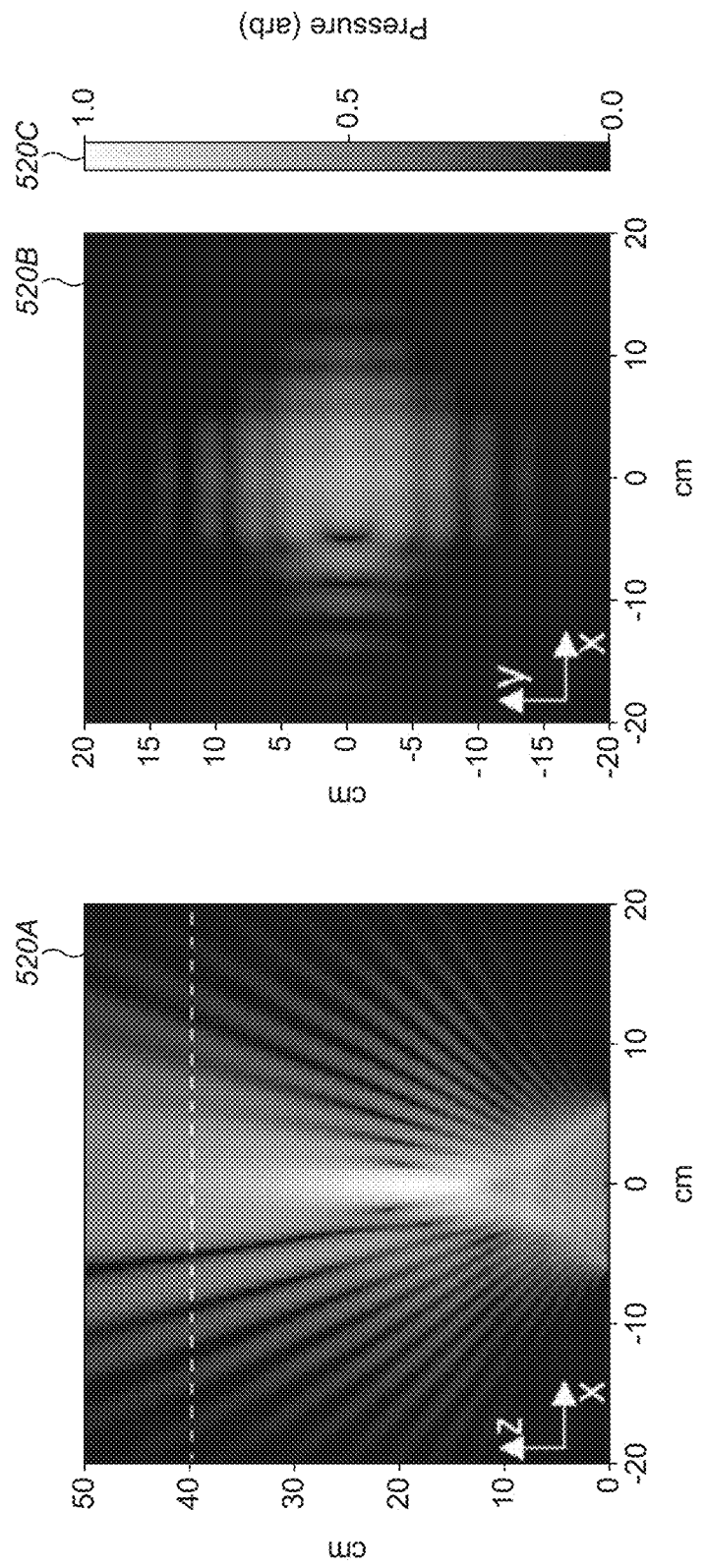
Figure 5C:
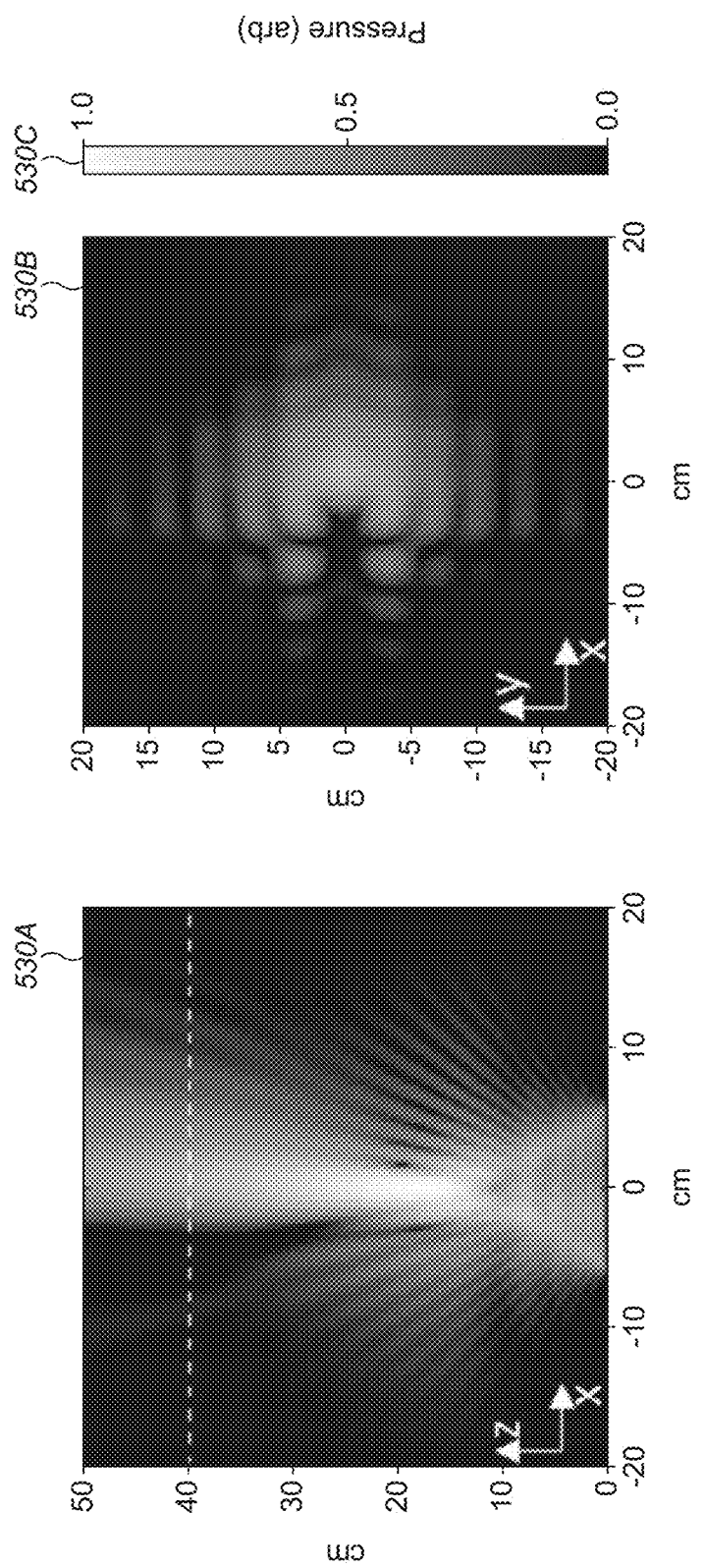

Turning to FIGS. 5A, 5B, and 5C, shown are simulations 500 of using the null-point solver to create a low-pressure area in the acoustic field. The Figures show 3 ultrasonic phased array simulations using 40 kHz ultrasound from a 256-element array in a square rectilinear arrangement centered at the origin and oriented along the z-axis. To solve for the activation of each transducer, a simple vibrating disk model is used which matches experimentally measured transducer output. Activation coefficients are solved by a power iteration for optimal phase followed by the Moore-Penrose inverse. This algorithm is detailed elsewhere (Brian Kappus and Ben Long, Spatiotemporal Modulation for Mid-Air Haptic Feedback from an Ultrasonic Phased Array, ICSV25, Hiroshima, 8-12 Jul. 2018).

In FIG. 5A, no nulls are used. Shown is the x-z plane 510A, the x-y plane 510B (shown at z=40 cm), and the arbitrary pressure scale 510C. A focus point is placed at [x, y, z]cm=[0,0, +20] where the origin of the coordinate system is in the centre of the array and the array is oriented in the positive z direction.

In FIG. 5B, there is one null at x=−5 "cm", y=0 "cm", z=40 "cm". Shown is the x-z plane 520A, the x-y plane 520B shown at z=40 cm, and the arbitrary pressure scale 520C. A single null is generated at [−5,0, +40] and the pressure is reduced at the point from 200 Pa to <20 Pa.

In FIG. 5C, 5 nulls are in the z=40 "cm" plane, the first at x=5 "cm", y=0 "cm", z=40 "cm" and the other 4 offset by 1 "cm" in +x, −x, +y, and −y, forming a 'plus' motif. This achieves a larger effective nulled region. Shown is the x-z plane 530A, the x-y plane 530B (shown at z=40 cm), and the arbitrary pressure scale 530C. This shows the effect of using multiple null points to achieve a larger null region. In this case the null points are a cluster of 5 points, one centred at the desired null, with the other 4 forming a 'plus' offset by 0.1 cm. This achieves a lower pressure null at the center and a larger <20 Pa null region. This could be used if the object is larger or there is uncertainty in its position.

In all cases the focal point (at [0,0, +20]) amplitude is substantially unaffected. In this example, the focus point could be used for airborne haptic feedback while shielding a device such as a sensitive microphone at the null region.

More complicated arrangements are possible. Turning to FIG. 6, shown is a simulation 600 having a cluster of 4 focus points at [+5,0,+30], [−5,0,+30], [0, +5,+30], [0, −5,+30]. These could be modulated for haptics or parametric audio. Another simulation example of using the null-point solver on a more sophisticated acoustic field to achieve a null. In this case the field is creating 4 high-pressure points at x, y, z ("cm")=[+5,0,+30], [−5,0,+30], [0,+5,+30], [0,−5,+30]. The plane of interest is at z=40 "cm".

Figure 6A:
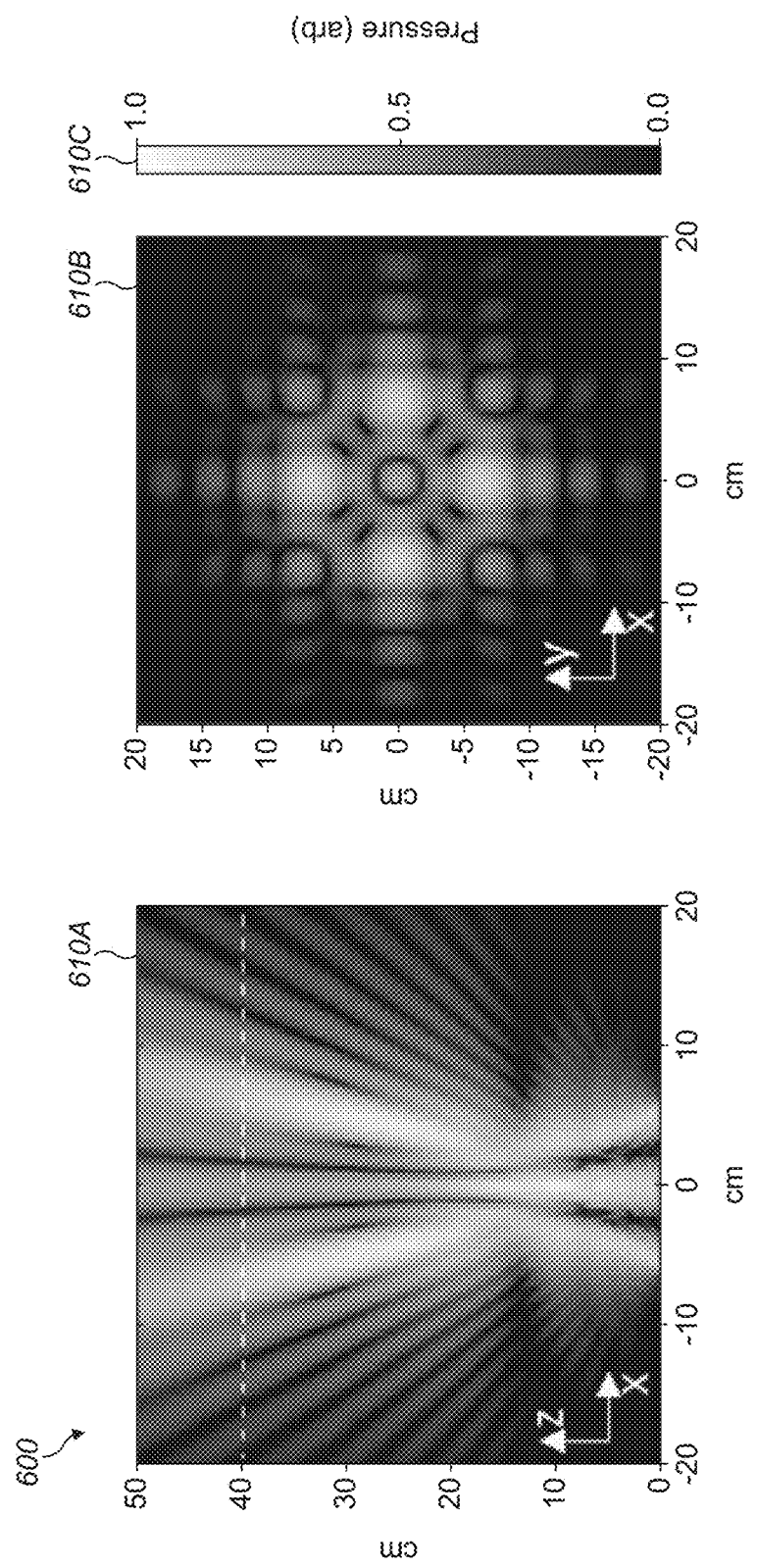
FIGS. 6A, 6B, and 6C show low-pressure area simulations in an acoustic field.

In FIG. 6A, shown is the x-z plane 610A, the x-y plane 610B (shown at z=40 "cm"), and the arbitrary pressure scale 610C. No nulls were used.

Figure 6B:
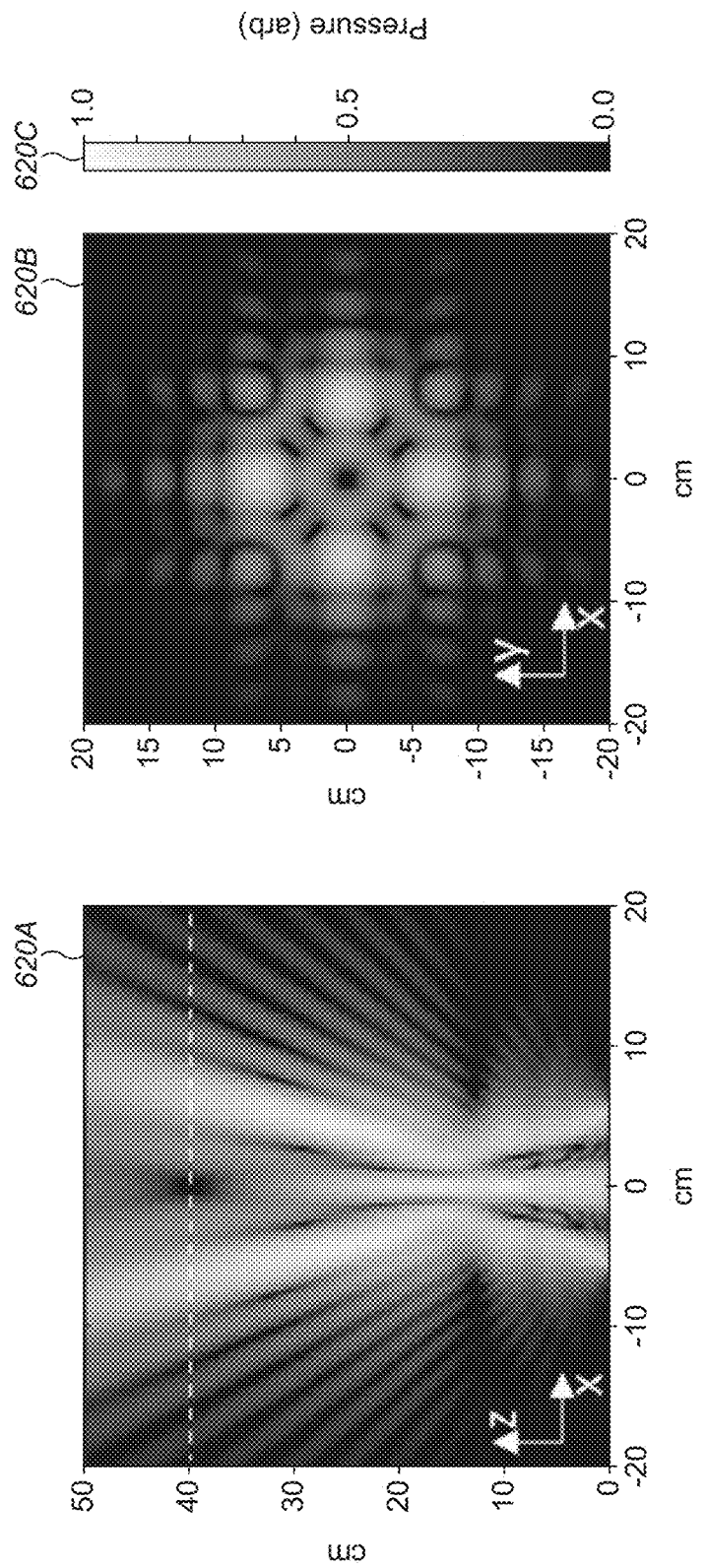

In FIG. 6B, shown is the x-z plane 620A, the x-y plane 620B (shown at z=40 cm), and the arbitrary pressure scale 620C. One null point is at [0,0,+40].

Figure 6C:
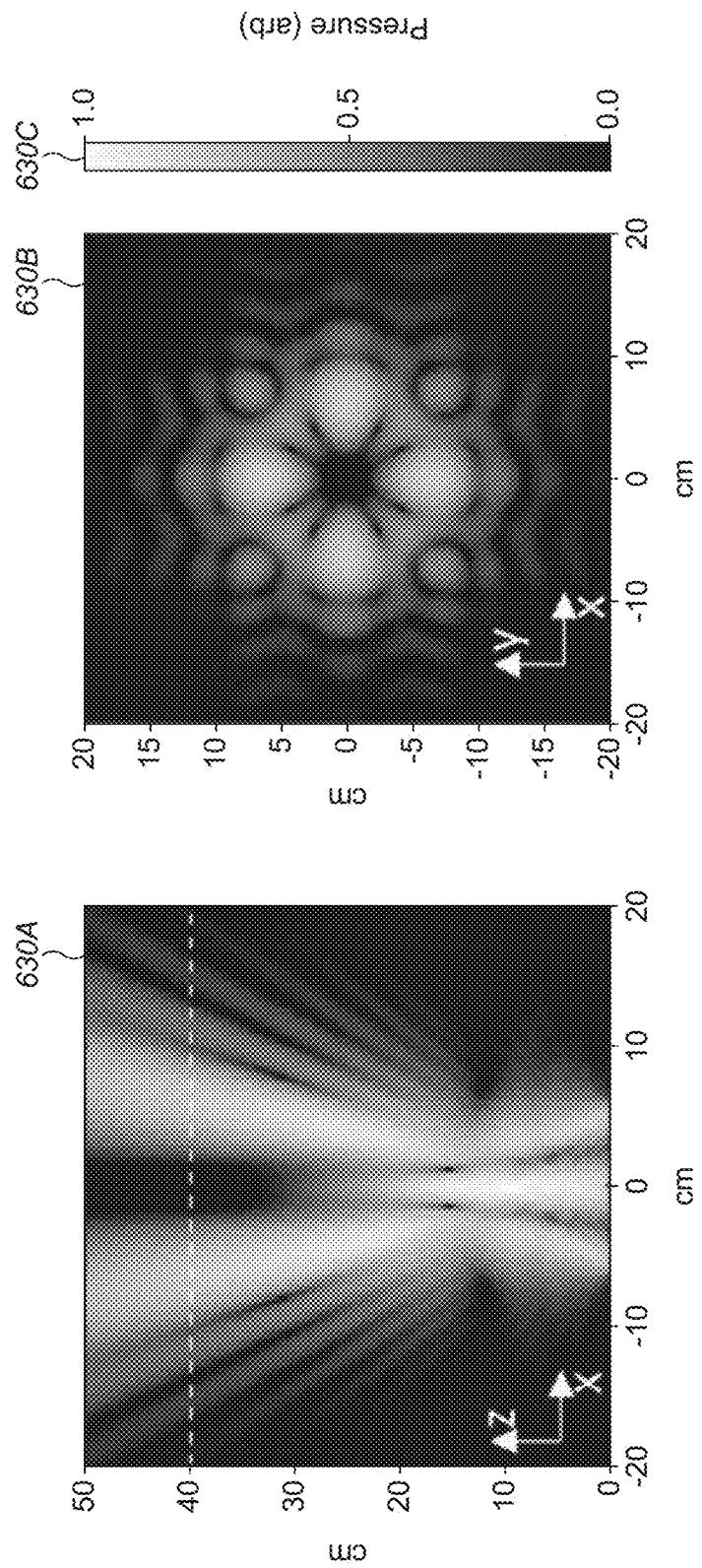

In FIG. 6C, shown is the x-z plane 630A, the x-y plane 630B (shown at z=40 cm), and the arbitrary pressure scale 630C. This has 5 nulls in a 'plus' arrangement with 3 "mm" spacing centered at the [0,0,+40]. The cluster of 5 nulls is able to create a larger low-pressure region. As before, adding multiple points increases the size of the null region without significantly affecting the high-pressure field.

The specific set of nulls presented above represent a single possible solution. Many other solutions exist. Spacing of several null points around a target location can be dependent on the wavelength of sound being used. In a system with the ability to change its carrier wavelength, null points can be adjusted accordingly. Possible volumetric arrangements of nulls include, but are not limited to, rectilinear, hexagonal, regular polygon, and regular polyhedra.

In addition to clustering the null regions directly atop the target location, in another arrangement, the nulls are placed in between the array and the target. This creates a 'shadow' region which extends beyond the null point location. In another arrangement, the null points can be placed around the target location. Both methods can yield a larger effective low-pressure region using fewer nulls depending on the array layout and placement.

Possible null arrangements including clustering around the target location as well as shadowing the target are shown in FIGS. 7A-7D. FIGS. 7A-7D show 3-D graphs 1300 as further examples of null point arrangements to create a low pressure (null) region in space around an array of transducers.

Figure 7B:
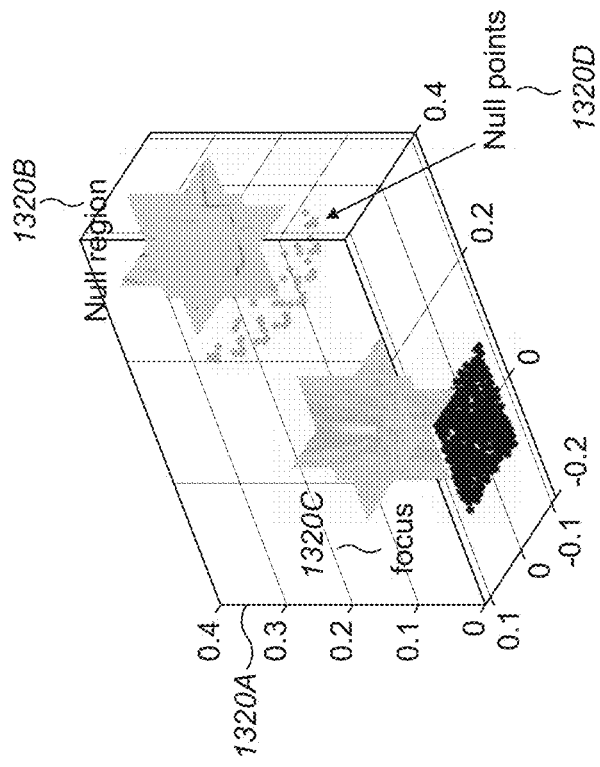
FIGS. 7A, 7B, 7C, and 7D show null point arrangements in space around an array of transducers.
Figure 7A:
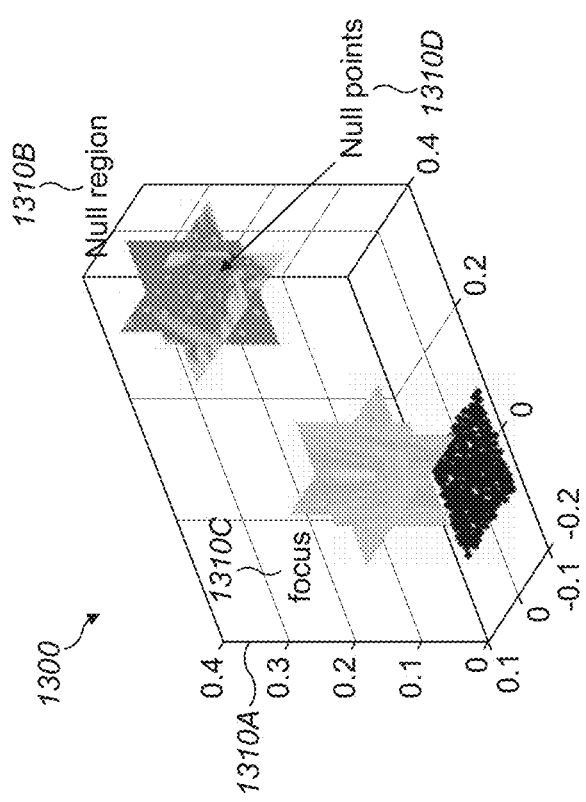

In FIG. 7A, the graph 1310A shows a grouping of transducers with a focus 1310C above the transducers. Also shown is an example of cubic packing of nulls points 1310D around a desired null region 1310B.

In FIG. 7B, the graph 1320A shows a grouping of transducers with a focus 1320C above the transducers. Also shown is an example of spherical packing of nulls points 1320D around a desired null region 1320B.

Figure 7D:
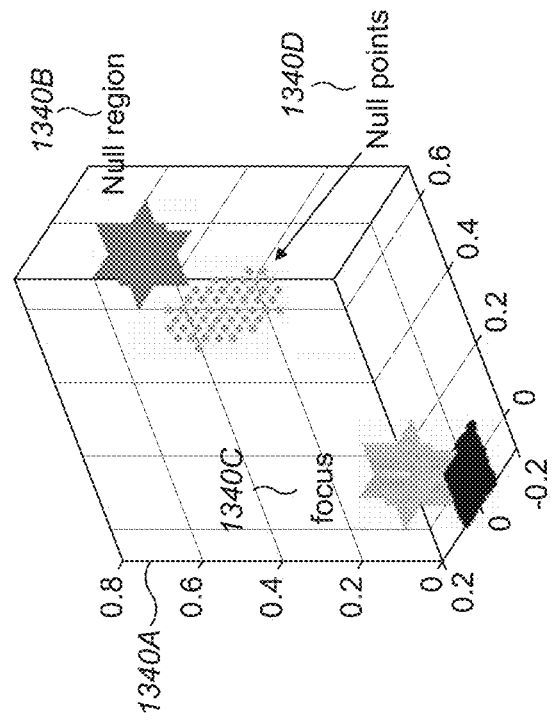
Figure 7C:
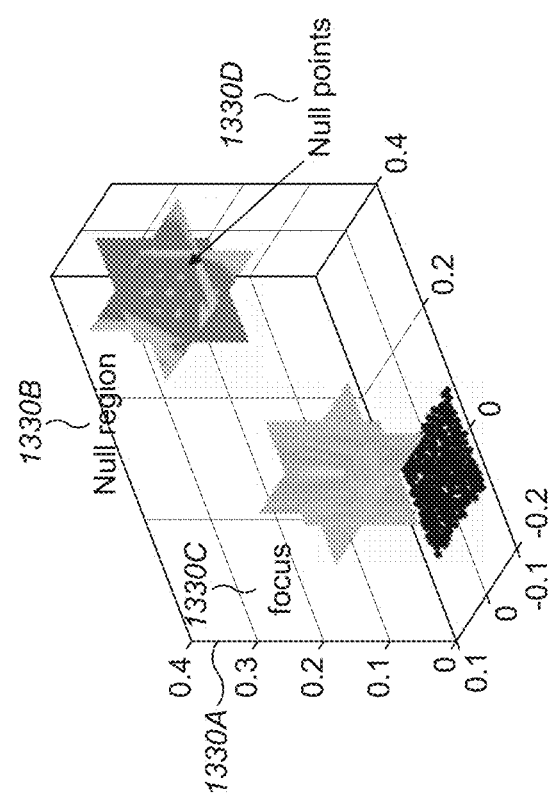

In FIG. 7C, the graph 1330A shows a grouping of transducers with a focus 1330C above the transducers. Also shown is an example of hexagonal packing of null points 1330D around a desired null region 1330B.

In FIG. 7D, the graph 1340A shows a grouping of transducers with a focus 1340C above the transducers. Also shown is a rectilinearly-pack plane of null points 1340D in between the array and a desired null region 1340B.

Other null arrangements with more complex geometry are also possible. Examples of possible strategies, include but are not limited to, packing spheres with pre-defined uniform distributions of null points (whose number may change over time), using phyllotactic spirals or other spiral generated using irrational angular increments to generate sphere surface packings which depending on scaling factor may be of uniform or non-uniform density around a locus, generating meshes of the desired volume to be filled (which may be predefined or take input from a tracking system or meshed point cloud data) and using charged particle-like repulsion mechanisms to generate packings of these meshes or other volumetric shapes, which may be static or dynamic or wherein the packing density may be made non-uniform by varying the 'charge' on each null point which may further be parameterized as a function of the spatial location of the null point to allow for non-uniform densities. The mesh data taken from the tracking system may be dynamic and in each case the number of null points may be changed dynamically over time.

If a number of null points are to be introduced into the acoustic field their physical separation and their number can be varied depending on the required 'quiet zone' dimensions. The 'packing arrangement' has an influence on the effectiveness of using nulls to suppress the average sound pressure within a given volume. A metric may be defined which estimates this effectiveness. An example metric is the percentage of a given volume below a threshold sound pressure. FIG. 8 illustrates this effect through a simulation of a 256 element ultrasonic array with Moore-Penrose inverse solution producing a high-pressure point at z=15 cm and a set of nulls clustered around a target at [x, y, z]=[30,0,30]cm. It shows that the number of nulls, their physical spacing and their spacing geometry influence the predefined metric. Indeed, increasing both spacing and number arbitrarily can have a negative effect on the volume which has the desired low pressure and care must be taken to test a choose a proper arrangement of null point locations. Our example uses a $6\lambda^3$ volume as the assessment volume, however the assessment volume and/or geometry will be application specific.

Figure 8A:
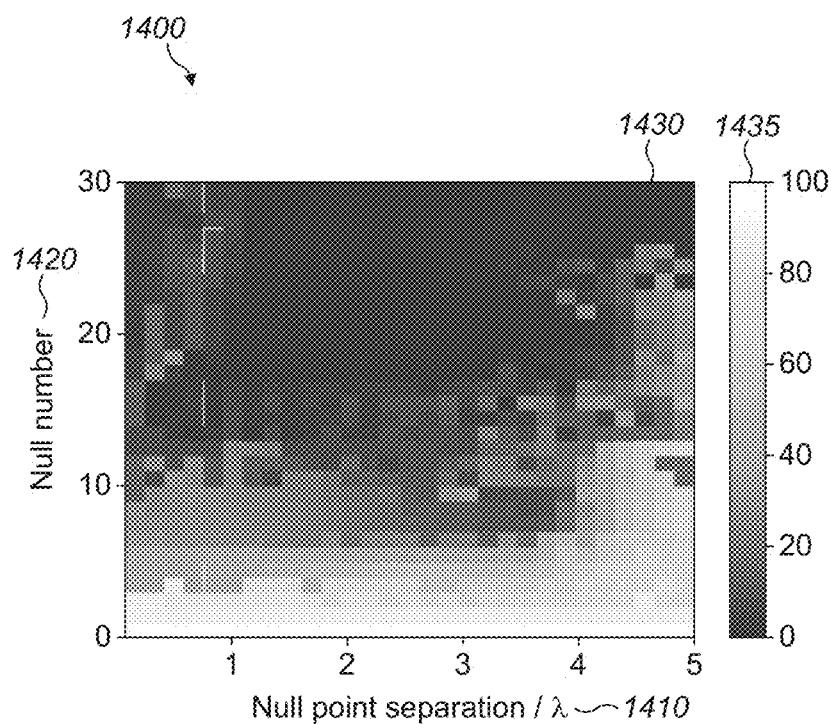
FIGS. 8A and 8B show quiet zone efficiency for a 3D spacing arrangement.
Figure 8B:
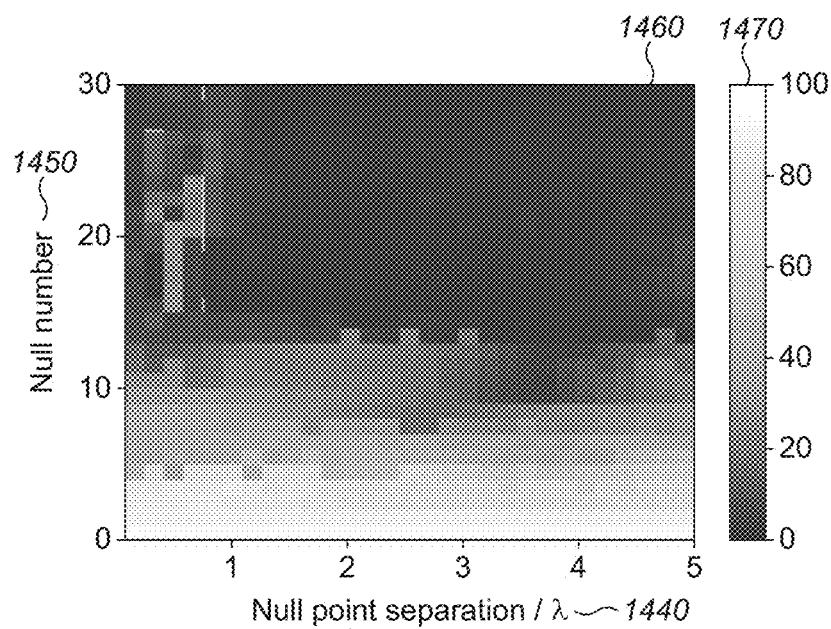

Turning to FIGS. 8A and 8B, shown are a series of graphs 1400. The metrics were created with the percentage of a $6\times^3$ volume (centered at x=−30 "cm", y=0 "cm", z=+30 "cm") with pressures greater than 6.3 "Pa" with the number of nulls and their spatial separation being varied. A single focal point was created at x=0 "cm", y=0 "cm", z=+15 "cm" at a pressure of 1125 "Pa".

FIG. 8A shows a plot 1430 having a rectilinear 3D spacing arrangement showing the relationship between quiet zone efficiency (i.e. percentage of volume below a threshold pressure). The x-axis 1410 is null point separator/λ. The y-axis 1420 is a null number. The key 1435 is percentage of volume below a threshold pressure. Shown is the relationship between quiet zone efficiency (i.e., percentage of volume below a threshold pressure) for a 3D spacing arrangement.

FIG. 8B shows a plot 1460 having a hexagonal 3D spacing arrangement showing the relationship between quiet zone efficiency (i.e. percentage of volume below a threshold pressure). The x-axis 1440 is null point separator/λ. The y-axis 1450 is a null number. The key 1470 is percentage of volume below a threshold pressure.

Figure 9:
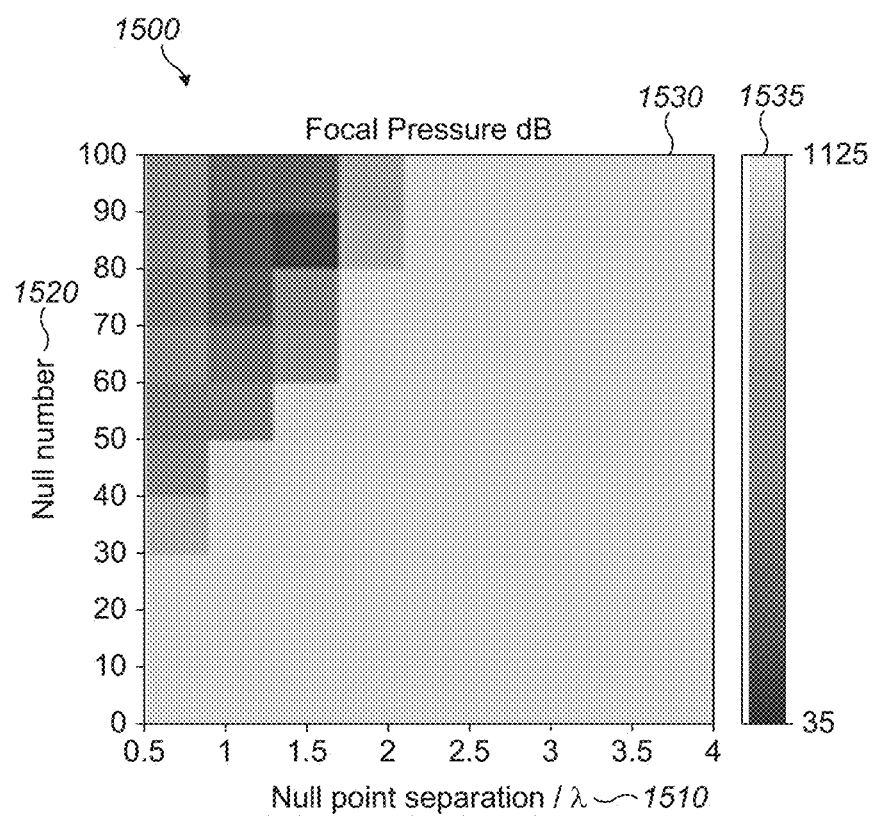
FIG. 9 shows a plot of pressure of a single focal point.

An important consideration for the use of null pressure points is their effect on the general acoustic field, specifically the control points used for applications such as mid-air haptics. A key parameter for focused ultrasound is the focal point pressure. FIG. 9 is a graph 1500 that shows that effective quiet zone may be created without a loss of focal point pressure. The x-axis 1510 is null point separator/λ. The y-axis 1520 is a null number. The key 1535 is in db. The plot 1530 shows the pressure of a single focal point created at x=0 "cm", y=0 "cm", z=+15 "cm" with a requested pressure of 1125 "Pa". Each point in the figures represents a specific combination of null point number and null point separation.

As with low-pressure volume, some arrangements can reduce performance by influencing focus pressure and again, simulation and/or careful selection must be implemented for maximum performance. When the number of null points is generally less than the number of transducers, the desired focal point pressure is unaffected by the inclusion of null points. When a relatively large number of null points is used the desired focal point pressure may be lowered.

In another arrangement, experimental measurement of a particular setup can be used to improve null performance. With at least one microphone placed in a target null location, this can be used to evaluate performance of null placement. Null point placement and desired pressure can be adjusted, and microphone measurements used as a performance metric. Any number of search algorithms including gradient of least descent can be used to approach an experimentally optimal solution. In addition, at least one microphone can be placed at various high-pressure focus points or regions to evaluate the influence of null placement on focus performance simultaneously.

In one application of this invention, nulls can be used to shield sensitive microphones from undue ultrasonic pressure. In another arrangement of this invention, at least one of the sensitive microphones can transmit its signal or some metric related to the amount of ultrasound received back to the ultrasonic array or device controlling the array. In this way, this signal can be used as feedback to dynamically adjust null placement for optimal reduction of ultrasonic pressure at the sensitive microphone.

It is important to place nulls in the appropriate location for a given target. If the target is moving, such as a person's head or hand-held devices, tracking that target is important. Adjusting the null point locations according to tracking data can maintain the effectiveness of the null region with a minimal amount of null points needed. In one arrangement, the target location can be added to a matrix of null location vectors resulting in a null arrangement which follows the target. For a shadow arrangement, the tracked target location can be both a distance and normal to build a set of null point locations. In another arrangement, the tracked target could move some nulls but not others, leaving some null regions were expected new targets could arise. Multiple tracked targets can exist which could dynamically add, subtract, and move null points, surfaces, or volumes, as necessary.

Tracked objects need not be identified as sensitive in order to add a null region. In one arrangement, any object in the field which is moving at a speed greater than some threshold, e.g., 1 cm per second, that is not identified as a hand (for haptics), would be identified as a target for a null region. This reduces the tracking requirements to hand-identification, and movement tracking-significantly simpler than identification of specific sensitive targets such as heads, and/or microphones. Once an object has been classified as a target, through movement, it can be tracked even if it stops moving. In another arrangement, target objects identified through movement will continue to be considered targets until they have left a pre-specified volume of interaction.

In another arrangement of this invention, the null positioning can be generated by first simulating the field created by the desired high-intensity focus points without any nulls included. Away from the focus points, where low pressure is desired, ideal placement of nulls can be generated using the simulated information. As an example, nulls can be placed preferentially on the highest-pressure peaks of the fringing field in the target low-pressure region. In another arrangement, the simulated null-free field can be used as a weighting function to adjust the exact placement of null points.

Field simulation can also be used to refine placement of null points. For instance, with sufficient computing power available, different arrangements of nulls can be evaluated for effectiveness at each update cycle of the phased array with only the most effective being passed on to array control for emission. For example, for a given field one can define a set of metric-points where the field is evaluated. These can be at desired null points, desired high-pressure points, or any other important point/line/plane/volume in the field. At each field-compute cycle, an initial position for both high-pressure focus points and nulls are selected (this could be based on the previous cycle or completely new), then the field is evaluated at the metric-points and related to a quality metric. This metric could be simply the absolute difference in simulated pressure from desired pressure, squared pressure or something more sophisticated such as the nonlinear pressure or particle velocity. Next, the null and high-pressure points are adjusted and the field and resulting quality metric is evaluated again. One method of computing this adjustment of the null point positions may be achieved by computing the partial derivative of the quality metric with respect to the change in the spatial positioning of the nulls along the spatial axes. When this refinement achieves an acceptable metric or a maximum number of evaluations has happened, then the best solution is passed on to be produced. Adjusting the positions can be static (a set number of possibilities) or adaptive, updating the null point locations as the field changes over time. As the acoustic field is band-limited in spatial frequency, all partial derivatives may be computed by a finite differencing scheme that operates at sub-wavelength scales. This implies the adaptive method could, for instance, test a small adjustment in each direction for each point and then proceed along the gradient of steepest descent.

In another arrangement of this invention, null surfaces or volumes may be considered instead of points. In this setup, after a null surface or volume is chosen its effect on the transducer activation coefficients can be estimated and applied. In one arrangement, the field is simulated without the null surface or volume. Next, pressure at the surface or within the volume is considered phase inverted. Next, this inverted pressure volume or surface is simulated as a source and its resulting pressure is propagated back to the array. This simulation can be accomplished with traditional discrete or continuous methods. This will yield a set of acoustic pressures and phases at each transducer location. These values can then be used as a partial or full perturbation of the original transducer activation coefficients. Applying this perturbation can be done by direct sum, partial sum, weighted sum, or some other solution method.

The above simulations consider the regions to be within an infinite volume without reflections. While this is often a good approximation in large, open spaces, in more enclosed spaces, reflections of the ultrasound become a significant contribution to the pressure in the desired null region. If the area around the array is carefully measured, such as through 3D scanning, this information can be used to inform a simulation of the area. With reflections included in an acoustic simulation, this can be used to modify the basis functions (also called transducer model) on a transducer-by-transducer basis, or to a repeated transducer basis function. When included in the transducer model, the Moore-Penrose inverse of the matrix A will be able to compensate for reflections. In another arrangement, the basis functions can be left unmodified and instead null point locations and/or amplitudes can be adjusted based upon an output simulation which includes reflections. By including tracking information, such as a 3D point cloud from a stereo camera or time of flight sensor, the simulation of reflections can be further refined by dynamically updating the current state of the interaction volume.

In another arrangement, instead of purely simulating reflections, experimental data can be taken to characterize the environment for a given array placement and this data included in transducer models or field simulations. This could be measurements of an empty interaction volume or many measurements which include intended use case scenarios such as people standing in front of the array with their hand out. In one arrangement, the volume of interaction is scanned by a microphone and a transducer model is fit to this data out to some interaction distance. Since this measurement includes reflections, the model will more accurately reproduce nulls.

Null placement, amplitude, and phase can be computationally difficult depending on the number of factors included in the modelling. Including dynamically-changing reflections from people moving around the interaction volume, in particular, is difficult. Machine learning is particularly suited to these types of problems and can be used to reduce computational complexity. In one arrangement, a supervised-learning scenario can be built using microphones as feedback. Any number can be placed in the environment, including at null target locations, and non-zero pressure locations. In addition, information about the environment can be used as input including, but not limited to, a dynamic point cloud of the environment. A neural net is then setup to output null point locations and target phase and amplitude. Training this setup would involve capturing the microphone output for a wide array of zero and non-zero-point placements and drive conditions with a variety of environment conditions. Note that this could be real-life microphone and point-cloud data or purely simulated data. This trained machine-learning system could then output best-guess null point arrangements dynamically for significantly less computational power than a full acoustic simulation.

Figure 10A:
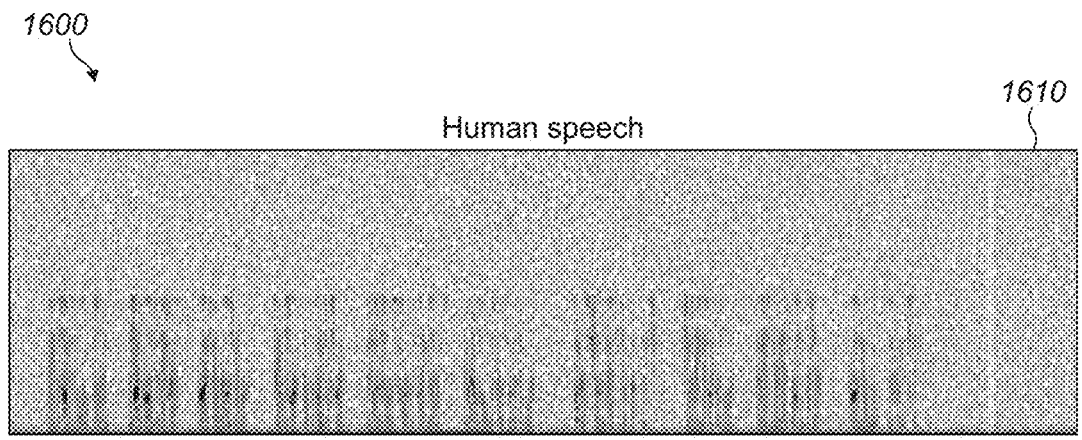
FIGS. 10A, 10B, and 10C show spectrograms of recorded human speech.
Figure 10B:
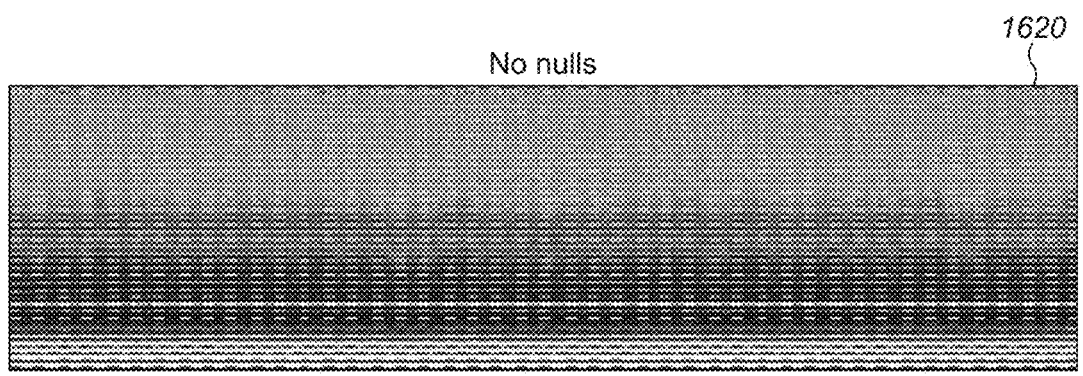
Figure 10C:
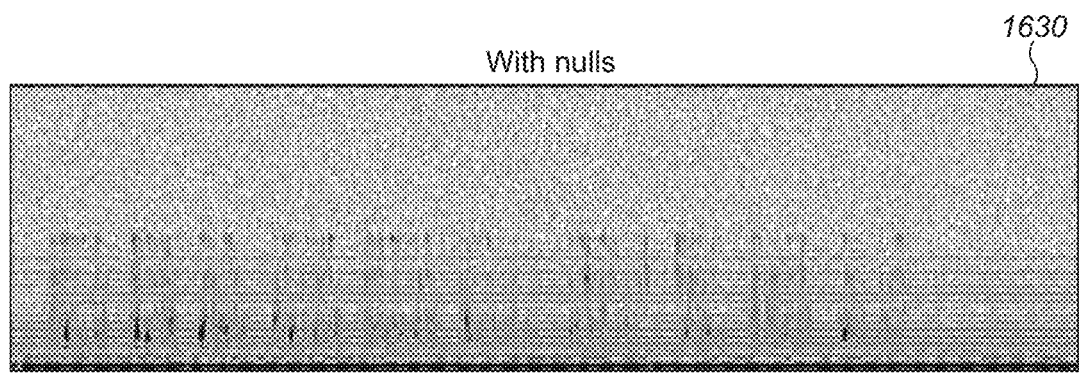

Turning to FIGS. 10A, 10B, and 10C shown are spectrograms 1600. For each spectrogram, the x-axis is time; the y-axis is frequency; and the darker the color, the more the signal FIG. 10A shows human speech 1610 recorded with a MEMS microphone without ultrasound present. FIG. 10B shows human speech 1620 recorded with high-intensity ultrasound revealing that the microphone is overloading and unable to pick up spoken voice. FIG. 10C shows human speech 1630 recorded with high-intensity ultrasound near a haptic focus point surrounded by spherically-packed null pressure points. Thus, without the null points reducing the pressure at the microphone, the speech recorded in FIG. 10B is unintelligible. While not identical to FIG. 10A, the speech in FIG. 10C is intelligible.

B. Helicity

Helicity in the context of acoustics is a traveling wave carrying angular momentum.

Helicity can be given to an acoustic field by adding a phase shift related to the angular position of each transducer, $$X = X_0 e^{im\phi}$$

where $X_0$ is the original activation coefficient to form the desired field for a given transducer, $\phi$ is the angle of the transducer on the array (in radians) relative to an arbitrary starting axis, and m is the helicity. m imparts not only a net angular momentum but also can create a null in any region that before had a focus. The size of this region is related to the value of the helicity. Integer values of helicity are often better behaved with arbitrary fields but fractional m is also possible. As with null points, field simulation can be used to refine the value of the helicity dynamically.

This technique is valuable primarily in applications where the acoustic pressure is directed towards a sensitive object which is to be narrowly avoided such as parametric audio. The center of the beam or point can be placed directly on the sensitive target and by adding helicity, the target will receive a reduced amount of ultrasound.

FIGS. 11-14 show examples simulations of a 256 element ultrasonic array operating at 40 kHz using helicity. In FIGS. 11A, 11B, 11C, 11D, 12A, and 12B, helicity is applied to a beam or plane wave. The hole in the ultrasonic field created by the helicity follows the steering of the beam. In FIGS. 13 and 14, helicity is applied to a focused field. Like the beam solution, the null region formed by the helicity follows the focus point as it is steered. In both cases the null region is well defined and widened with increasing m and can be placed on a sensitive target.

Turning to FIGS. 11A, 11B, 11C, and 11D, shown are simulations 700 using helicity to create a null region in the center of a plane wave.

Figure 11A:
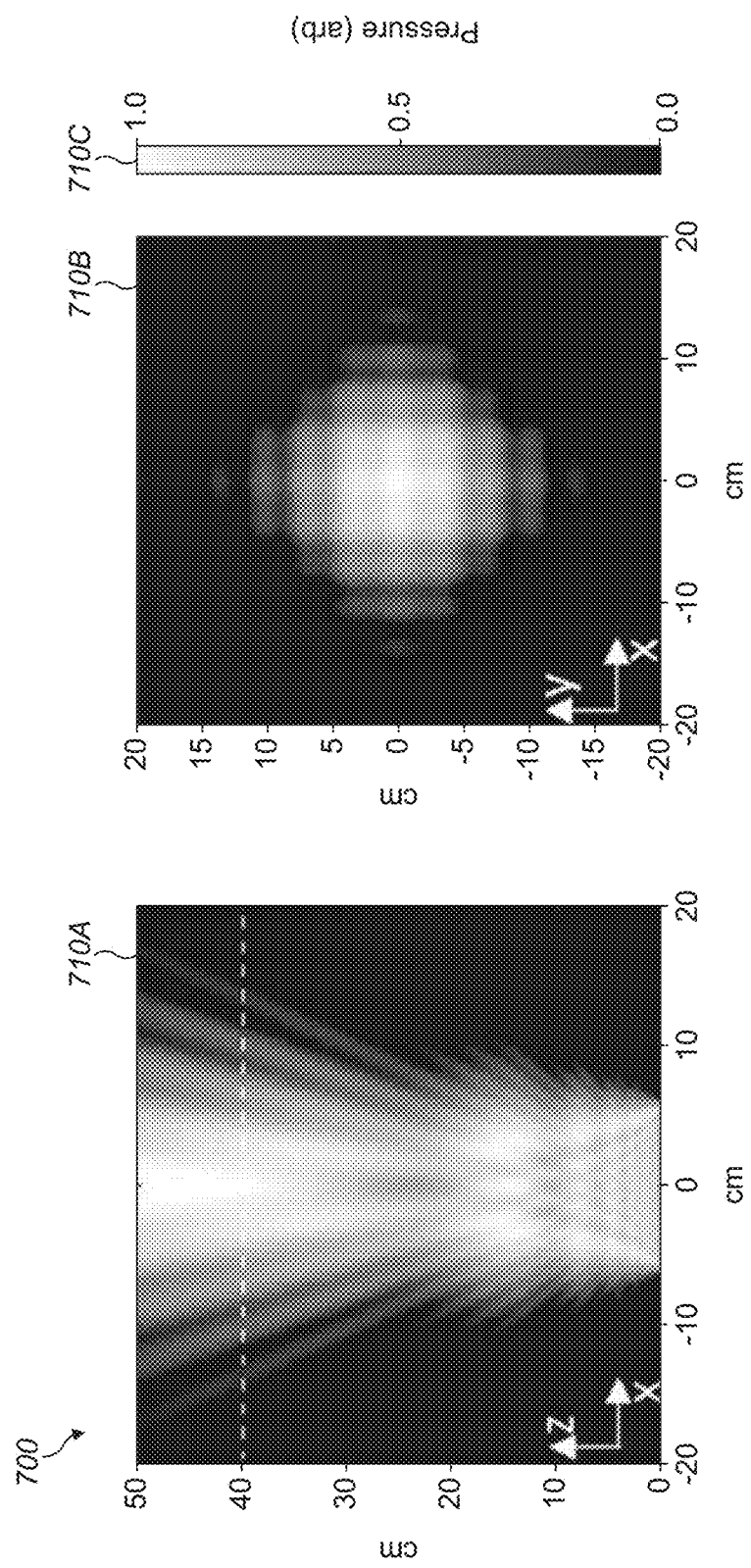
FIGS. 11A, 11B, 11C, and 11D show low-pressure area simulations in an acoustic field.

FIG. 11A shows the x-z plane 710A, the x-y plane 710B (shown at z=40 "cm"), and the arbitrary pressure scale 710C. This is formed from a basic plane from a 16 "cm" edge array of 40 "kHz" transducers.

Figure 11B:
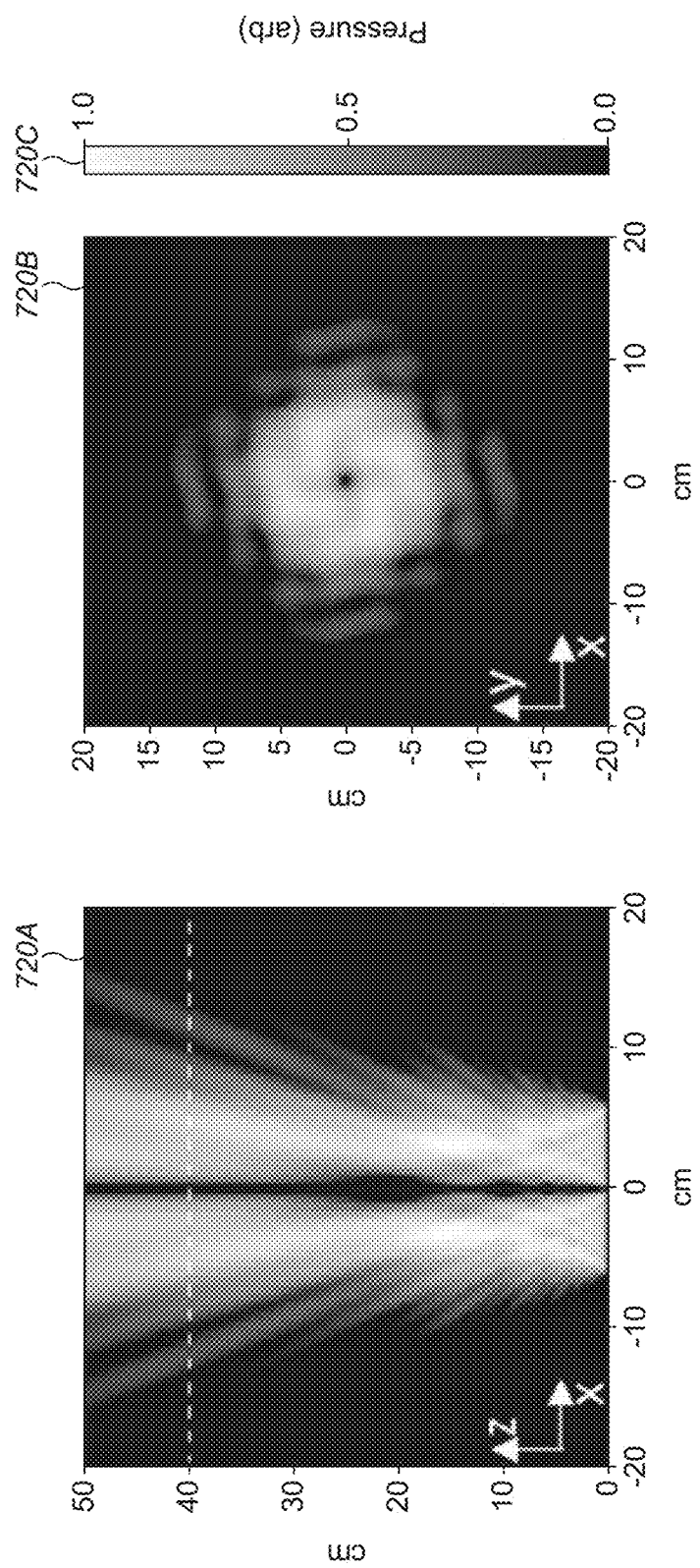

FIG. 11B shows the x-z plane 720A, the x-y plane 720B (shown at z=40 cm), and the arbitrary pressure scale 720C. This is formed by adding helicity of m=1.

Figure 11C:
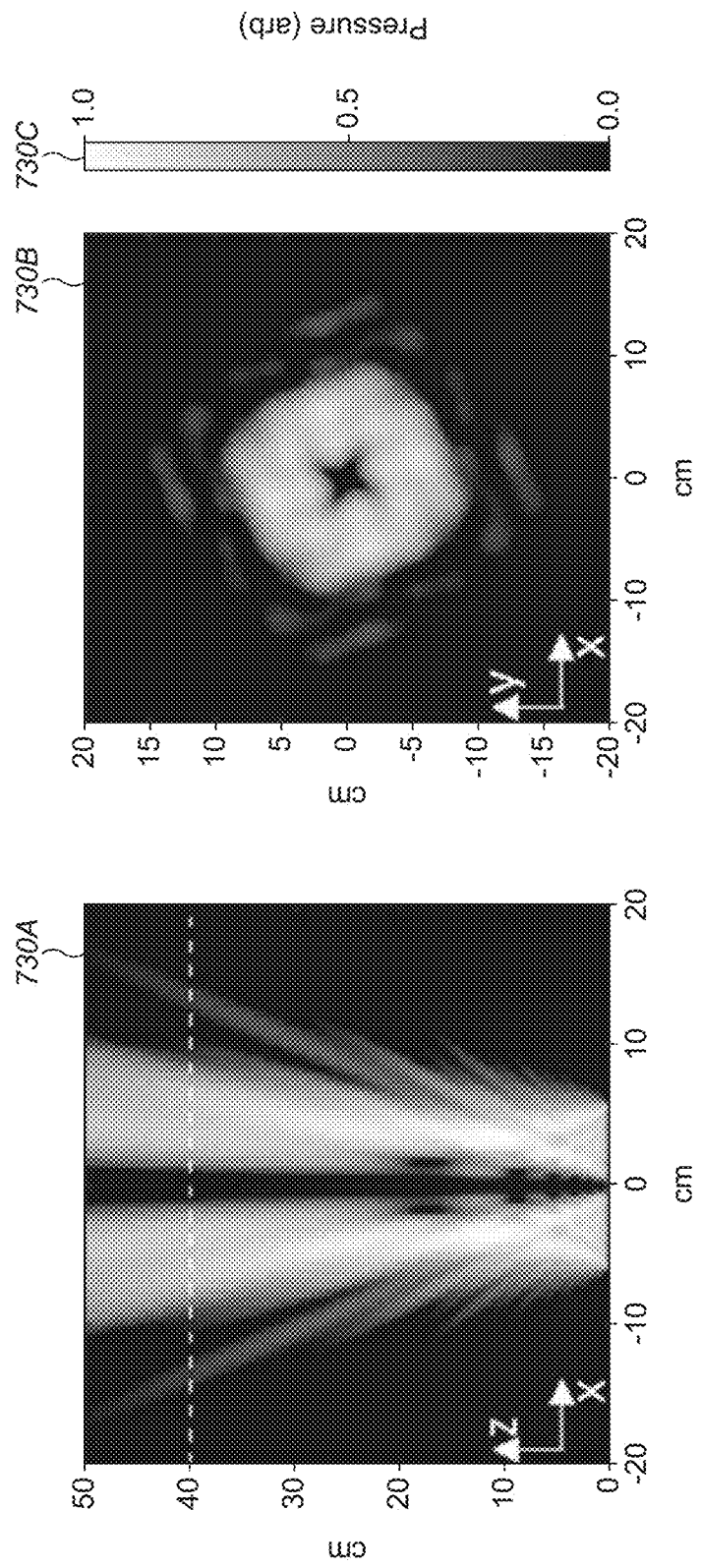

FIG. 11C shows the x-z plane 730A, the x-y plane 730B (shown at z=40 cm), and the arbitrary pressure scale 730C. This is formed by adding helicity of m=2.

Figure 11D:
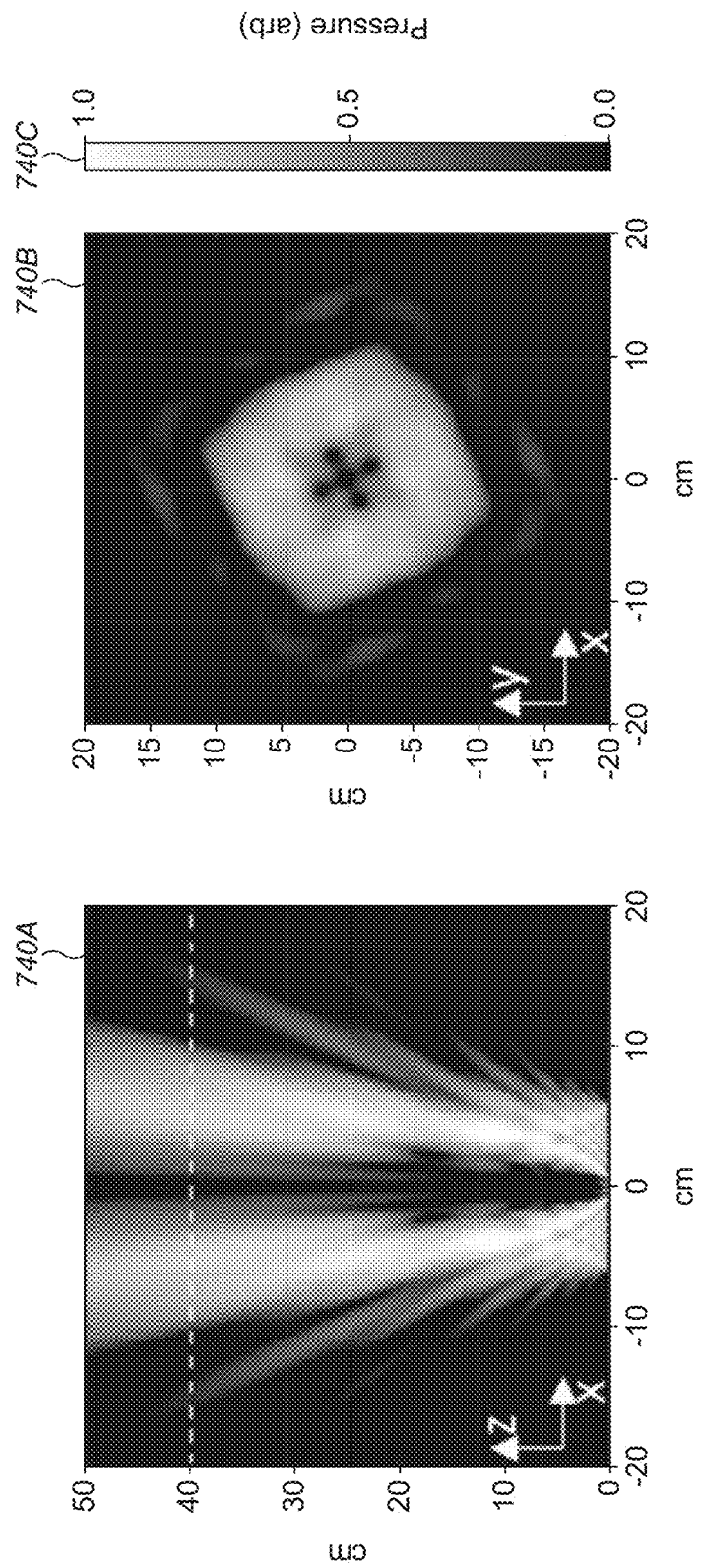

FIG. 11D shows the x-z plane 740A, the x-y plane 740B (shown at z=40 cm), and the arbitrary pressure scale 740C. This is formed by adding helicity of m=3.

Figure 12A:
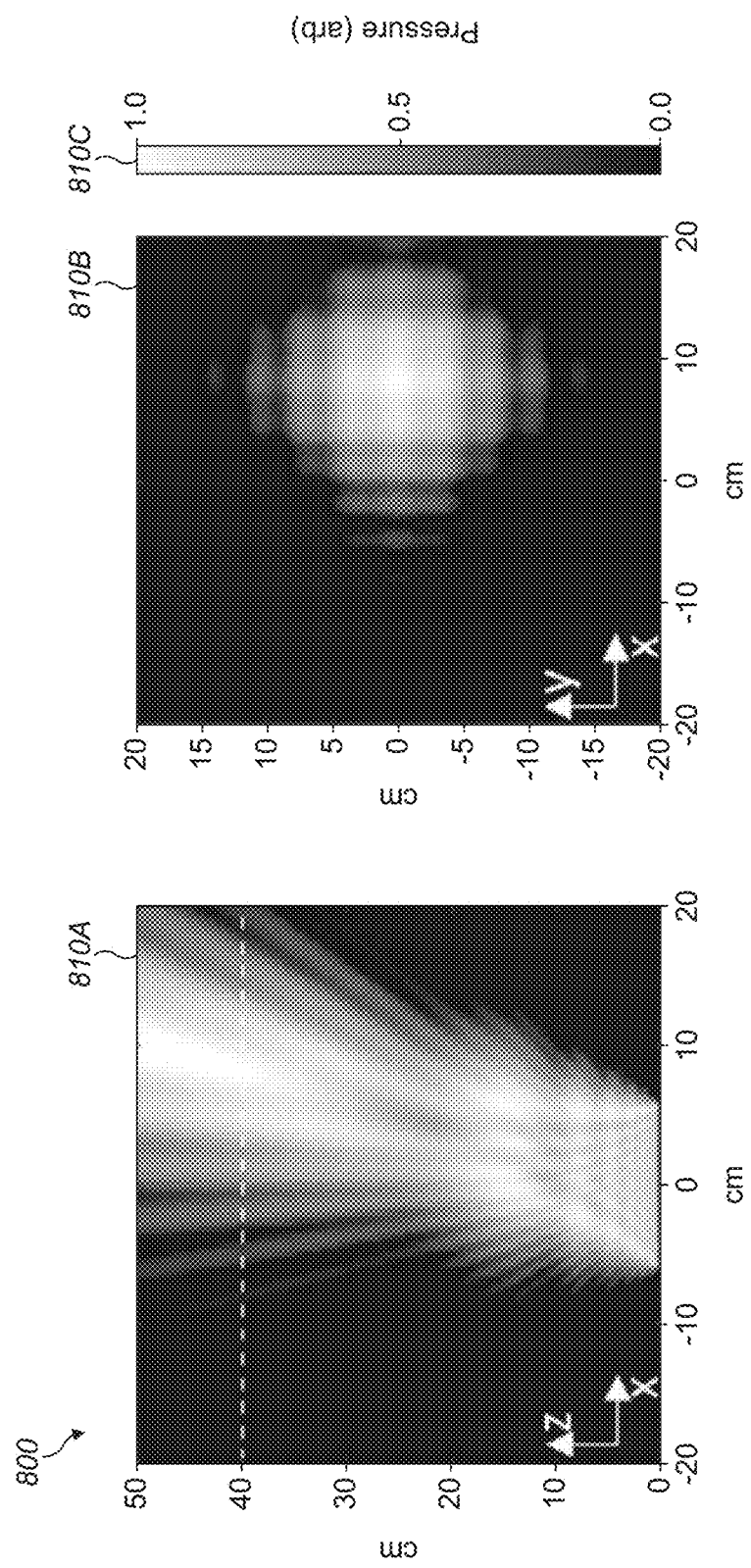
FIGS. 12A and 12B show low-pressure area simulations in an acoustic field.
Figure 12B:
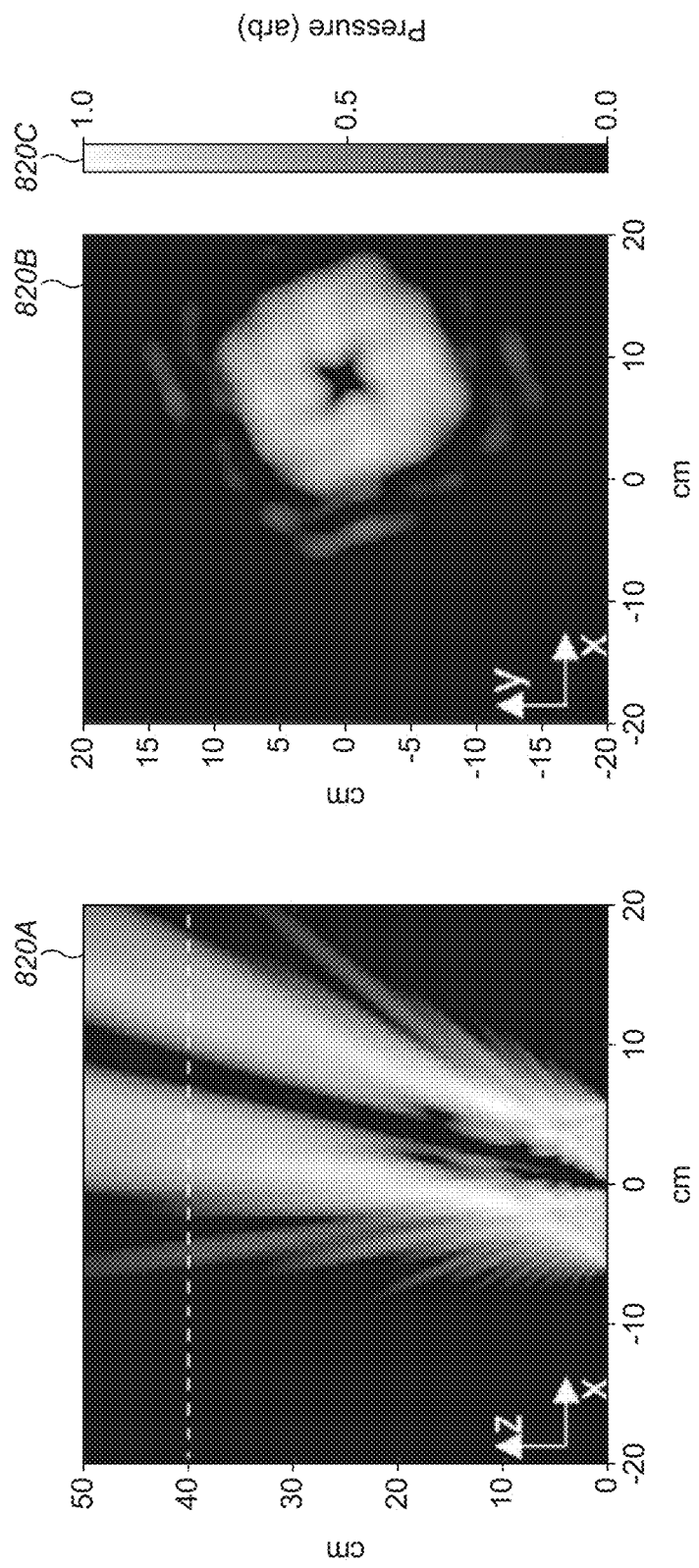

Turning to FIGS. 12A and 12B shown are simulations 800 using helicity to create a null region in the center of a plane wave. This is formed from a basic plane from a 16 "cm" edge array of 40 "kHz" transducers.

FIG. 12A shows the x-z plane 810A, the x-y plane 810B (shown at z=40 cm), and the arbitrary pressure scale 810C. No helicity is added in the steered beam.

FIG. 12B shows the x-z plane 820A, the x-y plane 820B (shown at z=40 cm), and the arbitrary pressure scale 820C. This is formed from a basic plane from a 16 "cm" edge array of 40 "kHz" transducers. Here, the helicity is added (m=2).

Figure 13A:
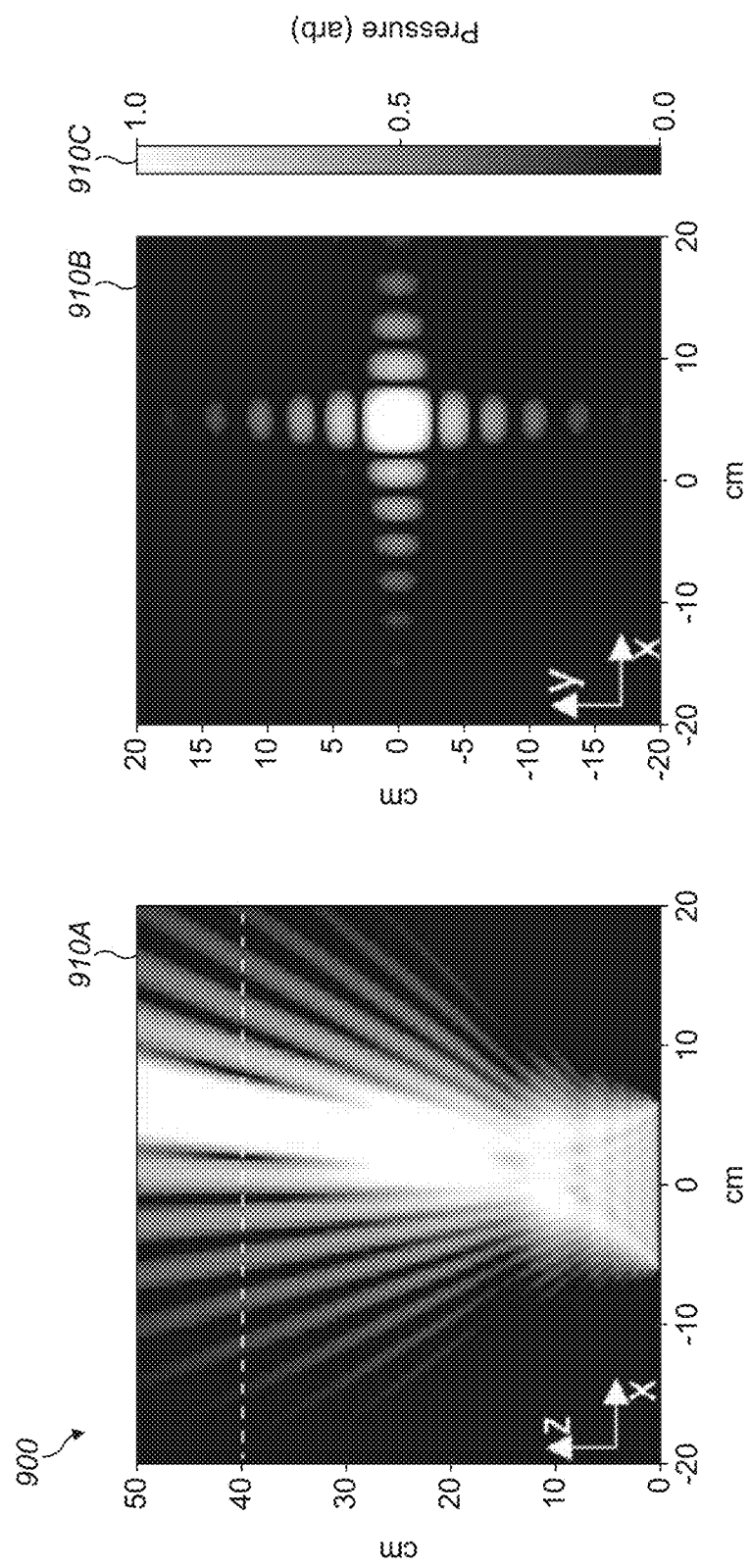
FIGS. 13A and 13B show low-pressure area simulations in an acoustic field.
Figure 13B:
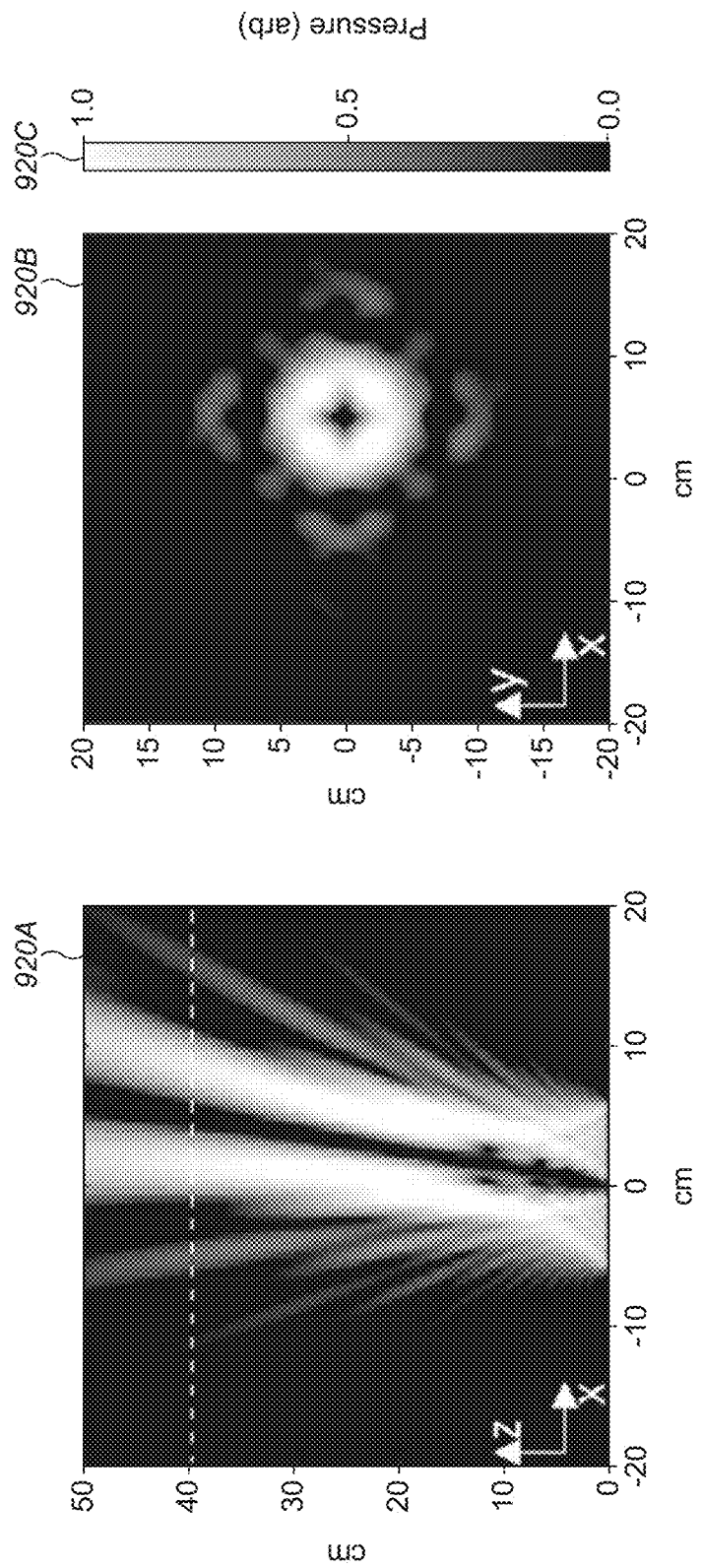

Turning to FIGS. 13A and 13B shown are simulations 900 adding helicity to open a null region in a steering focus point.

FIG. 13A shows the x-z plane 910A, the x-y plane 910B (shown at z=40 cm), and the arbitrary pressure scale 910C. Here, there is a single focus point at x=+5 "cm", y=0 "cm", z=+40 "cm".

FIG. 13B shows the x-z plane 920A, the x-y plane 920B (shown at z=40 cm), and the arbitrary pressure scale 920C. Here, helicity is added to create a null in the center of the focus (m=2).

Figure 14A:
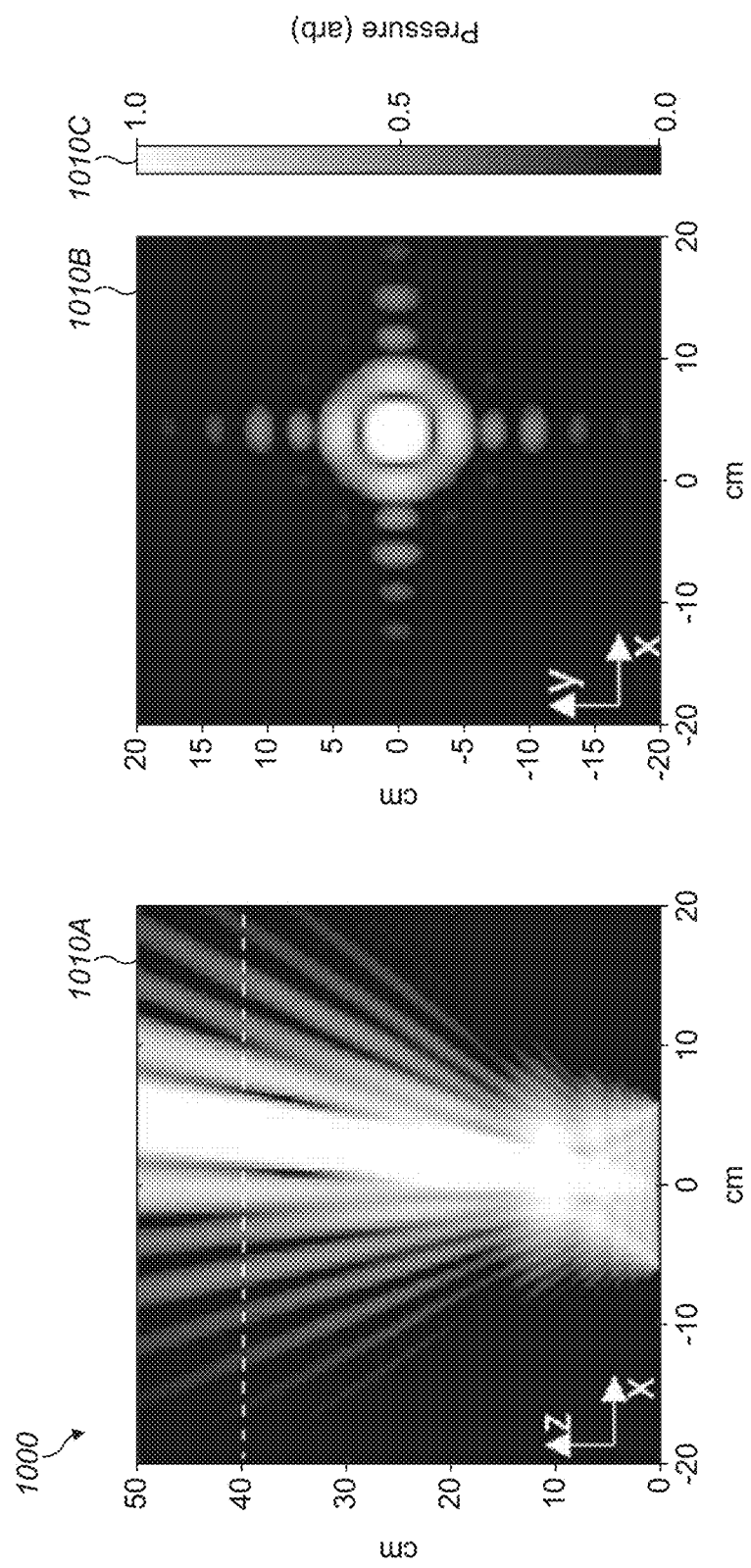
FIGS. 14A and 14B show low-pressure area simulations in an acoustic field.
Figure 14B:
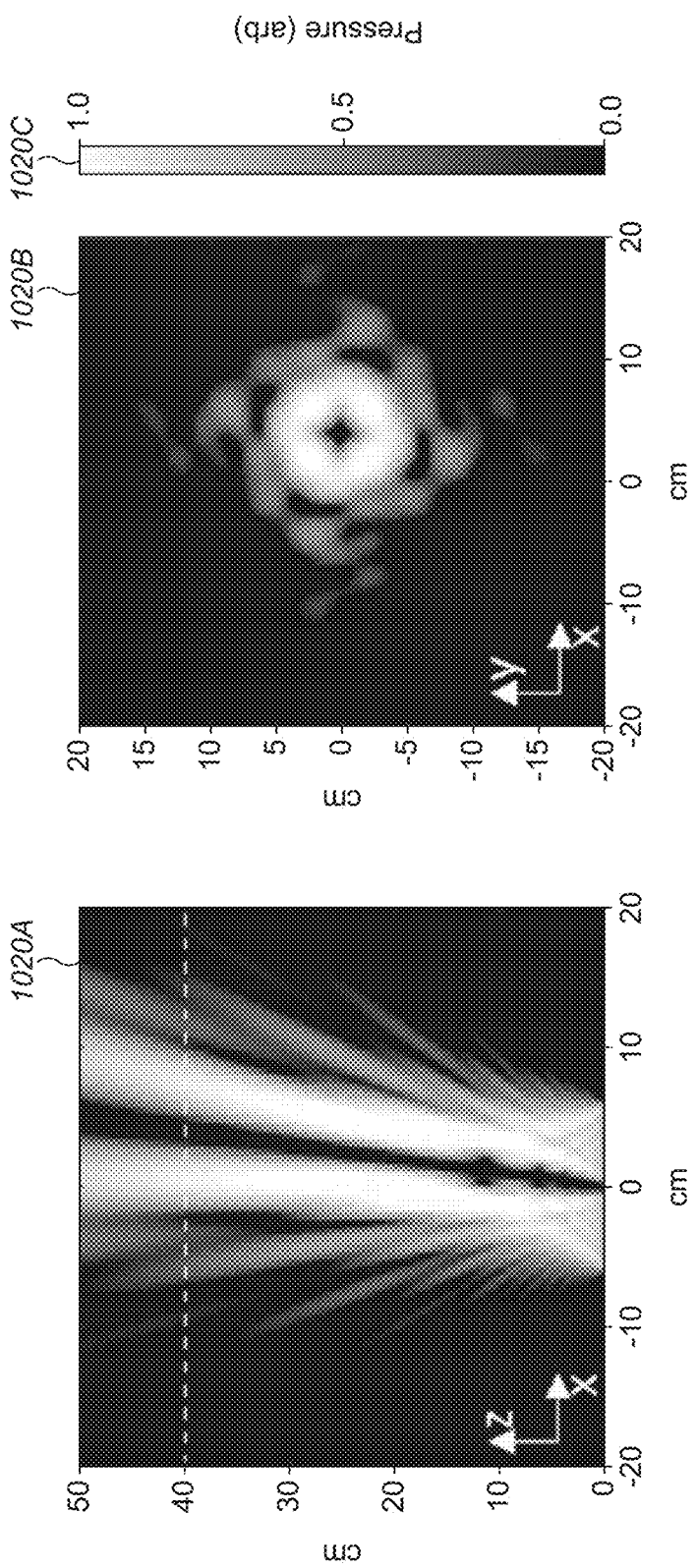

Turning to FIGS. 14A and 14B shown are simulations 1000 adding helicity to open a null region in a Bessel beam.

FIG. 14A shows the x-z plane 1010A, the x-y plane 1010B (shown at z=40 cm), and the arbitrary pressure scale 1010C. Here, there is a steered Bessel beam.

FIG. 14B shows the x-z plane 1020A, the x-y plane 1020B (shown at z=40 cm), and the arbitrary pressure scale 1020C. Here, helicity has been added to open a null in the center of the beam (m=2).

C. Array Division and Null Planes

Another method to create a null region is to divide an array into two or more similar regions and reverse the phase of one field relative to the other. When the fields are largely similar this forms a null line which projects through the middle of the field. This can be used when the null region has high precision in one dimension but not in the other. Division need not be directly down the middle but acoustic pressures produced from each region need to match. This means that regions with a larger number of transducers need to have their amplitude reduced to compensate. Angling each of the two beams apart slightly can increase the width of the null line.

Figure 15:
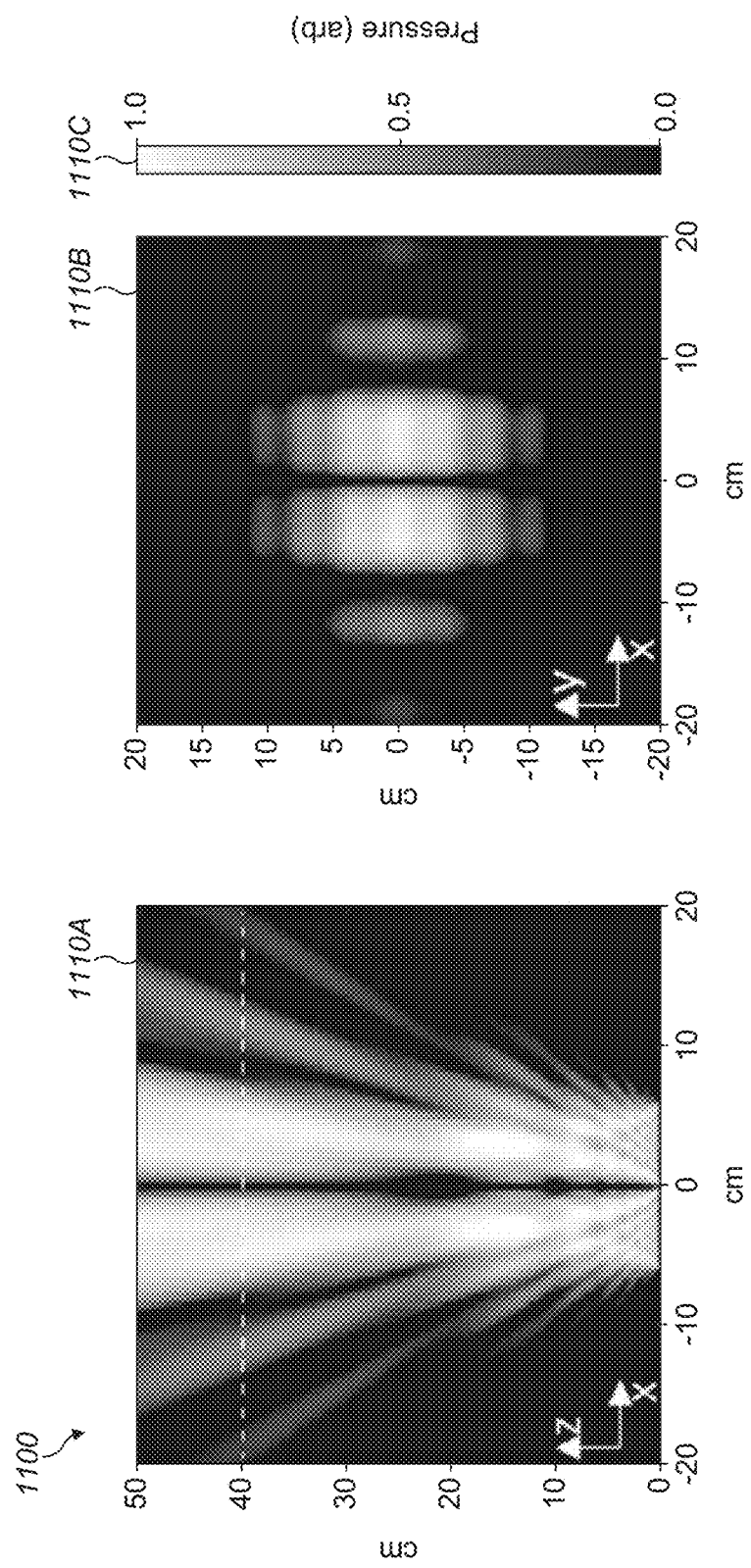
FIG. 15 shows low-pressure area simulations in an acoustic field.
Figure 16:
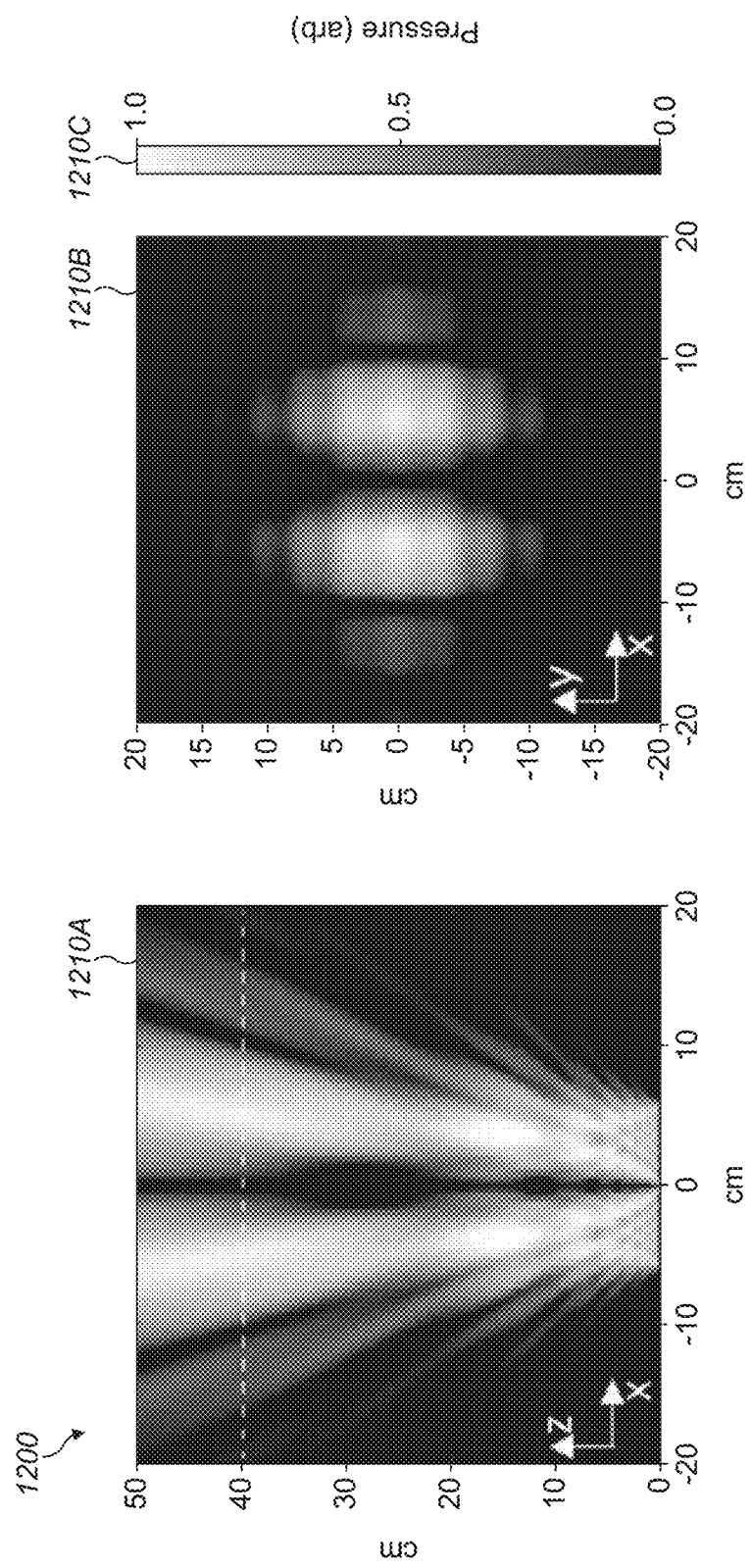
FIG. 16 shows low-pressure area simulations in an acoustic field.

FIGS. 15 and 16 show example simulations of 256 element ultrasonic array operating at 40 kHz using array division to create a null plane. In both cases, the null plane is well-defined and can be directed towards a sensitive target as desired.

Turning to FIG. 15, shown is a simulation 1100 with the x-z plane 1110A, the x-y plane 1110B (shown at z=40 cm), and the arbitrary pressure scale 1110C. Splitting an array in half with each driven out of phase results in opening up a null line along the y-axis.

Turning to FIG. 16, shown is a simulation 1200 with the x-z plane 1210A, the x-y plane 1210B (shown at z=40 cm), and the arbitrary pressure scale 1210C. Shown is angling the field each half of a split array away from the origin by 3 degrees to widen the null region.

D. Null Subspace

Consider an under-determined linear system, $$Ax = b$$

where, $$A \in \mathbb{C}^{m \times n}, x \in \mathbb{C}^{n \times 1}, b \in \mathbb{C}^{m \times 1},$$

will have 0 or an ∞ number of solutions. This is the same starting point as previously discussed solving methods.

The LSQ, least squares solution, can be shown to be:

$$\min_x \|Ax - b\|_2 = A^+ b + v$$

where, $v \in \ker(A)$, and, $$\ker(A) = \{v \in \mathbb{C}^{n \times 1} | Av = 0\}$$

is the nullspace of A.

Analogously to the previous section, we start by choosing a set of j null points at positions x', y' and z' which we shall denote, $$\chi_N = \{\chi_N^1, \ldots, \chi_N^j\}$$

We can then construct the complex-valued linear system $A_N x_N = b_N$ where: $A_N \in \mathbb{C}^{j \times n}$, $x_N \in \mathbb{C}^{n \times 1}$, $b_N \in \mathbb{C}^{j \times 1}$, with $$A_N = \begin{bmatrix} \Psi_1(\chi_N^1) & \cdots & \Psi_n(\chi_N^1) \\ \vdots & \ddots & \vdots \\ \Psi_1(\chi_N^j) & \cdots & \Psi_n(\chi_N^j) \end{bmatrix}$$

$$x_N = \begin{bmatrix} A_1^{emit} e^{i\phi_1^{emit}} \\ \vdots \\ A_n^{emit} e^{i\phi_n^{emit}} \end{bmatrix}$$

and $$b_N = \begin{bmatrix} 0 \\ \vdots \\ 0 \end{bmatrix},$$

where, as above, $\Psi_m$ is the basis function or transducer model for each element in the array.

The vector $x_N$ is in the nullspace of the matrix $A_N$, $$x_N \in \ker(A_N)$$

Now we can formulate the problem of finding the complex activation coefficients that produce the desired amplitudes at the control point positions and the desired amplitudes at the null point positions as a pseudo linear program:

$$\min_v \|A^+ b + v\|_2 = x_N$$

where, $$v \in \ker(A)$$

subject to the constraint $$(A^+ b + v) \in \ker(A_N)$$

This constraint specifies a new under-determined linear system to solve, $$A_N [A^+ b + v] = 0$$

Once again, we appeal to the Moore-Penrose inverse to find the minimum-norm solution as, $$v = -A_N^+ A_N A^+ b$$

The vector v can be thought of as a minimum perturbation required to shift the original solution vector $A^+ b$ into the nullspace of $A_N$, $\ker(A_N)$. This perturbation ensures that the null point condition, $$\Psi_\Omega(\chi_N^k) = 0, \forall k \in \{1, \ldots, j\}$$

is met with the minimum change in the original solution vector $A^+ b$.

We can now express the full solution as, $$x_N = A^+ b - A_N^+ A_N A^+ b$$

which can also be expressed as, $$x_N = A^+ b - A_N^H (A_N A_N^H)^+ A_N A^+ b,$$

where the superscript H represents the Hermitian conjugate.

The advantage of this method is that, for a fixed arrangement of nulls, $A_N^+ A_N$ does not change and can be calculated in advance. $A^+ b$ can change, producing arbitrary fields including haptic points and parametric audio beams, and nulls can be added using the above equation to modify the activation coefficients before emission. In particular, arrangements of many nulls may be added to a system where traditional solving may be computationally difficult. This would allow for incorporation into low-end hardware which would otherwise not be capable of performing the necessary matrix inversion in the required time for low-latent response.

When a new solution ($x_N$) is generated with the method, some entries may result in driving values impossible to realize, such as greater than the maximum drive possible by the device. One solution is to scale every value the same amount and preserve each phase value. This will scale the field by the same amount and preserve both non-zero values (scaled) and the nulls. Another option is to clip large values to the maximum drive and leave the remainder. This has the potential to influence both the non-zero points and the nulls and care must be taken to preserve the benefit of the null application.

We are not limited to a single $A_N^+ A_N$ matrix in practice. Indeed, many different null arrangements (with their associated $A_N^+ A_N$ matrix) may be stored on the device and applied when appropriate. Care must be taken when switching between matrices to avoid audible artifacts caused by abrupt changes in activation coefficients. In one arrangement, two can be transitioned between by linearly interpolating each matrix value between each. In another arrangement, the output is reduced to near zero, the nullspace array switched, then the output is increased back to normal. In another arrangement, each transducer coefficient is low-pass filtered after the array is switched to remove high-frequency components likely to produce audio. This filtering would then be switched off or smoothly removed after some amount of time.

While the discussion to this point has focused on pre-calculation of the nullspace arrays, there is no reason new nullspace arrays cannot be calculated on a host or on the device. Depending on the number of nullspace points, this could take significant time compared to one acoustic cycle. Calculation need not be done all at once and could utilize unused processor, storing results in memory as calculation proceeds. When finished, the nullspace array could be introduced using previously discussed methods.

In another arrangement, it may be beneficial to apply the nullspace correction to the basis functions, $\Psi_n$, before taking the Moore-Penrose inverse. In this way, smooth transitions to the activation coefficients can be made as points are translated in space, thus minimizing potential acoustic artifacts such as parametric audio.

E. Iterative Nullspace Solution

The nullspace solution allows for a static arrangement of null points to be added to a system. With some additional computation, however, the method detailed above can be reformulated as an iterative update procedure, allowing for the addition of null points. Following the reasoning of the previous section we begin by specifying a single null point $\chi_N^1$ and construct the corresponding update:

$$A_N = [\Psi_1(\chi_N^1) \ldots \Psi_n(\chi_N^1)]$$

The Moore-Penrose inverse of a rank-1 matrix can be expressed as:

$$A_N^+ = \frac{1}{\sum_{k=1}^n \Psi_k(\chi_N^1) \cdot \Psi_k^*(\chi_N^1)} A_N^H$$

The expression for the complex activation coefficients, $$x_N = A^+ b - A_N^+ A_N A^+ b$$

can now be expressed in the form, $$x_N = A^+ b - \frac{1}{\sum_{k=1}^n \Psi_k(\chi_N^1) \cdot \Psi_k^*(\chi_N^1)} A_N^H A_N A^+ b$$

Letting, $$\sum_{k=1}^n \Psi_k(\chi_N^1) \cdot \Psi_k^*(\chi_N^1) = C$$

and factorizing the above expression yields, $$x_N = \left( I_n - \frac{1}{C} A_N^H A_N \right) A^+ b,$$

where $I_n$ is the identity matrix of matching dimensions with $A^+ b$.

This procedure can be repeated for additional null points thus providing an iterative update scheme for adding null points to the field.

F. Additional Disclosure

Using nulls to shield microphones/ears is novel.

Many of the null refinement methods are novel including simulating and measuring reflections.

Using helicity specifically to create a low-pressure region to shield mics/ears is novel.

Splitting the array and driving each section out of phase to create a null region in between is novel.

Many-null arrangements are novel (various packing arrangements).

Null shadows (shielding a region by placing nulls in between the array and region) is novel.

The null subspace solving method is novel.

IV. Predistortion of Phased-Array Basis Functions Applied Via Transducer Gain Control A. Reduced Representation—Using Per-Focus Basis Functions Traditionally, the linear system is described in terms of linear combinations of complex-valued transducer generated fields and their drive coefficients. This produces a matrix, where for m control points and N transducers, the matrix A is N columns by m rows and consists of the generated complex valued signal by each transducer $q \in \{1, \ldots, N\}$ at the location of each control point $j \in \{1, \ldots, m\}$. Previous work (1-US) has generated increased power efficiency by adding regularization to this matrix A, but regularisation increases the size of the matrix and thus the compute requirements to solve the system significantly.

Using $\alpha_q(\chi_j)$ to describe a complex-valued scalar linear acoustic quantity α measured at a position offset from the transducer element q by the translation vector $\chi_j$, which may evaluate to be acoustic pressure or an acoustic particle velocity in a chosen direction, the matrix A may be written:

$$A = \begin{bmatrix} \alpha_1(\chi_1) & \cdots & \alpha_N(\chi_1) \\ \vdots & \ddots & \vdots \\ \alpha_1(\chi_m) & \cdots & \alpha_N(\chi_m) \end{bmatrix},$$

This, for a number of control points fewer than the number of acoustically active transducer elements can then be placed into a complex-valued linear system wherein a sample vector b={$\alpha_{C1}(\chi_1)$, . . . , $\alpha_{Cm}(\chi_m)$)} represents the desired total linear scalar complex-valued acoustic quantity where the amplitudes are desired amplitudes of the acoustic quantity and the phases are those taken from the phase oracle (which may have been user-influenced). In this linear system described as Ax=b, the x vector is then the initial field coefficients for each transducer element, which may be used to drive a real transducer element, resulting in the recreation of the acoustic field desired. This may then be solved in a loop to provide a system that changes over time.

As this is matrix A is not square, and the degrees of freedom number more than the constraints, this is termed a 'minimum norm' system. It is 'minimum norm' because as there are infinitely many solutions, the most expeditious solution is the one which achieve the correct answer using the least 'amount' of x—the solution x with minimum norm. To achieve this, some linear algebra is used to create a square system from the minimum norm system Ax=b:

$$A^H A x = A^H b,$$
$$(A^H A)^{-1} A^H A x = x = (A^H A)^{-1} A^H b,$$

This $A^H A$ is now N columns by N rows and given that the number of transducer is often very large this is an equivalently large matrix, and since any solution method must invert it, with it, this is not an efficient method. A more accessible approach is to create a substitution $A^H z = x$, before applying a similar methodology:

$$C z = A A^H z = A x = b,$$
$$z = C^{-1} b = (A A^H)^{-1} b,$$

This time around, as $C = A A^H$ is a mere m columns by m rows, this result is a much smaller set of linear equations to work through. The vector z can be converted into x at any time so long as $A^H$ can be produced.

However, this does not end here. This approach is not just a fortuitous set of symbolic manipulations, the change of variables from the complex-valued vector that describes the drive of individual transducer elements x to the much lower dimensional z has further meaning. Each complex-valued component of z can be viewed as a complex-valued drive coefficient that pre-multiplies a focusing function which generates a focus from all of the individual transducer fields, wherein the focal point is co-located with each individual control point. For m control points therefore, there are m such focusing functions, and they can be viewed as defining a complex vector space $\mathbb{C}^m$ where points in this space correspond to possible configurations of these m 'focus points'.

B. Dynamic Ranging—a Mechanism to Ensure that Waveforms are Reproducible

To ensure that at no point the user tries to generate a waveform at any control point that is not possible using the hardware, it is important to limit the level of acoustic output. This is achieved by using a second b vector, termed $b_{range}$. The components of this vector $b_{range}$ are defined as the largest that the user may ask for at any point. The resulting solution $z_{range}$, is then the solution that is most taxing on the hardware. As $z_{range}$ is a point in the complex vector space $\mathbb{C}^m$, and this is linearly related to the acoustic output from the transducer, this must be the most extreme outlier. This is evaluated through pre-multiplication by $A^H$ to produce $x_{range}$. This $x_{range}$ tells us how to relate the worst-case performance to the real capabilities of the device, so the maximum amplitude drive from all transducers in $x_{range}$ is used to divide through the maximum output allocation of each point, as these are linear. The phase oracle (the algorithm that predicts the best set of phases to use) is then applied to $b_{range}$, to ensure that the worst case phase interactions are captured. This ensures the device is never asked to produce an unrealistic output that could result in undefined behavior.

Figure 17:
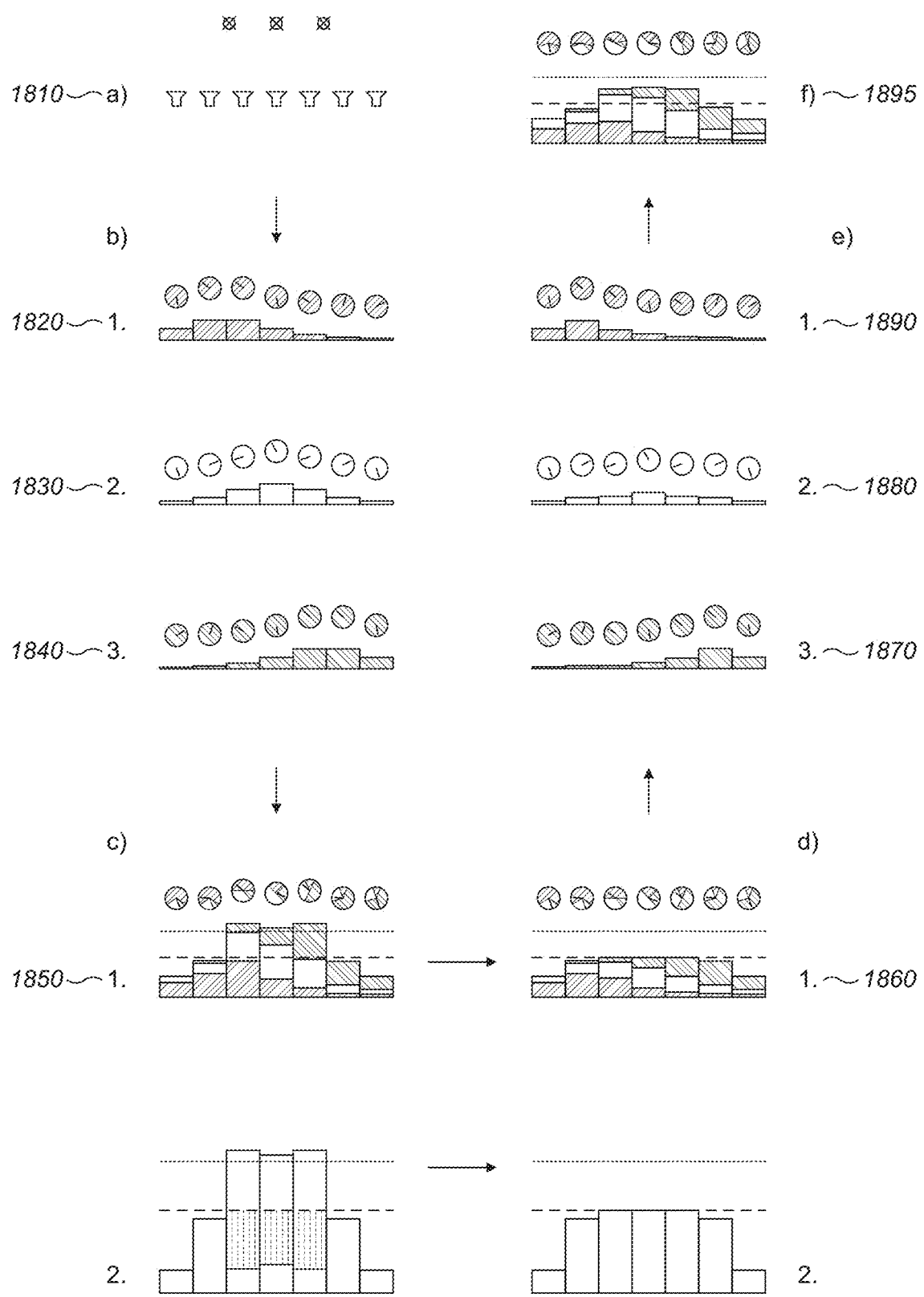
FIG. 17 shows stages of an algorithm manipulating focal point basis functions.

Shown in FIG. 17 is a diagram 1800 of the stages of the algorithm described. Diagram a) 1810 shows the transducer array and the set of control point positions. Diagram b) shows determining the three focal point basis functions 1820, 1830, 1840 comprised of each transducer drive, here weighted by the utility of each transducer to each point. Diagram c) 1850 shows 1) solving without considering the interactions between points (using a diagonal-only C matrix) yields an estimate of how the phasors cancel in the transducer activation and the approximate amplitude of each drive. Some of these amplitudes are greater than the maximum possible (dotted line), which would mean that the whole array solution would need to be scaled back. 2) Considering the fold level (dashed line) in logarithmic space, the logarithmic amplitude may be folded over the fold level to find the per-transducer scaling factor. Diagram d) 1860 shows applying the scaling factor to the transducers, all of the transducers are now at or under the fold level, which can be seen in 1) real space and 2) logarithmic space but the field is no longer generated accurately, even with the assumption that points do not interact. Diagram e) shows this solution is decomposed into focal point basis functions again, which are comprised of each transducer drive, but this time the individual transducer entries are scaled by the scaling found earlier 1870, 1880, 1890. Diagram f) 1895 shows these new focal point basis functions are now used in the full solution, considering extra interactions. Note that the maximum amplitude of the per-transducer drive is reduced, no longer requiring more than the maximum transducer drive amplitude possible (dotted line) and the relative size of the group of rescaled transducer amplitude bars remain much the same, although the absolute amount of drive has changed to compensate for the earlier scaling down. The proportions of the contribution to each control point from the transducer (filled pie segments in the circle) has changed noticeably from the other solutions.

C. Breaking Hermitian Symmetry

Due to the Hermitian symmetry of $AA^H$, the component transducer contributions to each basis function are in turn weighted by how usefully they may contribute. While this is helpful to save power and ensure that transducers are used only so far as they are effective and efficient, or in situations where this symmetry produces a simple geometry independent apodization of the phased array to combat grating lobe aliasing artifacts, this is unhelpful when more output is desired from a given hardware system.

The symmetry of $AA^H$ may be broken by undoing the 'utility' weighting produced by the multiply. This may be viewed as separating the forward propagation operator from the backward propagation operator of the acoustic wave—the matrix $AA^H$ forces the two operators to behave identically, and only breaking the symmetry of the matrix prevents this. Fortunately, the symmetry may be broken by allowing A (which describes the physical behaviour of the waves travelling in space—the forward propagation operator) and $A^H$ (which describes how the basis function is defined, as $A^H Z = x$—the backward propagation operator) to differ. However, this difference can be confusing and difficult to manage, and breaking the symmetry can quickly eliminate all of the benefits described earlier.

The method described in this document does not require symmetry to be broken, functioning equally effectively on both Hermitian symmetric and matrices which have not been symmetrically scaled.

D. Statistical Distributions of Random Phasors—Consequences for Transducer Drive Settings aside questions of apodization and generation of appropriate per-transducer usage in each basis function, the fundamental statistical behavior of random phase summations—necessary to model how arbitrary many control points are constructed from phasor contributions of back propagations to each transducer—works against the ability to generate consistent output and efficient transducer utilization.

The process of generating the limiting scenario using $b_{range}$ may then be roughly modelled for the generation of the extremal transducer drive coefficient as the summation of a series of random phasors or complex numbers. When the summation exceeds 100% of output utilized, then this is the amount by which the drive of the whole transducer array must be scaled back. Therefore, there is a clear, if approximate, isomorphic relationship between any extremal samples of random phasor summation distributions and the transducer drive efficiencies in the limiting scenario.

Modelling the summation for the transducer drive or activation coefficient as:

$$x = re^{i\theta} = \sum_{j=1}^{m} a_j + ib_j,$$

where $a_j \sim N(0, \sigma)$ and $b_j \sim N(0, \sigma)$ (normally distributed random variables with zero mean) and $r=|x|\geq 0$. The probability density function is then exactly:

$$f_{|z|}(r) = \frac{r}{m\sigma^2} e^{-r^2/2m\sigma^2},$$

with a cumulative density function exactly:

$$F_{|z|}(r) = 1 - e^{-r^2/2m\sigma^2},$$

so the probability of the sum having amplitude greater than or equal to r must be $e^{-r^2/2m\sigma^2}$. Assuming unit variance, $\sigma=1$, and solving for percentiles allows the plotting of equiprobable 'transducer drive amplitudes' as shown in FIG. 18.

Figure 18:
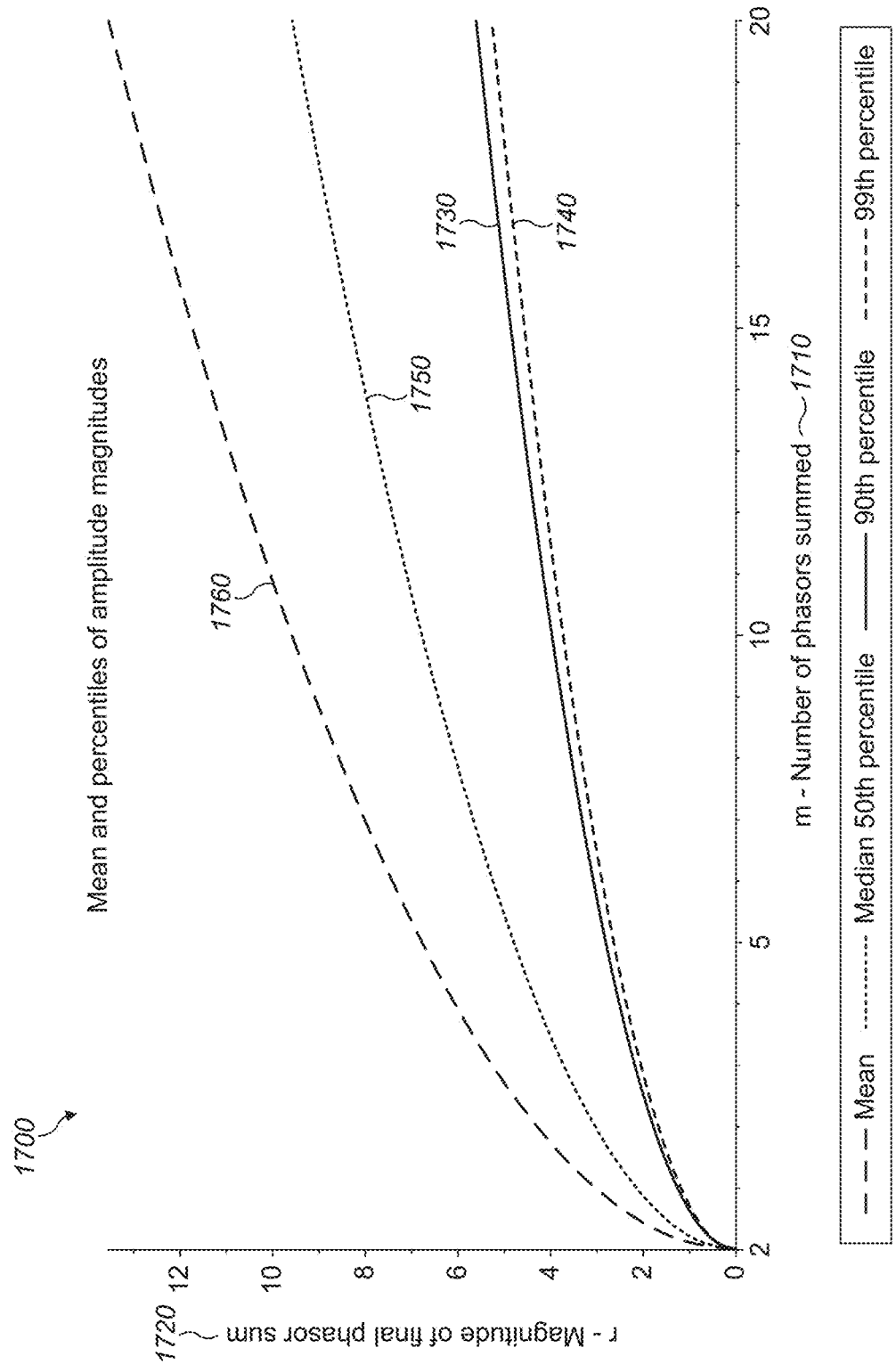
FIG. 18 shows the plotting of equiprobable transducer drive amplitudes.

Shown in FIG. 18 is a graph 1700 entitled "Mean and percentiles of amplitudes magnitudes". The x-axis 1710 is the number of phasors summed (m) 1710. The y-axis 1720 is the magnitude of final phasor sum (r). The mean is the long-dashed line 1760. The median $50^{th}$ percentile is the dotted line 1750. The median $90^{th}$ percentile is the solid line 1730. The median $99^{th}$ percentile is the short-dashed line 1740. These lines are the amplitude distribution of a sum of m complex numbers with normally distributed components.

Given that transducer arrays often have many hundreds of individual transducers which represent individual summations. This means that since each transducer represents a drawing from the distribution, it is highly likely that there will be a small proportion of transducer elements driven at much higher amplitudes—often amplitudes many times larger for large m—relative to the mean. In the case that the whole array amplitude must be scaled down to accommodate these outlier elements, this small subset causes a large drop in overall efficiency. Therefore, it is important that at least these transducers are targeted with predistortion to 'condition' the amplitude distribution.

E. Two Linear System Solutions Method

The two-step approximation method may proceed by first solving the system as before:

$$x'_{range} = A^H z'_{range} = A^H (AA^H)^{-1} b_{range}.$$

Then, a 'fold', f, is designated. This is termed a 'fold' because this can be viewed as a point of symmetry in a logarithmic space, as the process can be applied efficiently using logarithms. This is the smallest value at which the distortion is applied. Then a diagonal matrix is defined as:

$$B = \begin{bmatrix} B_{1,1} & \cdots & 0 \\ \vdots & \ddots & \vdots \\ 0 & \cdots & B_{N,N} \end{bmatrix},$$

where each of the diagonal elements may be defined as, $$B_{q,q} = \begin{cases} 1, & \text{if } |x'_{range,q}| < f, \\ \frac{f}{|x'_{range,q}|}, & \text{if } |x'_{range,q}| \geq f, \end{cases}$$

where $x'_{range,q}$ is the element of the vector $x'_{range}$ corresponding to the $q^{th}$ transducer. This vector does not have any per-transducer gain or distortion applied.

The second system for the pre-distorted basis functions may be applied as:

$$x_{range} = BA^H z_{range} = BA^H (ABA^H)^{-1} b_{range},$$

and $$x = BA^H z = BA^H (ABA^H)^{-1} b,$$

where the per transducer gain matrix B applies distortion to counter or 'smooth out' excessively high transducer amplitudes that were generated when solving without gain control. When the new $x_{range}$ vector is inspected, the peak transducer amplitudes are greatly reduced from what would be seen without this step—as shown from the earlier statistical argument.

It should also be noted that it is possible to skip individual points (i.e. not apply this method to all focal point basis functions) and apply different gain factors or 'fold' values to different basis functions.

F. Dynamically Determining the Fold Value

The 'fold' value f may also be chosen dynamically, as the plotting of the phasor distribution illustrative of how the transducer driving phasors in the early section shows that the transducer with the largest amplitude is many times larger than the mean. The 'fold' value may be larger than unity, as the rescaling of the transducer gain is applied to take all transducers driven at over the level represented by this value to be exactly this value. Note that since this is all relative, values being greater than unity only means that the physical limitations of the device will require the whole system to be scaled down, as these later whole system scaling steps are applied separately to ensure physical limits are met.

By approximately tracking the behavior of the distribution of transducer amplitudes, the fold level can track where the extreme amplitudes are and eliminate them. To do this simply we may set the transducer fold level to the mean. This may be either the arithmetic mean or the geometric mean, where the geometric mean is more aggressive limit due to it being generally less than the arithmetic mean. Where the arithmetic mean may be calculated as the mean of each transducer drive amplitude, the logarithm of the geometric mean is the mean of each logarithm of the transducer drive amplitudes. The main reason that no other indicator from the distribution is suitable is simply because the mean is simple to calculate.

Using the mean ensures not everything is rescaled. Assuming the illustrative phasor distribution from earlier is a reasonable approximation in most settings, then the mean and median are close, leading to roughly half the transducer amplitudes participating in the generation and application of per-transducer gain. This means that not all of the shape of the basis set is ablated, resulting in modest changes in a minority of transducers, and large changes only in a few egregiously overdriven transducers.

G. Approximating the First Linear System

The first linear system solved is not required to be functional. It merely needs to represent the relative drive and power of the basis functions which when added together make up the complex-valued drive coefficients for the individual transducers. For this reason, in the first solution, we can ignore cross-terms in the acoustic field, anticipating that interactions between control points have only a small impact on the total drive amplitude of each transducer. In this case, equivalent to zeroing all of the elements of the matrix $C=AA^H$ away from the main diagonal, the basis function and coefficient needed for each control point may be solved separately as many single-row-and-single-column 1×1 matrices. As inverting non-zero single element matrices can be stated as simply the reciprocal of the value, this means that no linear system need be solved. This is then:

$$x'_{range,q} = \sum_{j=1}^{m} b_{range,j} \frac{\alpha_q(\chi_j)}{\sum_{q=1}^{N} \alpha_q(\chi_j)\overline{\alpha_q(\chi_j)}},$$

where $b_{range,j}$ is the component of the vector $b_{range}$ corresponding to the complex-valued scalar linear acoustic quantity at the control point which is intended to represent the maximum output required by the user.

It should be noted that this method does not need to be applied to the 'range' system. It may be applied directly to the intended transducer drive, although the fluctuations in efficiency may cause excess signal noise in the case that this is used repeatedly in a loop over time.

H. Transform Matrix

In another embodiment, we can modify the basis for which we are solving using a matrix, referred to from here as a 'transform matrix', T. This is applied by solving, $$ATx' = b',$$

where x' represents a new activation solution distinct from x and b' is a distinct output goal. T must be a square matrix with dimension equal to the number of transducers. A solution is generated by taking the pseudoinverse, $x'=(AT)^+ b'$.

One way for this solution to be useful is to relate b' to real-world units. This can be accomplished by relating b' which uses indefinite units to b which uses units related to the transducer function $\alpha_q(\chi_j)$. As this is an underdetermined problem, there is room to add more restrictions to x'. In particular, we can enforce the original problem on the new solution, $$Ax' = b.$$

This allows us to write the following relationship between b and b', $$b' = ATA^+ b,$$

where $A^+$ is the pseudoinverse of A. The transform matrix can therefore modify the activation solution while substantially maintaining the original output goals.

While arbitrary matrices can be used as T, purely diagonal transform matrices are the easiest to understand and predict their effect. For instance, a transform matrix with values near 1.0 for some entries and near 0.0 for others will emphasize the transducers corresponding to the 1.0 values while attenuating the others. A possible use for this would be to rotate the transducers being used by periodically changing the locations of the near-1.0 values thereby reducing the overall duty-cycle of the average transducer, possibly extending the life of the array.

Rather than an infrequently-changed transform matrix, another useful embodiment of this method is to have T be a function of A. This allows for dynamic modification of the apodization of the array (FIG. 19). Possible functions include but are not limited to, forming a diagonal matrix from the diagonal entries of A while applying an operator in the process. For instance, taking the absolute value squared (or larger value) of the diagonal entries of A and using those values for the diagonal entries of T (leaving everything else 0) has the effect of weighting the output for each transducer based upon the square (or larger value) of the transducer function $\alpha_q(\chi_j)$ in magnitude. This increases the apodization of the array related to the exponent used. Another possible operator is a threshold function such as 1.0 for diagonal values over some pre-determined threshold value and a small values (such as 0.1) for values under the threshold. An example of this is given in FIG. 3. A benefit of this approach is the threshold function is simple to calculate and, when no transducers are above the threshold, the solution will be substantially similar to the original A, with the transformation only being heavily applied when circumstances put transducer activation over the pre-determined threshold.

The steps involved is using the transformation matrix are as follows,
1. Calculate A as normal;
2. Determine T;
3. Calculate b' from b'=ATA⁺b; and
4. Calculate x' from x'=(AT)⁺b'.

It must be noted that while the equations above imply a perfect solution, the pseudoinverse (also known as the Moore-Penrose inverse) is only the true inverse if the matrix is invertible. This is not guaranteed in this formulation. As a result, the final solution x' may not exactly satisfy Ax'=b, and as a result will fail to reproduce the desired pressures in b. In general, the less extreme transform matrix is (in magnitude and in similarity between entries in T), the closer the resulting solution is to achieving the constraints in b. If a given formulation of T is not achieving sufficient performance, an iterative guess-and-check method can improve the solution. This is done by first calculating x', then performing the multiplication Ax' and comparing the results to b. The resulting average proportional difference in each element can be calculated and x' can be scaled appropriately (being careful to keep maximum activation below or equal to full-drive). Multiple iterative steps can be implemented to further improve performance.

Figure 19A:
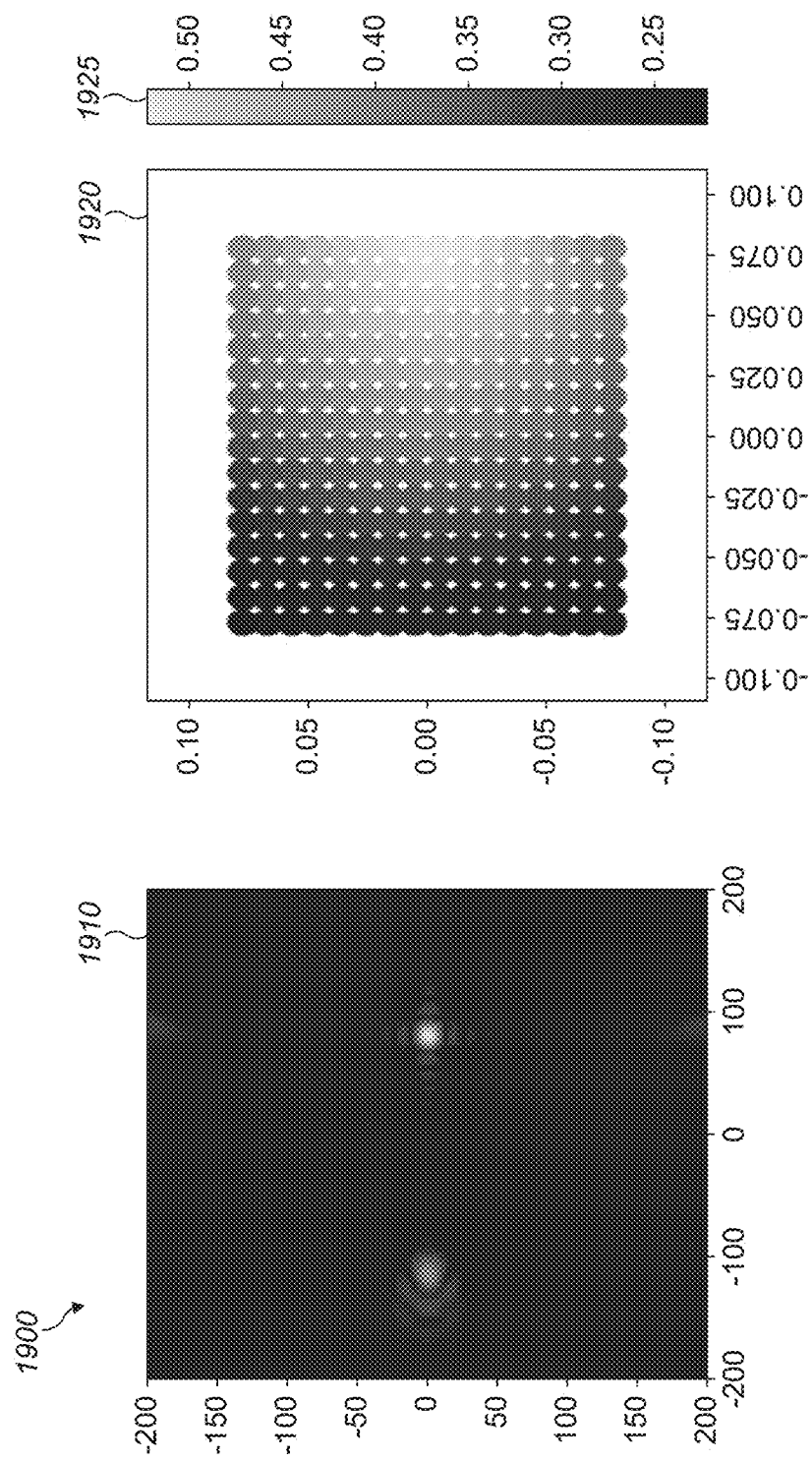
FIGS. 19A, 19B, and 19C show the outputs of transformation matrices.
Figure 19B:
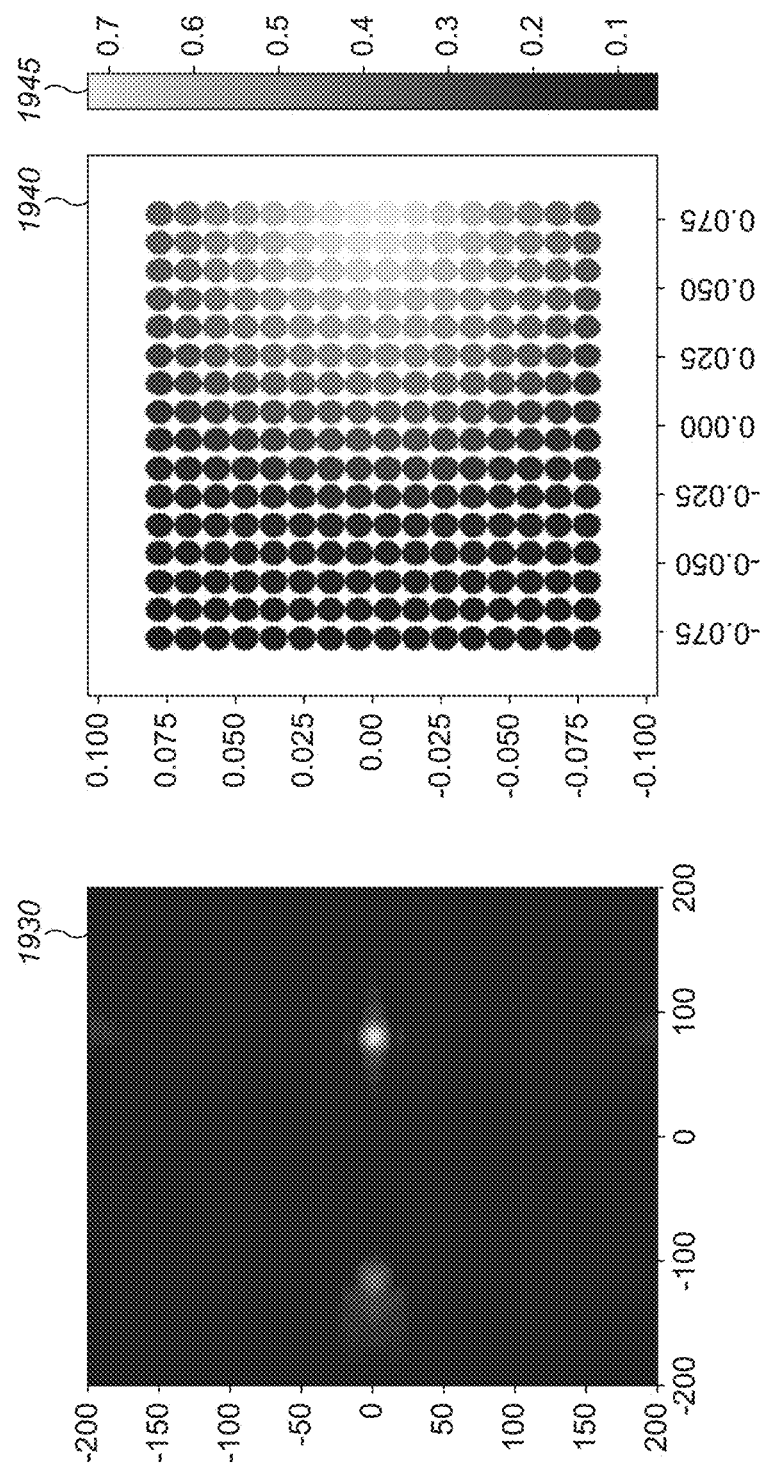
Figure 19C:
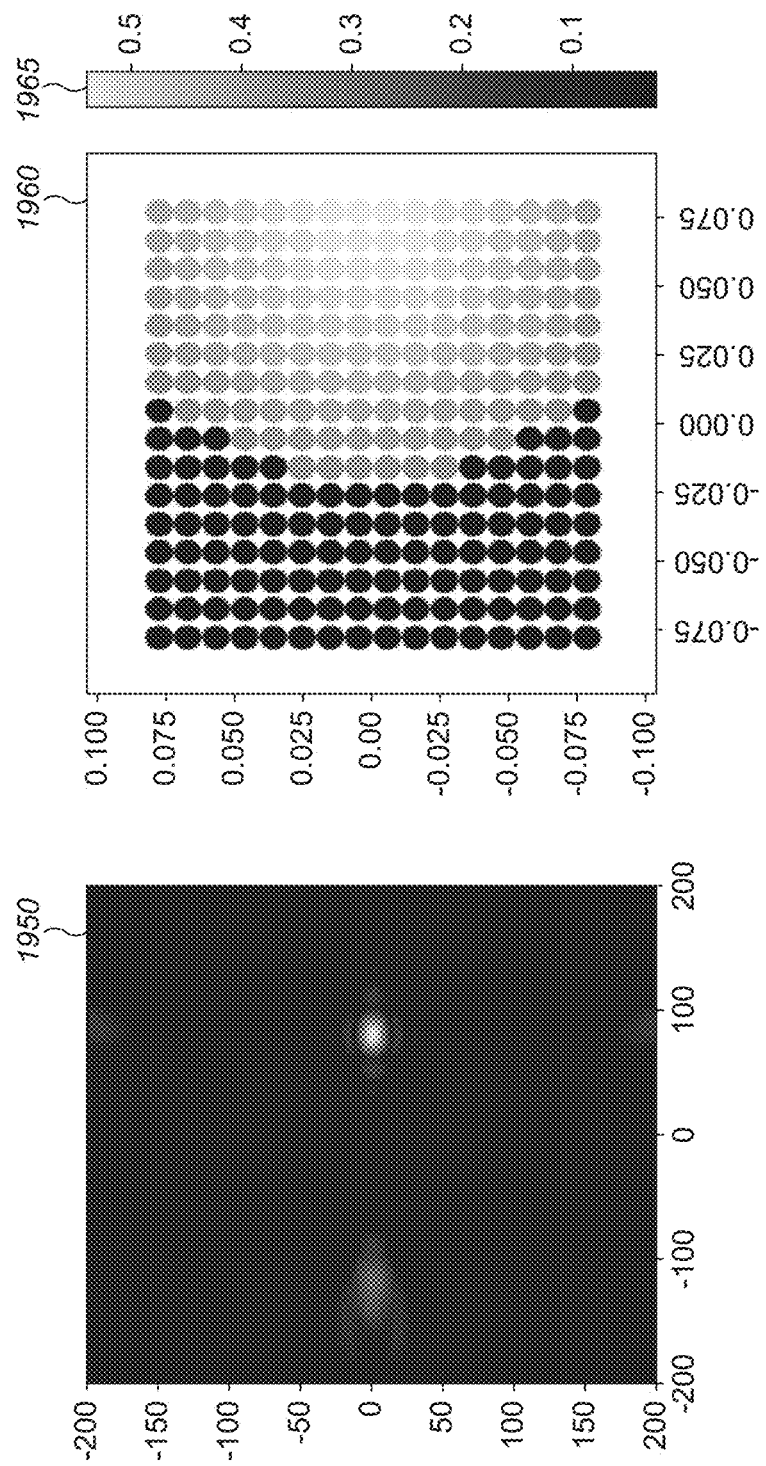

Turning to FIGS. 19A, 19B, and 19C, shown are example outputs 1900 using a transformation matrix using a 256-element rectilinear array of 40 kHz transducers with 10.3 cm pitch. Units for the left 3 figures 1910, 1930, 1950 are mm while the right figures 1920, 1940, 1960 are m. The key 1925, 1945, 1965 is the amplitude of the transducer drive relative to maximum drive (1.0).

The right 3 figures 1920, 1940, 1960 show activation amplitudes per transducer for different T matrix designs while the left 3 figures 1910, 1930, 1950 show simulated pressure at z=20 cm with white colors being higher pressure than dark colors. The solutions are attempting to create a high-pressure point at [x,y,z]=[8,0,20]cm. FIG. 19A s show a normal pressure solve without using a transform matrix. FIG. 19B shows the effect of T where T is defined as the diagonal elements of A, magnitude squared. FIG. 19C shows another application of T where T first takes the diagonal elements of A and then thresholds the output such that if the absolute value of the entrée is greater than 0.7, the corresponding value of T is 1.0, if not, it is 0.1. As the apodization is more extreme in each row, the resulting focus points pressure is only diminished slightly whereas the grating lob at approximately x=−0.125 mm is diminished much more.

V. Momentum Tensor Corrections for Mid-Air Haptic Systems

A. Solving for the Phased Array Drive to Generate the Linear Acoustic Quantity

Traditionally, the linear system is described in terms of linear combinations of complex-valued transducer generated fields and their drive coefficients. This produces a matrix, where for m control points and N transducers, the matrix A is N columns by m rows and consists of the generated complex valued signal by each transducer $q \in \{1, \ldots, N\}$ at the location of each control point $j \in \{1, \ldots, m\}$.

Using $\alpha_q(\chi_j)$ to describe a complex-valued scalar linear acoustic quantity $\alpha$ measured at a position offset from the transducer element q by the translation vector $\chi_j$, which may evaluate to be acoustic pressure or an acoustic particle velocity in a chosen direction, the matrix A may be written:

$$A = \begin{bmatrix} \alpha_1(\chi_1) & \cdots & \alpha_N(\chi_1) \\ \vdots & \ddots & \vdots \\ \alpha_1(\chi_m) & \cdots & \alpha_N(\chi_m) \end{bmatrix},$$

This, for a number of control points fewer than the number of acoustically active transducer elements can then be placed into a complex-valued linear system wherein a sample vector $b=\{\alpha_{C1}(\chi_1), \ldots, \alpha_{Cm}(\chi_m)\}$ represents the desired total linear scalar complex-valued acoustic quantity (either $p_l$ or $u_l \cdot \hat{n}$) where the amplitudes are desired amplitudes of the acoustic quantity (either $\|p_l\|$ or $\|u_l \cdot \hat{n}\|$) and the phases are those taken from the phase oracle (which may have been user-influenced). In this linear system described as Ax=b, the x vector is then the initial field coefficients for each transducer element, which may be used to drive a real transducer element, resulting in the recreation of the acoustic field desired. This may then be solved in a loop to provide a system that changes over time.

As this is matrix A is not square, and the degrees of freedom number more than the constraints, this is termed a 'minimum norm' system. It is 'minimum norm' because as there are infinitely many solutions, the most expeditious solution is the one which achieve the correct answer using the least 'amount' of x—the solution x with minimum norm. To achieve this, some linear algebra is used to create a square system from the minimum norm system Ax=b:

$$A^H A x = A^H b,$$
$$(A^H A)^{-1} A^H A x = x = (A^H A)^{-1} A^H b,$$

This $A^H A$ is now N columns by N rows and given that the number of transducers is often very large this is an equivalently large matrix, and since any solution method must invert it, with it, this is not an efficient method. A more accessible approach is to create a substitution $A^H z = x$, before applying a similar methodology:

$$Cz = AA^H z = Ax = b,$$
$$z = C^{-1} b = (AA^H)^{-1} b,$$

This time around, as $C=AA^H$ is a mere m columns by m rows, this result is a much smaller set of linear equations to work through. The vector z can be converted into x at any time so long as $A^H$ can be produced.

However, this does not end here. This approach is not just a fortuitous set of symbolic manipulations, the change of variables from the complex-valued vector that describes the drive of individual transducer elements x to the much lower dimensional z has further meaning. Each complex-valued component of z can be viewed as a complex-valued drive coefficient that pre-multiplies a focusing function which generates a focus from all of the individual transducer fields, wherein the focal point is co-located with each individual control point. For m control points therefore, there are m such focusing functions, and they can be viewed as defining a complex vector space $\mathbb{C}^m$ where points in this space correspond to possible configurations of these m 'focus points'.

B. Dynamic Ranging—a Mechanism to Ensure that Waveforms are Reproducible

To ensure that at no point the user tries to generate a waveform at any control point that is not possible using the hardware, it is important to limit the level of acoustic output. This is achieved by using a second b vector, termed $b_{range}$. The components of this vector $b_{range}$ are defined as the largest that the user may ask for at any point. The resulting solution $z_{range}$, is then the solution that is most taxing on the hardware. As $z_{range}$ is a point in the complex vector space $\mathbb{C}^m$, and this is linearly related to the acoustic output from the transducer, this must be the most extreme outlier. This is evaluated through pre-multiplication by $A^H$ to produce $x_{range}$. This $x_{range}$ tells us how to relate the worst-case performance to the real capabilities of the device, so the maximum amplitude drive from all transducers in $x_{range}$ is used to divide through the maximum output allocation of each point, as these are linear. The phase oracle (the algorithm that predicts the best set of phases to use) is then applied to $b_{range}$, to ensure that the worst case phase interactions are captured. This ensures the device is never asked to produce an unrealistic output that could result in undefined behavior.

C. Control Point Relations

A control point specifies both amplitude and phase of the carrier. For many applications, the phase is immaterial, so it can be chosen to maximize the amplitude available at the control points in space.

Representing the control point activation $Y_c$ as a complex value can be written:

$$Y_c = \mathfrak{A}_c e^{i\phi_c}.$$

To find the effect that the activation of a control point via its transducer basis set has on other control points, the phase of the control point must be set to a reference point, the most suitable being unit amplitude and zero phase. Denoting this unit amplitude and zero phase activation $Y'_{c0}=1$, then defining the set of $\alpha_c=[\alpha_1(\chi_c), \ldots, \alpha_q(\chi_c), \ldots, \alpha_N(\chi_c)]$, the transducer drives required to generate $Y'_{c0}$ may be written:

$$Y'_{c0} = Y_{c0} \cdot \alpha_c,$$

$$Y_{c0} = \frac{\overline{\alpha_c}}{\alpha_c \cdot \overline{\alpha_c}},$$

where $Y_{c0}$ is the vector of N transducer activations $Y_{c0}=[Y'_{1;c0}, \ldots, Y'_{q;c0}, \ldots, Y'_{N;c0}]$, required to generate the control point activation $Y'_{c0}$.

Given an activation coefficient for a transducer $Y'_{q;c0}$ the effect of that on another point $\gamma$ in the acoustic field can be found as $\alpha'_{q;c0}(\chi_\gamma)=Y'_{q;c0}\alpha_q(\chi_\gamma)$. With this, the total effect of activating one point with a given amplitude $\mathfrak{A}_c$ and phase $e^{i\phi_c}$ has on another in the field can be found as the scaling of the unit amplitude effect, which when summed over all transducers is:

$$\alpha'_{\Omega;c0}(\chi_\gamma) = \mathfrak{U}_c e^{i\phi_c} \frac{\alpha_\gamma \cdot \overline{\alpha_c}}{\alpha_c \cdot \overline{\alpha_c}}.$$

D. Control Point Relations Matrix

From this statement of $\alpha'_{\Omega;c0}(\chi_\gamma)$, a matrix may be constructed such that multiplying fro, the right is an application of the activations $l'=[\mathfrak{A}_1 e^{i\phi_1}, \ldots, \mathfrak{A}_m e^{i\phi_m}]^T$ of all control points to the acoustic field at a point. Then maximising the efficiency of this by allowing the phases $\phi_1, \ldots, \phi_m$ to change is the aim. The amplitudes may be taken out of l' and placed into the matrix, leaving $l=[e^{i\phi_1}, \ldots, e^{i\phi_m}]^T$, then yielding the final eigensystem matrix:

$$R = \begin{bmatrix} \mathfrak{A}_1 \frac{\alpha_1 \cdot \overline{\alpha_1}}{\alpha_1 \cdot \overline{\alpha_1}} & \cdots & \mathfrak{A}_r \frac{\alpha_1 \cdot \overline{\alpha_r}}{\alpha_r \cdot \overline{\alpha_r}} & \cdots & \mathfrak{A}_m \frac{\alpha_1 \cdot \overline{\alpha_m}}{\alpha_m \cdot \overline{\alpha_m}} \\ \vdots & \ddots & \vdots & \ddots & \vdots \\ \mathfrak{A}_1 \frac{\alpha_r \cdot \overline{\alpha_1}}{\alpha_1 \cdot \overline{\alpha_1}} & \cdots & \mathfrak{A}_r \frac{\alpha_r \cdot \overline{\alpha_r}}{\alpha_r \cdot \overline{\alpha_r}} & \cdots & \mathfrak{A}_m \frac{\alpha_r \cdot \overline{\alpha_m}}{\alpha_m \cdot \overline{\alpha_m}} \\ \vdots & \ddots & \vdots & \ddots & \vdots \\ \mathfrak{A}_1 \frac{\alpha_m \cdot \overline{\alpha_1}}{\alpha_1 \cdot \overline{\alpha_1}} & \cdots & \mathfrak{A}_r \frac{\alpha_m \cdot \overline{\alpha_r}}{\alpha_r \cdot \overline{\alpha_r}} & \cdots & \mathfrak{A}_m \frac{\alpha_m \cdot \overline{\alpha_m}}{\alpha_m \cdot \overline{\alpha_m}} \end{bmatrix},$$

If a diagonal matrix is defined to be:

$$K = \begin{bmatrix} \frac{\mathfrak{A}_1}{\alpha_1 \cdot \overline{\alpha_1}} & \cdots & 0 \\ \vdots & \ddots & \vdots \\ 0 & \cdots & \frac{\mathfrak{A}_m}{\alpha_m \cdot \overline{\alpha_m}} \end{bmatrix},$$

then:

$$R = KC.$$

In this case, it is clear that the statement of the eigenproblem $Rl=\lambda l$ satisfies the criteria for the best phases to drive the control points with this configuration of amplitudes when A is largest—where l describes the dominant eigenvector of the matrix R.

E. Finding the Dominant Eigenvector—Power Iteration

The phase oracle is then mostly comprised of an implementation of the power iteration, a simple method to find the dominant eigenvector which corresponds to largest eigenvalue of a matrix. Where the eigenproblem is stated as $Rl=\lambda l$, it can be stated as:

$$l_0 = \lim_{y \to \infty} \frac{R^y l_{input}}{\|R^y l_{input}\|},$$

where $l_{input}$ must not be orthogonal to the dominant eigenvector and $\lambda_0$ must be strictly greater than the other eigenvalues. As R is a complex-valued matrix and $l_{input}$ is a complex-valued vector, then the $j^{th}$ component of the final vector b and $b_{range}$ can be written as:

$$b_{range,j} = \frac{l_{0,j}}{|l_{0,j}|} b_{user,range,j},$$

$$b_j = \frac{l_{0,j}}{|l_{0,j}|} b_{user,j},$$

since only the phase is taken from the dominant eigenvector result. As such:

$$\frac{l_{0,j}}{|l_{0,j}|},$$

is the result of this exemplar phase oracle.

To summarize, in this disclosure it is shown that existing methods used to derive the exerted haptic force for a mid-air haptic system onto a human body part are based on incorrect physical assumptions. Further, a method is provided to modify a mid-air haptic system to reduce a problem scenario including boundaries at the human body parts to a free-field system that may be formulated as a linear system such that correct force vectors are then produced.

F. Derivation of Acoustic Quantities

Taking the equation of state for an ideal gas:

$$p = \rho R T,$$

where $\rho$ is the density, p is the pressure, R is the ideal gas constant and T is the temperature. For a constant volume, all three variables depend on the entropy of the system.

Acoustics is often described mathematically by applying a perturbative expansion to the equation of state. Due to acoustics being generally concerned with fluctuations that do not change the entropy of the underlying medium, so an isentropic perturbative expansion that freezes the degree of freedom related to entropy change in the equations of state is generally chosen. In this case, where the subscript zero denotes the state of the system at rest, the pressure may then be related isentropically to density as:

$$\frac{p}{p_0} = \left(\frac{\rho}{\rho_0}\right)^\gamma,$$

where $\gamma$ is the ratio of specific heats.

To derive equations for the physics of acoustics, it can be written:

$$\rho = \rho_0 + \rho', \quad p = p_0 + p',$$

where the dashed quantities refer to perturbations. Collecting terms and using a Taylor expansion yields:

$$\frac{p_0 + p'}{p_0} = \left(1 + \frac{\rho'}{\rho_0}\right)^\gamma, \quad p' = \frac{\gamma p_0}{\rho_0}\rho' + O((\rho')^2),$$

then using the substitution for the square of the speed of sound $c_0^2 = \gamma p_0/\rho_0$, $$p' = c_0^2 \rho' + O((\rho')^2).$$

The mass and momentum balance equations (as taken from the Euler equations of fluid dynamics) for this closed volume of an inviscid and adiabatic but compressible fluid may be written:

$$\rho\left(\frac{\partial}{\partial t} + u \cdot \nabla\right) = -\rho(\nabla \cdot u),$$

-continued $$\rho\left(\frac{\partial u}{\partial t} + u \cdot (\nabla u)\right) = -\nabla p,$$

where u is the velocity of the medium. Considering the first-order effects (with subscript 1) of perturbations of the fluid at rest (with subscript 0) and ignoring terms that are higher than first-order or evaluate to zero gives:

$$\frac{\partial \rho_1}{\partial t} = -\rho_0 (\nabla \cdot u_1),$$

$$\rho_0 \frac{\partial u_1}{\partial t} = -\nabla p_1,$$

Taking the derivative with respect to time of the first-order mass balance equation yields:

$$\frac{\partial^2 \rho_1}{\partial t^2} = -\nabla \cdot \rho_0 \frac{\partial u_1}{\partial t},$$

then substituting both the first-order momentum balance equation and the relationship between the perturbations of the pressure and density yields the wave equation in density as:

$$\frac{\partial^2 \rho_1}{\partial t^2} = c_0^2 \nabla^2 \rho_1.$$

Further, taking the time derivative of the first-order momentum balance equation and substituting the relationship between the perturbations of the pressure and density and then finally substituting the first-order mass balance equation yields the wave equation in velocity as:

$$\frac{\partial^2 u_1}{\partial t^2} = c_0^2 \nabla^2 u_1.$$

All sinusoids are solutions to the wave equation, so writing the solutions in space and time as a general complex exponential gives the set of linear acoustic perturbations as:

$$\rho_1(x, t) = \rho_1(x)e^{-i\omega t},$$

$$p_1(x, t) = c_0^2 \rho_1(x)e^{-i\omega t},$$

$$u_1(x, t) = u_1(x)e^{-i\omega t},$$

where by convention $\omega = 2\pi f$ describes the angular frequency, meaning that each of the quantities for a single frequency $\omega$ can be written as a complex-valued field in space that is harmonic in time.

Second-order perturbations may now be defined as any further parts of $\rho$, p or u that do not describe the fluid at rest or belong to the solutions of the wave equation and so are described as nonlinear acoustics.

Considering the second-order effects (with subscript 2) of perturbations of the fluid at rest and ignoring terms that are higher than second-order, belong to the first-order equations or are zero gives new second-order momentum balance equation as:

$$\rho_1 \frac{\partial u_1}{\partial t} + \rho_0(u_1 \cdot \nabla u_1) = -\nabla p_2,$$

where terms involving $u_2$ have been removed as if it is non-zero then the fluid cannot be starting at rest. Then using the first-order momentum equation and the relationship between the perturbations of the pressure and density, the equation may be rewritten:

$$\nabla p_2 = \frac{p_1 \nabla p_1}{c_0^2 \rho_0} - \rho_0(u_1 \cdot \nabla u_1).$$

Using the product rule the two terms may be rewritten in terms of squares yielding:

$$\nabla p_2 = \frac{\nabla p_1^2}{2c_0^2 \rho_0} - \frac{\rho_0 \nabla \|u_1^2\|}{2},$$

then time-averaging over the wave period and integrating to remove the gradients gives:

$$\langle p_2 \rangle = \frac{\langle p_1^2 \rangle}{2c_0^2 \rho_0} - \frac{\rho_0 \langle \|u_1^2\| \rangle}{2},$$

where angular brackets denote time-averages as:

$$\langle X \rangle = \frac{1}{\tau} \int_0^\tau X(t) dt,$$

where $\tau$ is defined such that oscillatory behaviour may be neglected.

G. Derivation of Momentum and Energy Flux

The momentum and energy conservation equations for a volume of an inviscid and adiabatic but compressible fluid can be written in conservation form (with a zero right hand side) when the volume has no sources or sinks as:

$$\frac{\partial \rho u}{\partial t} + \nabla \cdot \Pi = 0,$$

$$\frac{\partial \rho E}{\partial t} + \nabla \cdot \varepsilon = 0,$$

where $E = \rho(u \cdot u/2 + e)$ and e is the internal energy of the ideal gas, the momentum flux tensor $\Pi$ and energy flux vector $\varepsilon$ may be written:

$$\Pi = (\rho u \otimes u) - pI,$$

$$\varepsilon = \rho(u \cdot u/2 + e)u + pu,$$

where I is here the identity tensor and $\otimes$ denotes the outer product.

Considering the general component of the momentum flux tensor n when time-averaged for an acoustic field in this medium and again discarding terms higher than second-order or zero yields:

$$\langle \Pi \rangle_{jk} = \rho_0 \langle u_{1,j} u_{1,k} \rangle + \langle p_2 \rangle \delta_{jk},$$

where j and k are spatial indices and $\delta_{jk}$ represents the Kronecker delta.

Considering the energy flux vector $\varepsilon$, again time-averaged for the acoustic field and discarding terms higher than second order or zero gives:

$$\langle \varepsilon \rangle = e_0 \langle \rho_1 u_1 \rangle + p_0 \langle e_1 u_1 \rangle + \langle p_1 u_1 \rangle.$$

As the perturbation in internal energy $e_1$ is a small variation about the internal energy $e_0$ of the fluid at rest, then the fundamental thermodynamic relation $de = T\,ds - p\,dV$ may be invoked to take derivatives at constant entropy, giving (since $ds=0$ and $dV=1/\rho$):

$$\frac{de}{d\rho} = \frac{p}{\rho^2},$$

$$e_1 = \frac{de}{d\rho}\rho_1 = \frac{p}{\rho^2}\rho_1,$$

then substituting results in:

$$\langle \varepsilon \rangle = \left(e_0 + \frac{p}{\rho^2}\rho_0\right)\langle \rho_1 u_1 \rangle + \langle p_1 u_1 \rangle,$$

but since $\langle \rho_1 u_1 \rangle$ is mass flux and the field is acoustic, then this time-average must be zero yielding finally that the energy flux vector is equivalent to the acoustic intensity I:

$$\langle \varepsilon \rangle = 1 = \langle p_1 u_1 \rangle.$$

H. Potential and Kinetic Energy in Acoustics and their Role in Momentum Flux

Considering the total energy of the fluid perturbed by the acoustic field and noticing that because the internal energy e is a thermodynamic quantity that proceeds from the equation of state it must be a function of density yields:

$$\rho E = \rho u \cdot u/2 + \rho e(\rho),$$

then a Taylor expansion for $(\rho e)(\rho_0 + \rho_1)$ is permitted yielding after discarding terms higher than second-order or zero:

$$\rho E = \rho_0 e_0 + \rho_1 \frac{d\rho e}{d\rho}(\rho_0) + \frac{1}{2}\rho_1^2 \frac{d^2 \rho e}{d\rho^2}(\rho_0) + \frac{1}{2}\rho_0(u \cdot u),$$

where the derivatives are evaluated at $\rho_0$ as per the Taylor expansion. Invoking the same thermodynamic relation as before yields for the derivatives:

$$\frac{de}{d\rho} = \frac{p}{\rho^2}, \frac{dp}{d\rho} = c_0^2,$$

$$\frac{d\rho e}{d\rho} = e\frac{d\rho}{d\rho} + \rho\frac{de}{d\rho} = e + \frac{p}{\rho},$$

$$\frac{d^2\rho e}{d\rho^2} = \frac{de}{d\rho} + \frac{1}{\rho}\frac{dp}{d\rho} + p\frac{d\rho^{-1}}{d\rho} = \frac{c_0^2}{\rho},$$

then substituting and evaluating at $\rho_0$ gives:

$$\rho E = \rho_0 e_0 + \rho_1\left(e_0 + \frac{p(\rho_0)}{\rho_0}\right) + \frac{1}{2}\rho_1^2\frac{c_0^2}{\rho_0} + \frac{1}{2}\rho_0(u \cdot u),$$

where $\rho_0 e_0$ is the internal energy of the volume at rest and $\rho_1$ is the perturbation in density and so change in mass of the volume over the wave period, so time-averaging and giving only terms relevant to the acoustic field results in the total energy of the acoustic field in the volume as:

$$\langle \rho E' \rangle = \frac{1}{2}\langle \rho_1^2 \rangle\frac{c_0^2}{\rho_0} + \frac{1}{2}\rho_0\langle\|u_1^2\|\rangle = \frac{\langle p_1^2 \rangle}{2c_0^2\rho_0} + \frac{\rho_0\langle\|u_1^2\|\rangle}{2},$$

where E' denotes the energy with respect to the acoustic wave in particular.

Clearly, the second term is the kinetic energy and therefore the first term must be the potential energy:

$$KE = \frac{\rho_0\langle\|u_1^2\|\rangle}{2},$$

$$PE = \frac{\langle p_1^2 \rangle}{2c_0^2\rho_0},$$

where KE is a shorthand for kinetic energy and PE a shorthand for potential energy, respectively.

The second order pressure can then be immediately rewritten as:

$$\langle p_2 \rangle = PE - KE.$$

Further, the general momentum flux tensor element may be considered to be:

$$\langle \Pi \rangle_{jk} = \rho_0\langle\|u_1^2\|\rangle\hat{n}_j\hat{n}_k + \langle p_2\rangle\delta_{jk} = 2KE\hat{n}_j\hat{n}_k + (PE - KE)\delta_{jk}.$$

I. Momentum Exchange with Planar Surfaces

At a surface separating two acoustic media there are generally three distinct acoustic fields. These represent the waves incident upon, reflected from and refracted through the surface. Considering each volume element in the incident field (the field as it would be given the free field condition and acoustic sources without the second medium), at the position of the boundary, the reflected field and refracted field may also be evaluated as also distinct free field systems at the boundary, wherein the reflected field is present only in the first medium and refracted only in the second. These notionally non-interacting and unphysical free fields are then composed such that the boundary respects the properties of the two media and conserved quantities, yielding quantitative behavior.

Without loss of generality, the coordinate system may be fixed such that the planar surface separating the two acoustic media has a single unit x-component, such that the surface occupies x=0. In this case, only the $\langle \Pi \rangle_{xx}$ component of the momentum flux need be considered, because this is the only direction along which forces may act, yielding the momentum flux for an acoustic field as:

$$\langle \Pi \rangle_{xx} = \rho_0\langle\|u_1^2\|\rangle\hat{n}_x^2 + \frac{\langle p_1^2 \rangle}{2c_0^2\rho_0} - \rho_0\langle\|u_1^2\|\rangle.$$

The superposition of two acoustic fields may be obtained by expressing the acoustic pressures $p_1$ and components of the medium particle velocity $u_1=\{u_{x,1}, u_{y,1}\}$ as complex numbers $p_I, u, x_{I,x}, u_{I,y}$ that define the spatial harmonic field and then adding them together. As only the real part has physical significance at any value of t, then the time average of say $p^2$ can be expressed relative to the complex-valued harmonic field value (a+ib) as:

$$p_i = (a+ib), p = p_i\exp(i\omega t),$$

$$\langle p^2 \rangle = \frac{1}{\tau}\int_0^\tau \Re(((a+ib)\exp(i\omega t))^2)dt = \frac{1}{2}(a^2+b^2) = \frac{1}{2}(a+ib)(a-ib) = \frac{1}{2}\|p_i^2\|.$$

so the pressures and the particle velocity values for two acoustic free field systems can then be summed to generate time-averaged values for the squares of the field quantities.

As the incident acoustic field and reflected acoustic field are both present in the first medium, they may be summed using the principle of superposition. The reflected wave undergoes a transformation during this process. This is in two parts, the first assumes that the amplitude decays due to the presence of some transmission into the second medium and a phase offset occurs on reflection from the boundary, so this is modelled with a complex coefficient on the reflected wave, $\exp(\mu+iv)$, so then $\exp(\mu)$ is the amplitude of the attenuated wave (as a proportion of unity so it may be expressed relative to the incident wave) and v the angle of the phase shift undergone during reflection. The second change is the particle velocity is reflected across the surface, negating the x-component of the velocity $u_{x,1}$ and so also $u_{I,x}$ before being added, so this component will be reduced in the superposed field. The momentum flux for this superposed incident and reflected acoustic field may then be written in terms of the complex-valued pressure and particle velocity of only the incident field as:

$$\langle \Pi \rangle_{incident\ \&\ reflected} = \frac{1}{2}\left(\frac{\|p_i\|^2}{2c_a^2\rho_a} + \rho_a\left(\|u_i\|^2\cos^2\theta_a - \frac{1}{2}\|u_i\|^2\right)\right)(\exp(2\mu)+1) +$$

$$\frac{1}{2}\left(\frac{\|p_i\|}{2c_a^2\rho_a} - \frac{1}{2}\rho_a\|u_i\|^2\right)\exp(\mu)\cos v.$$

Assuming a similar amplitude change and phase shift on the transmitted wave as $\exp(\mu'+iv')$, then the wave that underwent refraction may be found as:

$$\langle\Pi\rangle_{refracted} = \frac{1}{2}\left(\frac{\|p_t\|^2}{2c_b^2\rho_b} + \rho_b\left(\|u_t\|^2\cos^2\theta_b - \frac{1}{2}\|u_t\|^2\right)\right)\exp(2\mu'),$$

so any phase shift v' on the transmitted wave will have no effect on the momentum flux. The angle $\theta_b$ may be obtained using Snell's law.

Composing the two free fields for the different materials is valid so long as the conserved quantities on the interface agree, so the two free fields may be evaluated at the same point (such as the origin) using this assumption. Placing momentum flux from the first material a on the left and the second material b on the right gives the apparent pressure $p_{app}$ as:

$$\langle\Pi\rangle_{incident\ \&\ reflected} = \langle\Pi\rangle_{refracted} + p_{app},$$

so:

$$p_{app} = \langle\Pi\rangle_{incident\ \&\ reflected} - \langle\Pi\rangle_{refracted}.$$

In this case, the term apparent pressure is used to distinguish this quantity from the other expressions of pressure that assume free field conditions—the pressure here is contingent on the existence of the surface.

The general case involves spatially varying momentum flux fields that do not have the same value in all space. They may be evaluated point-wise to obtain an infinitesimal force on an infinitesimal surface, which is a pressure only valid at that location, or integrated over a larger area, adjusting the reflected field before superposition if necessary to generate a force on that area.

J. Far Field Approximation

Figure 20:
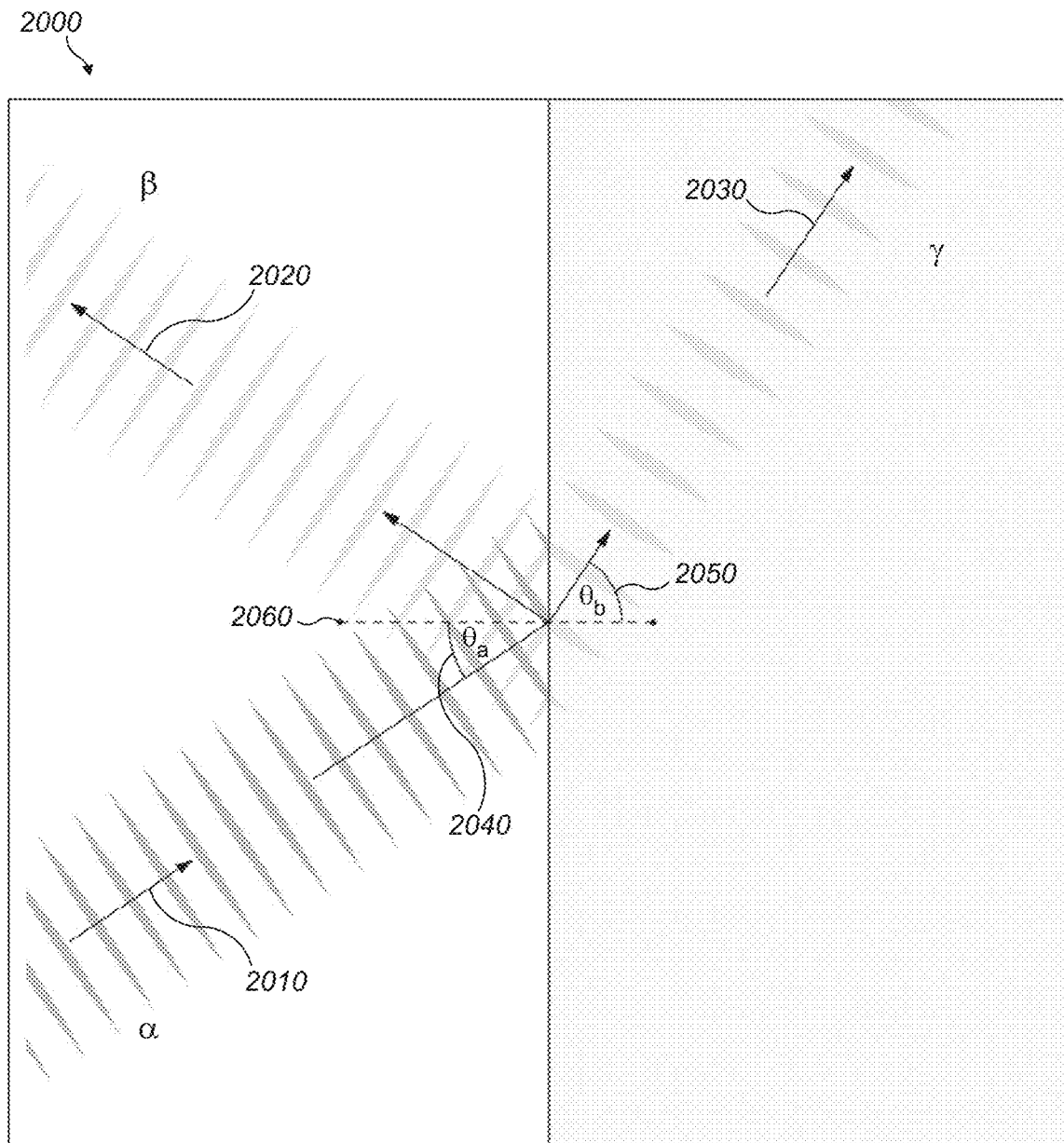
FIG. 20 shows a diagram of waves related to a surface radiation pressure for a far field wave.

Turning to FIG. 20, shown is a diagram 2000 of the three waves that are involved in the problem of surface radiation pressure for a far field wave. The incident wave ($\alpha$) 2010, reflected wave ($\beta$) 2020 and refracted wave ($\gamma$) 2030 may be represented by simple velocity potentials that are defined globally. Although in many cases the reflected wave ($\beta$) 2020 or refracted wave ($\gamma$) 2030 may have zero amplitude, the problem involving all three may be considered without loss of generality. Angles $\theta_a$ 2040 and $\theta_b$ 2050 made by the wave propagation directions with the surface normal 2060 in the two materials are also shown.

When the time difference between wave sources is small compared to the wave period the waves are considered to be in the far field. Waves may then be approximated as plane waves, implying that:

$$p_1 = c_0\rho_0\|u_1\|,$$

but substituting into the expression for $\langle\rho E'\rangle$ reveals that this approximation makes the terms for potential energy and kinetic energy equal.

As the plane wave carries its energy as it travels, this implies:

$$c_0\langle\rho E'\rangle\hat{n} = \langle\mathcal{E}\rangle = I = \langle p_1 u_1\rangle = c_0\rho_0\langle\|u_1^2\|\rangle\hat{n},$$

meaning that in this case the momentum flux tensor element can be written in terms of the time-averaged energy flux, acoustic Poynting vector or acoustic intensity $\langle\varepsilon\rangle$ as:

$$\langle\Pi\rangle_{jk}^{far} = \frac{\langle\|\mathcal{E}\|\rangle}{c_0}\hat{n}_j\hat{n}_k,$$

shadowing the equivalent result for electromagnetic fields.

Following Landau and Lifshitz (Fluid Mechanics 3$^{rd}$ edition, Landau and Lifshitz, pp. 255-256), the three distinct plane waves representing the wave incident upon, reflected from and refracted through the infinite planar surface separating acoustic media may be given as velocity potentials:

$$\phi_\alpha = A_\alpha\exp(i\omega((1/c_a)(y\sin\theta_a + x\cos\theta_a) - t)),$$
$$\phi_\beta = A_\beta\exp(i\omega((1/c_a)(y\sin\theta_a - x\cos\theta_a) - t)),$$
$$\phi_\gamma = A_\gamma\exp(i\omega((1/c_b)(y\sin\theta_b + x\cos\theta_b) - t)),$$

from whose definitions it is clear that the wavefront normal vectors may be described as:

$$\hat{n}_\alpha = \{+\cos\theta_a, +\sin\theta_a\},$$
$$\hat{n}_\beta = \{-\cos\theta_a, +\sin\theta_a\},$$
$$\hat{n}_\gamma = \{+\cos\theta_b, +\sin\theta_b\}.$$

Using the equivalence between potential and kinetic energy and substituting into the equation for $P_{app}$ yields:

$$p_{app}^{far} = \frac{1}{2}\rho_a\|u_t\|^2\cos^2\theta_a(\exp(2\mu)+1) - \frac{1}{2}\rho_b\|u_t\|^2\cos^2\theta_b\exp(2\mu').$$

which is equivalent to the result in Landau and Lifshitz:

$$p_{app}^{far} = \langle\rho_a(E'_\alpha + E'_\beta)\rangle\cos^2\theta_a - \langle\rho_b E'_\gamma\rangle\cos^2\theta_b.$$

This simple result is possible because the momentum flux is constant for the whole of the field hosted by material a.

K. Perfect Reflector Approximation

Figure 21:
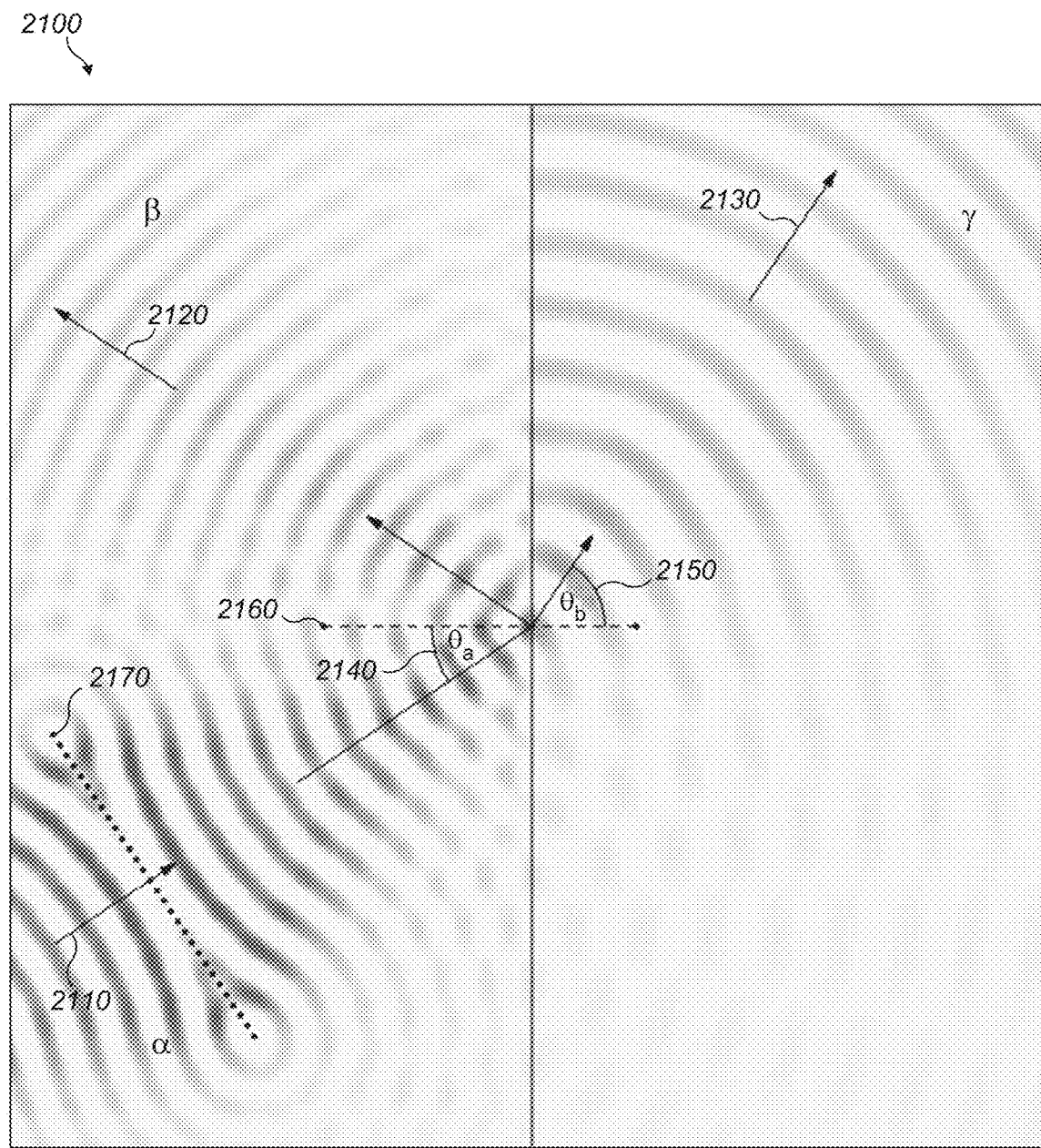
FIG. 21 shows a diagram of waves related to a surface radiation pressure for a near field wave.

Turning to FIG. 21, shown is a diagram 2100 of the three waves 2110, 2120, 2130 that are involved in the problem of surface radiation pressure for a focused wave in the near field of a phase array of acoustic sources. This figure shows a 0-degree phase offset from the case where the reflected wave is not modified in phase upon reflection. The incident wave ($\alpha$) 2110, reflected wave ($\beta$) 2120 and refracted wave ($\gamma$) 2130 are pictured by ray tracing a phased array of acoustic source elements 2170, each represented by a monopole velocity potential source. Note that crossing into another domain with a different wavelength heavily distorts the focal region in the new material due to spherical aberration. Angles $\theta_a$ 2140 and $\theta_b$ 2150 made by the wave propagation directions with the surface normal 2160 in the two materials are also shown.

If the acoustic near-field is instead incident onto a perfect reflector, then even in this complicated case the equations simplify to:

$$p_{app}^{reflect} = \frac{1}{2}\rho_a\|u_\iota\|^2\cos^2\theta_a + \frac{1}{2}(1+\cos\nu)\left(\frac{\|p_\iota\|^2}{2c_a^2\rho_a} - \frac{1}{2}\rho_a\|u_\iota\|^2\right),$$

so in this case, the appearance of the non-linear term is totally dependent on the phase angle of the reflection. If the reflection undergoes a 0° phase shift, then this may be again simplified to:

$$p_{app}^{reflect,0°} = \frac{1}{2}\rho_a\|u_\iota\|^2(\cos^2\theta_a - 1) + \frac{\|p_\iota\|^2}{2c_a^2\rho_a},$$

If the reflection is instead 180° phase shifted, then it instead simplifies to:

$$p_{app}^{reflect,180°} = \frac{1}{2}\rho_a\|u_\iota\|^2\cos^2\theta_a.$$

L. Conversion to a Linear Acoustic Quantity

One useful example of a case wherein a point pressure may be used to infer how the wider solution for the force on a surface behaves is for an acoustic phased array system undergoing focusing, so in the near-field of the array. If the focus has a known profile, then other forces may be inferred from a peak apparent pressure measurement under the assumption that the neighboring wavefield has similar properties.

The $\|u_\iota\|^2\cos^2\theta_a$ term in the calculations above are due to the acoustic wavefront vector and the surface normal vector having a difference, whereby that difference is measured as the angle $\theta_a$. If we attribute a normal vector $\hat{n}$ to the surface normal vector and not the wave direction vector and solve in terms of $u_\iota\cdot\hat{n}$, then it is clear that:

$$\|u_\iota\cdot\hat{n}\|^2 = \|u_\iota\|^2\cos^2\theta_a,$$

since $u_\iota$ is by definition parallel to the wavefront normal vector Then, defining:

$$c_{p/u.n} = \frac{\|p_\iota\|}{c_a\rho_a\|u_\iota\cdot\hat{n}\|},$$

$$c_{u/u.n} = \frac{\|u_\iota\|}{\|u_\iota\cdot\hat{n}\|},$$

the momentum flux differences may then be written:

$$p_{app}^{reflect,0°} = \frac{1}{2}\rho_a\|u_\iota\cdot\hat{n}\|^2(1+c_{p/u.n}^2-c_{u/u.n}^2).$$

so therefore in the case of a 0° phase shift on reflection the amplitude $\int u_\iota\cdot\hat{n}\|$ of the portion of the medium particle velocity along the normal vector $\hat{n}$ required as the target amplitude for the linear system to achieve may be related to the desired apparent pressure on the surface by:

$$\|u_\iota\cdot\hat{n}\| = \sqrt{\frac{2p_{app}^{reflect,0°}}{\rho_a(1+c_{p/u.n}^2-c_{u/u.n}^2)}},$$

or alternatively, for the 180° phase shift case:

$$\|u_\iota\cdot\hat{n}\| = \sqrt{\frac{2p_{app}^{reflect,180°}}{\rho_a}}.$$

Equally, the conversion constants may be written in terms of pressure, yielding:

$$c_{u.n/p} = \frac{c_a\rho_a\|u_\iota\cdot\hat{n}\|}{\|p_\iota\|},$$

$$c_{u/p} = \frac{c_a\rho_a\|u_\iota\|}{\|p_\iota\|},$$

which in this case makes the momentum flux differences:

$$p_{app}^{reflect,0°} = \frac{1}{2}\frac{\|p_\iota\|^2}{c_a^2\rho_a}(1+c_{u.n/p}^2-c_{u/p}^2).$$

so therefore in the case of a 0° phase shift on reflection the amplitude of the acoustic pressure, as this is another linear acoustic quantity that may be solved for, would be required as the target amplitude of the acoustic pressure for the linear system to achieve may be related to the desired apparent pressure on the surface by:

$$\|p_\iota\| = \sqrt{\frac{2c_a^2\rho_a p_{app}^{reflect,0°}}{1+c_{u.n/p}^2-c_{u/p}^2}},$$

or alternatively, for the 180° phase shift case:

$$\|p_\iota\| = \sqrt{\frac{2c_a^2\rho_a p_{app}^{reflect,0°}}{c_{u.n/p}^2}}.$$

M. Computing the Value of the Conversion Constants

Finally, the conversion constants $c_{u.n/p}$, $c_{u/p}$, $c_{p/u.n}$ and $c_{p/u}$ must be generated to find the values of $\|p_\iota\|$ or $\|u_\iota\cdot\hat{n}\|$ to solve for. As the constants are used as coefficients to multiply time-averaged quantities, they may be purely real. There are a number of different ways to achieve this, one efficient approximation using only the 'primary' wave may be found using the summation of the quantity in the construction of the A matrix (using the linear acoustic quantity present in the A matrix as $\alpha$):

$$c_{u.n/\alpha} \approx \left\|\frac{\sum_{q=1}^{N}u_\iota(\chi_j)\cdot\hat{n}_j}{\sum_{q=1}^{N}\alpha_q(\chi_j)}\right\|,$$

-continued $$c_{u/\alpha} \approx \left\| \frac{\left\| \sum_{q=1}^{N} u_\iota(\chi_j) \right\|}{\sum_{q=1}^{N} \alpha_q(\chi_j)} \right\|,$$

$$c_{p/\alpha} \approx \left\| \frac{\sum_{q=1}^{N} p_\iota(\chi_j)}{\sum_{q=1}^{N} \alpha_q(\chi_j)} \right\|,$$

where by 'primary' wave it is meant that the superposition of due to other control points j'≠j, j'∈{1, . . . , m} are not considered in this computation. As the effects on the primary wave are purely a function of position, this is efficient to compute. Alternatively, the properties of the solved field may be queried using the solution vector, such as in the case of a simple linear system construction:

$$c_{u,n/\alpha} = \left\| \frac{\sum_{k=1}^{m} \sum_{q=1}^{N} z_k \overline{\alpha_q(\chi_k)} u_\iota(\chi_j) \cdot \hat{n}_j}{\sum_{k=1}^{m} \sum_{q=1}^{N} z_k \overline{\alpha_q(\chi_k)} \alpha_q(\chi_j)} \right\|,$$

$$c_{u/\alpha} = \left\| \frac{\left\| \sum_{k=1}^{m} \sum_{q=1}^{N} z_k \overline{\alpha_q(\chi_k)} u_\iota(\chi_j) \right\|}{\sum_{k=1}^{m} \sum_{q=1}^{N} z_k \overline{\alpha_q(\chi_k)} \alpha_q(\chi_j)} \right\|,$$

$$c_{p/\alpha} = \left\| \frac{\sum_{k=1}^{m} \sum_{q=1}^{N} z_k \overline{\alpha_q(\chi_k)} p_\iota(\chi_j)}{\sum_{k=1}^{m} \sum_{q=1}^{N} z_k \overline{\alpha_q(\chi_k)} \alpha_q(\chi_j)} \right\|,$$

where $A^H z = x$, although clearly the forward and inverse steps do not have to be symmetric—the expression $z_k \overline{\alpha_q(\chi_k)}$ is intended to derive the transducer drive coefficient for the $k^{th}$ basis function. Further, this is an exercise in simulating the appropriate quantities, so any suitable simulation model for the acoustic quantities may be used.

However, this is a circular reference as each of these is required to define z, by necessity either this is computed using the z vector from the previous iteration or as an iterative refinement process. These ratios may have filtering applied to them to remove high-frequency variations that could potentially generate audible noise at other locations in the dynamic acoustic field that is produced from the phased array to generate the forces desired.

N. General Use of Conversion Constants

These conversion constants may then be used to cross-convert between units, allowing the apparent pressures to be described in terms of scalar linear acoustic quantities that can be solved for using a linear system and basis functions comprised of relative transducer drives. These can then be converted into transducer drive coefficients. Equally, this can be used to cross-convert between a variety of source units into the solvable scalar linear acoustic quantities and control points driven by surface force vectors can be mixed and matched with control points driven by different units for other ultrasonic use cases.

Potential source units that may be cross-converted are limited to time-averageable quantities, but within this category this includes but is not limited to, the time-averaged momentum flux difference described here, the time-averaged force due to the Gor'kov potential, the time-averaged squared pressure, the time-averaged squared acoustic particle velocity of the medium (scalar speed), the time-averaged squared velocity along a direction (with an effective $\cos^2 \theta$ scaling), the time-averaged wave energy flux (Poynting) vector, the time-averaged amplitudes of the acoustic pressure, the time-averaged amplitude of the spatial components of the acoustic particle velocity vector of the medium and the time-averaged amplitude of the acoustic particle velocity vector of the medium along a given direction vector.

These conversion constants may then be used to create an interface wherein conversions may be applied to values given to the control points sent to the phased array. By indicating the type or intent of each of the control points, the appropriate conversion may be inferred automatically.

Further, the destination scalar linear acoustic quantities may be mixed and matched. As the drive coefficient of the transducer may be used equivalently in both $p_\iota$ and $u_\iota \cdot \hat{n}$, it is possible to switch between them in the same matrix, effectively making for instance the A matrix:

$$A = \begin{bmatrix} (\alpha_1)_1(\chi_1) & \cdots & (\alpha_1)_N(\chi_1) \\ \vdots & \ddots & \vdots \\ (\alpha_m)_N(\chi_m) & \cdots & (\alpha_m)_N(\chi_m) \end{bmatrix},$$

where now $(\alpha_j) \in \{p_\iota, u_\iota \cdot \hat{n}_j\}$, so the scalar linear acoustic quantities may be mixed within the same matrix (although scale factors may be required for reasons of numerical stability). This is useful in that differing amounts of natural apodization (due to the minimum norm that is implied by the symmetry of forward and inverse steps) occur in the two quantities—the scalar linear acoustic quantity $u_\iota \cdot \hat{n}$ has more implied apodization due to falloff in the function as the wavefront moves away from $\hat{n}$—the process being minimum norm will regard power used away from $\hat{n}$ to be wasted, which is not the case for the $p_\iota$ unit. However, more complicated adaptive schemes including those previously described can work around the implied apodization of the unit, reducing the impact of this effect.

O. Additional Disclosure

1. A method comprising:
   (a) producing an acoustic field from a transducer array having known relative positions and orientations;
   (b) defining at least one control point wherein each control point
      (i) has a known spatial relationship relative to the transducer array;
      (ii) has a control point activation coefficient;
      (iii) has an indicator describing the type of the control point activation coefficient;
      (iv) has an optional direction vector of action;
   (c) wherein for each control point the source units are inferred from the type and a unit conversion applied to convert from a quantity of source units into a scalar linear acoustic quantity.

2. The method of paragraph 1 wherein the vector comprised of scalar linear acoustic quantities contains at least one acoustic pressure.

3. The method of paragraph 1 wherein the vector comprised of scalar linear acoustic quantities contains at least one particle velocity of the medium along the direction vector of action.

4. The method of paragraph 1 wherein a complex wave field sample matrix is calculated that
   (a) defines the scalar linear acoustic quantity of a first index at control point positions of the first index when:
   (b) actuations at control point positions of a second index using preset amplitude and zero phase offsets with the scalar linear acoustic quantity of the second index are defined.

5. The method of paragraph 4 wherein the complex wave field sample matrix is used to calculate an eigenvector used to further adjust the phase angle of the control point activation coefficients to produce a final phasor vector 6. The method of paragraph 5 wherein the final phasor vector is used to solve for the linear combination of focusing activation coefficients.

7. The method of paragraph 6 wherein the focusing activation coefficients are convertible into transducer actuation coefficients.

8. The method of paragraph 7 wherein the acoustic waves comprise ultrasound waves.

9. The method of paragraph 7 wherein the acoustic field is produced by a mid-air haptic feedback system.

10. A method comprising:
   (a) producing an acoustic field from a transducer array having known relative positions and orientations;
   (b) defining at least one control point wherein each control point
      (i) has a known spatial relationship relative to the transducer array;
      (ii) has a control point activation coefficient;
   (c) wherein at least one control point is indicated as an apparent haptic pressure along a corresponding direction vector of action;
   (d) wherein for each control point indicated as an apparent haptic pressure a conversion is applied from the difference of momentum fluxes into a scalar linear acoustic quantity.

11. The method of paragraph 10 wherein the vector comprised of scalar linear acoustic quantities contains at least one acoustic pressure.

12. The method of paragraph 10 wherein the vector comprised of scalar linear acoustic quantities contains at least one particle velocity of the medium along the direction vector of action.

13. The method of paragraph 10 wherein a complex wave field sample matrix is calculated that
   (a) defines the scalar linear acoustic quantity of a first index at control point positions of the first index when:
   (b) actuations at control point positions of a second index using preset amplitude and zero phase offsets with the scalar linear acoustic quantity of the second index are defined.

14. The method of paragraph 13 wherein the complex wave field sample matrix is used to calculate an eigenvector used to further adjust the phase angle of the control point activation coefficients to produce a final phasor vector.

15. The method of paragraph 14 wherein the final phasor vector is used to solve for the linear combination of focusing activation coefficients.

16. The method of paragraph 15 wherein the focusing activation coefficients are convertible into transducer actuation coefficients.

17. The method of paragraph 16 wherein the acoustic waves comprise ultrasound waves.

18. The method of paragraph 16 wherein the acoustic field is produced by a mid-air haptic feedback system.

VI. Conclusion

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A transducer array having known relative positions and orientations comprising:
   an acoustic array;
   at least one control point wherein each control point: (a) has a known spatial relationship relative to the transducer array which is used to define a corresponding focal point basis function belonging to a first set of focal point basis functions; and (b) has a control point amplitude;
   computing potentially estimated transducer activations required to produce an acoustic field corresponding to a control point set with the first set of focal point basis functions comprised of transducer coefficients to produce a first set of potentially estimated transducer activation amplitudes;
   an adjuster for adjusting each transducer coefficient of the first set of focal point basis functions using the potentially estimated transducer activation amplitude for the transducer in combination with statistical properties of the potentially estimated transducer activation amplitudes to produce a second set of focal point basis functions;

a computer for computing transducer activations required to produce the acoustic field with the second set of focal point basis functions;

wherein the second set of transducer activations are used to drive the transducer array.

2. The transducer array as in claim 1, wherein the adjustment applied to each transducer coefficient is a scaling in a form of a per-transducer gain.

3. The transducer array as in claim 1, wherein the mean value is within statistical properties of the first set of potentially estimated transducer activation amplitudes.

4. The transducer array as in claim 1, wherein statistical properties of the first set of potentially estimated transducer activation amplitudes are obtained by estimated evaluation of quantile function for percentiles of a distribution.

* * * * *